(12) United States Patent
Suitoh et al.

(10) Patent No.: US 10,855,916 B2
(45) Date of Patent: Dec. 1, 2020

(54) IMAGE PROCESSING APPARATUS, IMAGE CAPTURING SYSTEM, IMAGE PROCESSING METHOD, AND RECORDING MEDIUM

(71) Applicants: Hiroshi Suitoh, Kanagawa (JP); Keiichi Kawaguchi, Kanagawa (JP); Yohsuke Kawamura, Kanagawa (JP)

(72) Inventors: Hiroshi Suitoh, Kanagawa (JP); Keiichi Kawaguchi, Kanagawa (JP); Yohsuke Kawamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 28 days.

(21) Appl. No.: 16/353,051

(22) Filed: Mar. 14, 2019

(65) Prior Publication Data

US 2019/0289203 A1 Sep. 19, 2019

(30) Foreign Application Priority Data

Mar. 15, 2018 (JP) .................................. 2018-048514
Mar. 8, 2019 (JP) .................................. 2019-042289

(51) Int. Cl.
*H04N 5/232* (2006.01)
*H04N 5/341* (2011.01)
*G06F 9/30* (2018.01)

(52) U.S. Cl.
CPC ........... *H04N 5/23229* (2013.01); *G06F 9/30* (2013.01); *H04N 5/3415* (2013.01)

(58) Field of Classification Search
CPC ............. H04N 5/23229; H04N 5/3415; H04N 5/2258; H04N 5/23203; H04N 5/247;
(Continued)

(56) References Cited

U.S. PATENT DOCUMENTS 10,509,947 B1 * 12/2019 Douillard .................. G06T 3/00
2016/0063765 A1 3/2016 Yoshida et al.
(Continued)

FOREIGN PATENT DOCUMENTS

CN 101616237 12/2009
CN 102845053 12/2012
(Continued)

OTHER PUBLICATIONS

Chinese Office Action dated Sep. 17, 2020 in corresponding Application No. 201910188235.0.

*Primary Examiner* — Lin Ye
*Assistant Examiner* — Chan T Nguyen
(74) *Attorney, Agent, or Firm* — Oblon, McClelland, Maier & Neustadt, L.L.P.

(57) ABSTRACT

An image processing apparatus obtains a first image in a first projection, and a second image in a second projection; transforms projection of a first corresponding area of the first image to generate a third image in the second projection; identifies a plurality of feature points in the second image and the third image; determines a second corresponding area in the third image, based on the plurality of feature points; generate a reference shape in the second projection, having a relation of projection transformation with the second image; transforms projection of the reference shape to generate a reference shape in the first projection; calculates reference shape conversion data for converting the reference shape to the second corresponding area, using data for transforming projection from the second image to the second corresponding area; and stores the reference shape conversion data in association with reference location data.

17 Claims, 38 Drawing Sheets

(58) Field of Classification Search
CPC ........... H04N 5/23238; H04N 5/23232; H04N 5/262; H04N 5/265; H04N 5/232; H04N 5/2251; H04N 5/2254; H04N 5/2253; G06F 9/30; G06T 15/20; G06K 9/4676; G06K 9/468; G06K 9/342
USPC ..................................................... 348/222.1
See application file for complete search history.

(56) References Cited

U.S. PATENT DOCUMENTS

| | | |
|---|---|---|
| 2016/0191798 A1 | 6/2016 | Yoo et al. |
| 2017/0220887 A1* | 8/2017 | Fathi .................. G06K 9/00201 |
| 2018/0181358 A1 | 6/2018 | Asai et al. |
| 2018/0182065 A1 | 6/2018 | Yoshida et al. |
| 2018/0184001 A1 | 6/2018 | Yoshida et al. |
| 2018/0240223 A1* | 8/2018 | Yi .............................. G06T 3/00 |
| 2018/0270417 A1 | 9/2018 | Suitoh et al. |

FOREIGN PATENT DOCUMENTS

| | | |
|---|---|---|
| CN | 102999891 | 3/2013 |
| CN | 103841344 | 6/2014 |
| CN | 103907340 | 7/2014 |
| CN | 104160693 | 11/2014 |
| CN | 105872354 | 8/2016 |
| CN | 106133794 | 11/2016 |
| JP | 2007-000267 | 1/2007 |
| JP | 2012-178135 | 9/2012 |
| JP | 2016-048456 | 4/2016 |
| JP | 2016-096487 | 5/2016 |

* cited by examiner

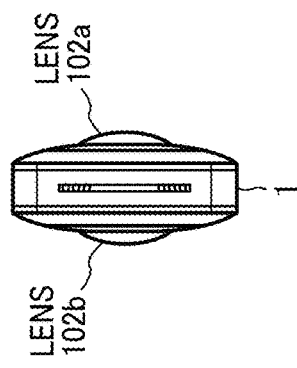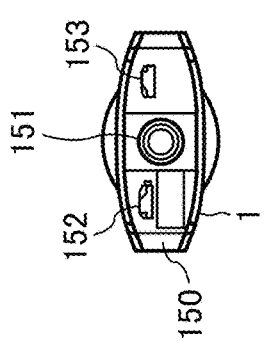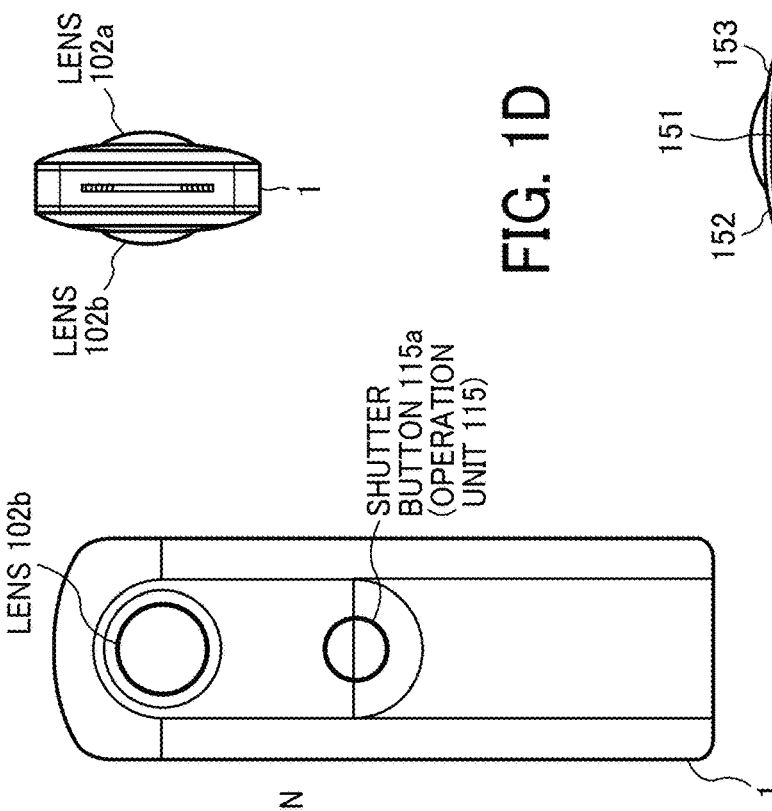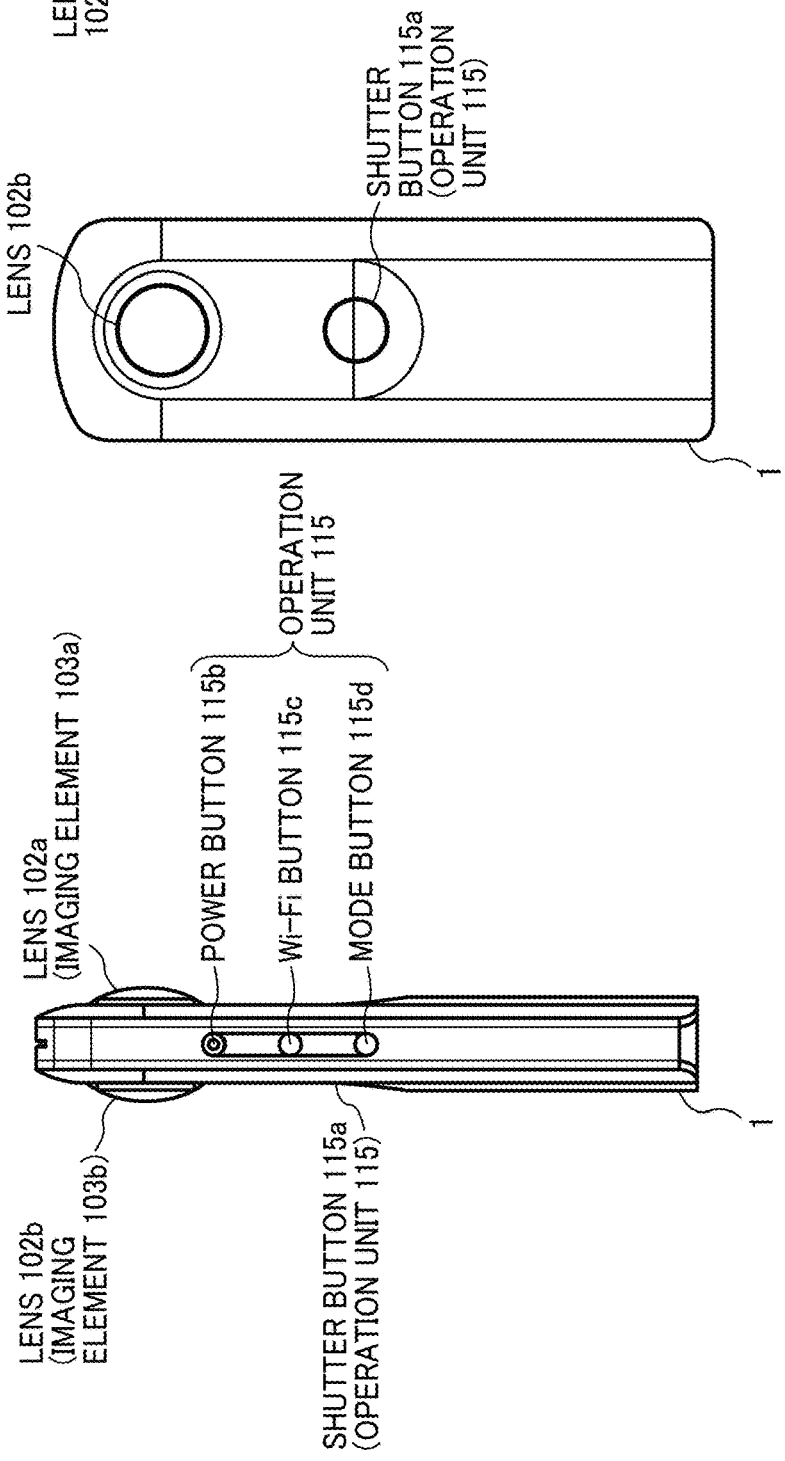

HEMISPHERICAL IMAGE (FRONT)

HEMISPHERICAL IMAGE (BACK)

CAPTURED IMAGE (EQUIRECTANGULAR PROJECTION IMAGE EC)

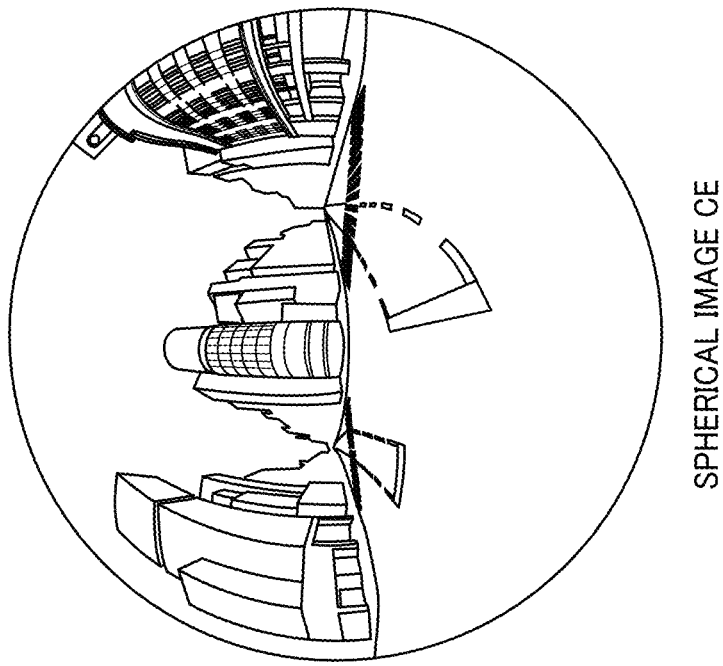
FIG. 4B
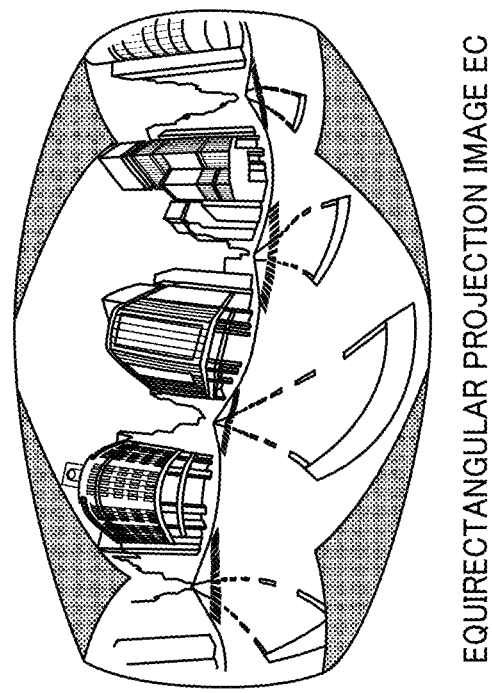
FIG. 4A
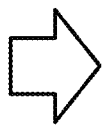
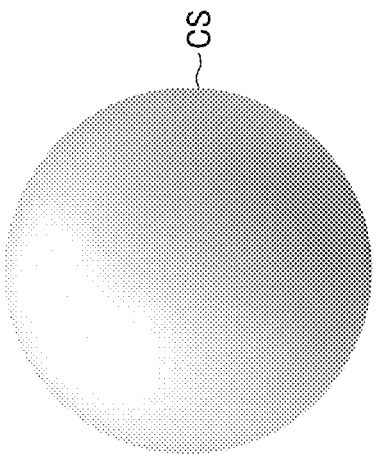

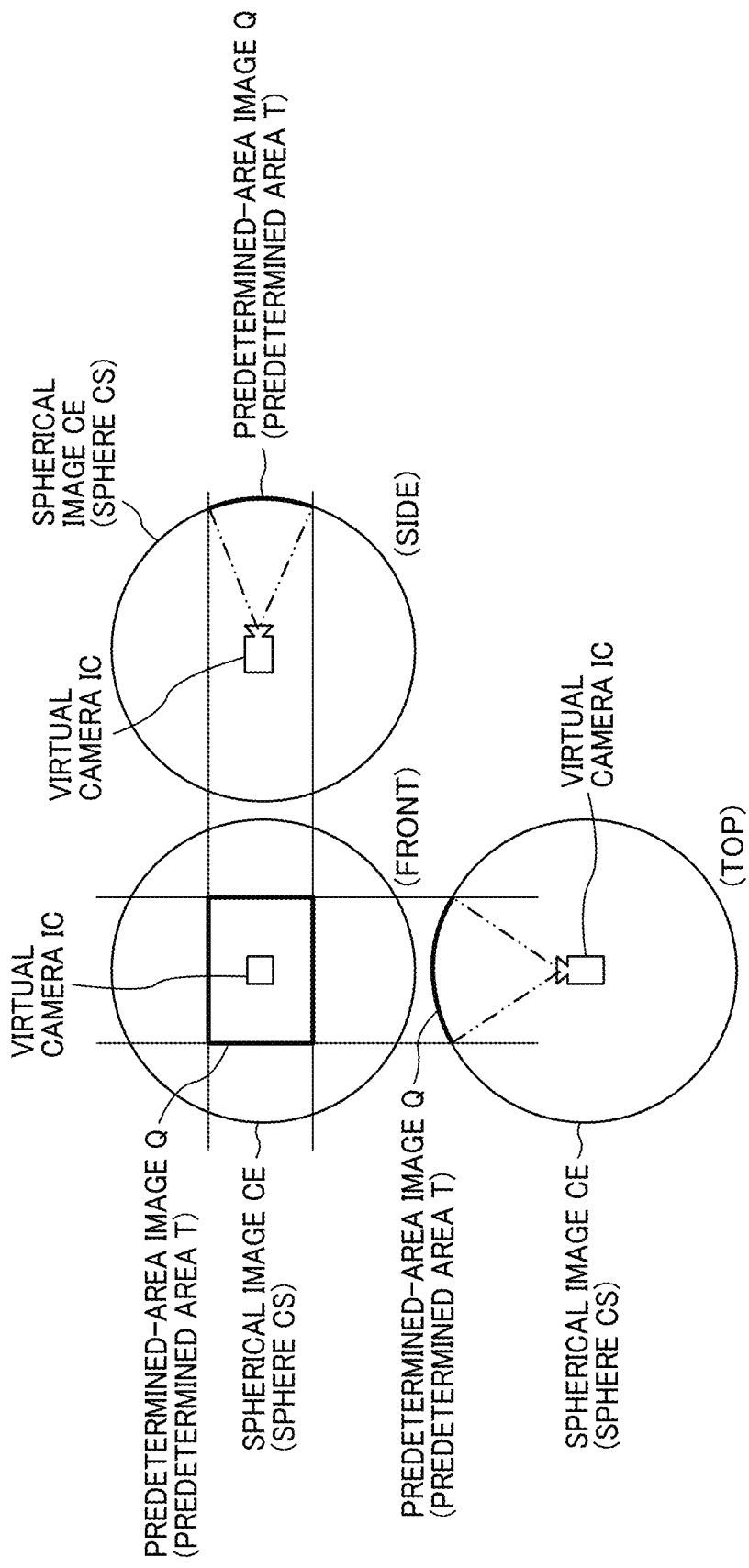

| LINKING INFORMATION | IP ADDRESS | DEVICE NAME |
|---|---|---|
| MAIN | 1.2.3.4 | k1-camera1 |
| SUB 1 | 1.2.3.5 | theta-camera1 |
| – | 1.2.3.6 | theta-camera2 |
| ⋮ | ⋮ | ⋮ |

FIG. 17

| | | | |
|---|---|---|---|
| EQUIRECTANGULAR PROJECTION IMAGE INFORMATION | ATTRIBUTE DATA | IMAGE ID | ./IMAGE001.MOV |
| | | POSITIONING CORRECTION (Pitch, Yaw, Roll) | (−2.8, −2.1, 0) |
| PLANAR IMAGE INFORMATION | ATTRIBUTE DATA | IMAGE ID | ./IMAGE111.MOV |
| | | 35 mm EQUIVALENT FOCAL LENGTH | 28 |
| | AREA DIVISION NUMBER INFORMATION | HORIZONTAL (LONGITUDE) DIVISION NUMBER | 30 |
| | | VERTICAL (LATITUDE) DIVISION NUMBER | 20 |
| REFERENCE LOCATION DATA | COORDINATE OF GRID IN GRID AREA (REFERENCE LOCATION PARAMETER) | | $(LO_{00,00}, LA_{00,00}), (LO_{01,00}, LA_{01,00}), \ldots, (LO_{30,20}, LA_{30,20})$ |
| REFERENCE SHAPE CONVERSION DATA (1) | REFERENCE SHAPE ROTATION DATA | ROTATE | (Pitch, Yaw, Roll) | (4.5, 2.40, −14.0) |
| | REFERENCE SHAPE SCALING DATA | PTZ | MAGNIFICATION | 1.2 |
| | REFERENCE SHAPE MOVEMENT DATA | | (LONGITUDE (Pan), LATITUDE(Tilt)) | (10, 20) |
| | VIDEO FRAME IDENTIFICATION DATA | TIME | VIDEO FRAME COUNT VALUE | 1 |
| ... | ... | | | ... |
| REFERENCE SHAPE CONVERSION DATA (N) | REFERENCE SHAPE ROTATION DATA | ROTATE | (Pitch, Yaw, Roll) | (−10.5, 5.0, 30.0) |
| | REFERENCE SHAPE SCALING DATA | PTZ | MAGNIFICATION | 0.8 |
| | REFERENCE SHAPE MOVEMENT DATA | | (LONGITUDE (Pan), LATITUDE(Tilt)) | (50, 20) |
| | VIDEO FRAME IDENTIFICATION DATA | TIME | VIDEO FRAME COUNT VALUE | 350 |
| METADATA GENERATION INFORMATION | VERSION INFORMATION | | | 0.1.1 |

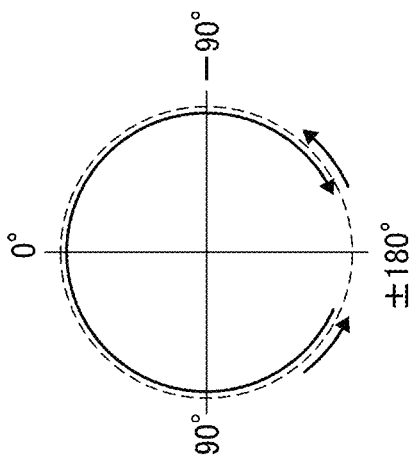
FIG. 24A
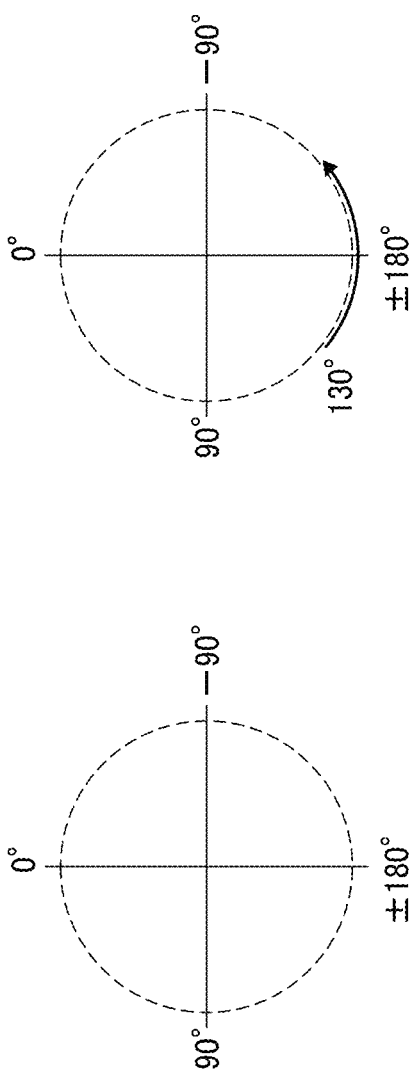
FIG. 24B
FIG. 24C
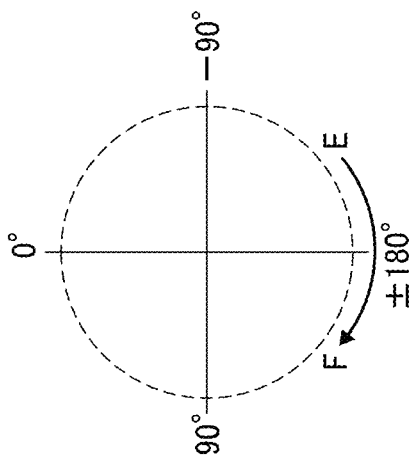
FIG. 24D
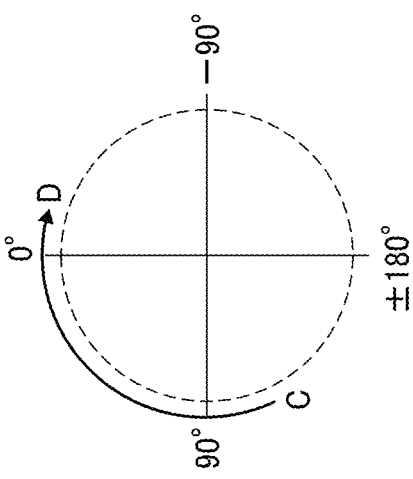
FIG. 24E
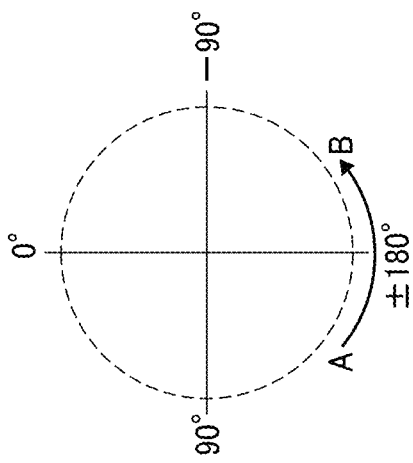
FIG. 24F

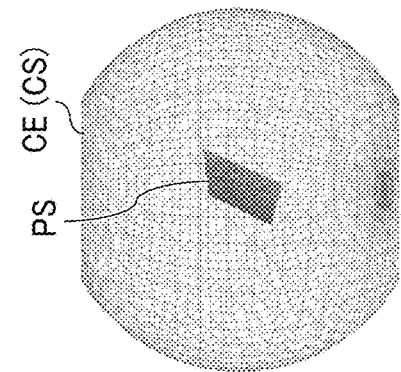
FIG. 25A SPHERICAL IMAGE CE (SPHERE CS) PARTIAL SPHERE PS
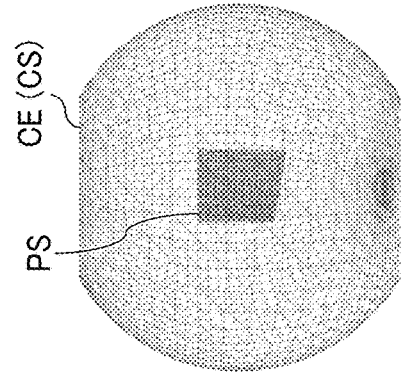
FIG. 25B PS CE (CS)
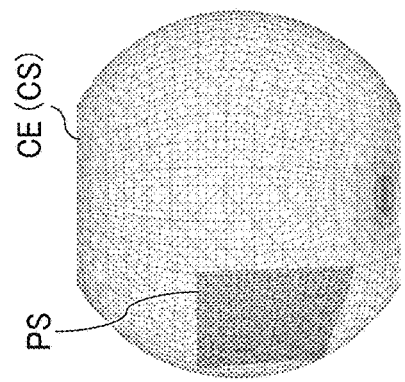
FIG. 25C PS CE (CS)
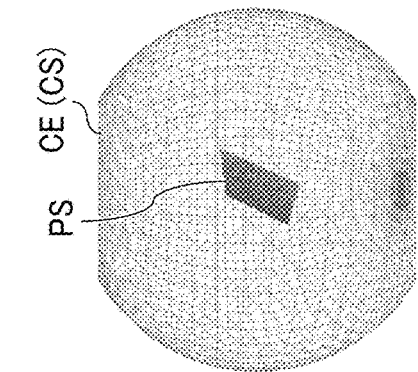
FIG. 25D PS CE (CS)
FIG. 25E PS CE (CS)
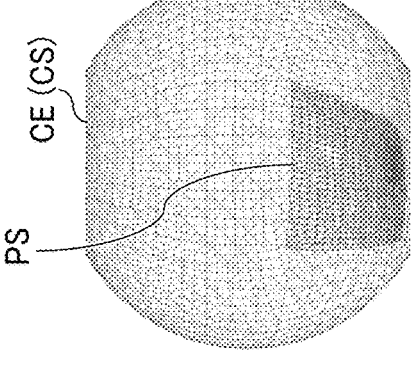
FIG. 25F PS CE (CS)
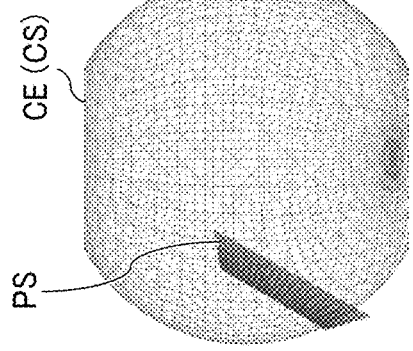
FIG. 25G PS CE (CS)

CA3

PLANAR IMAGE P

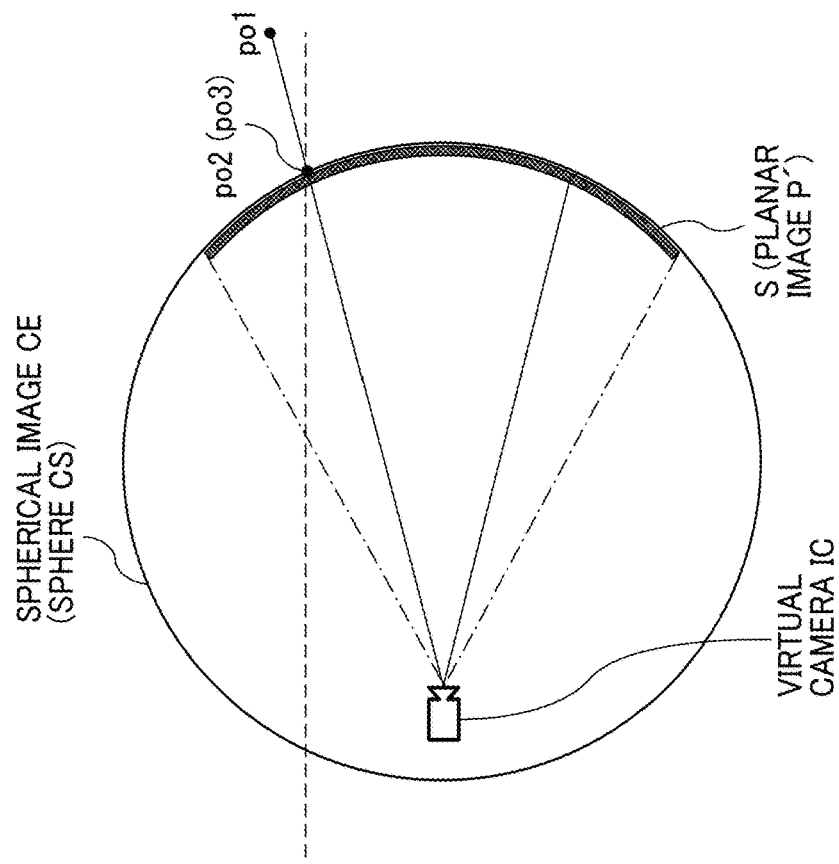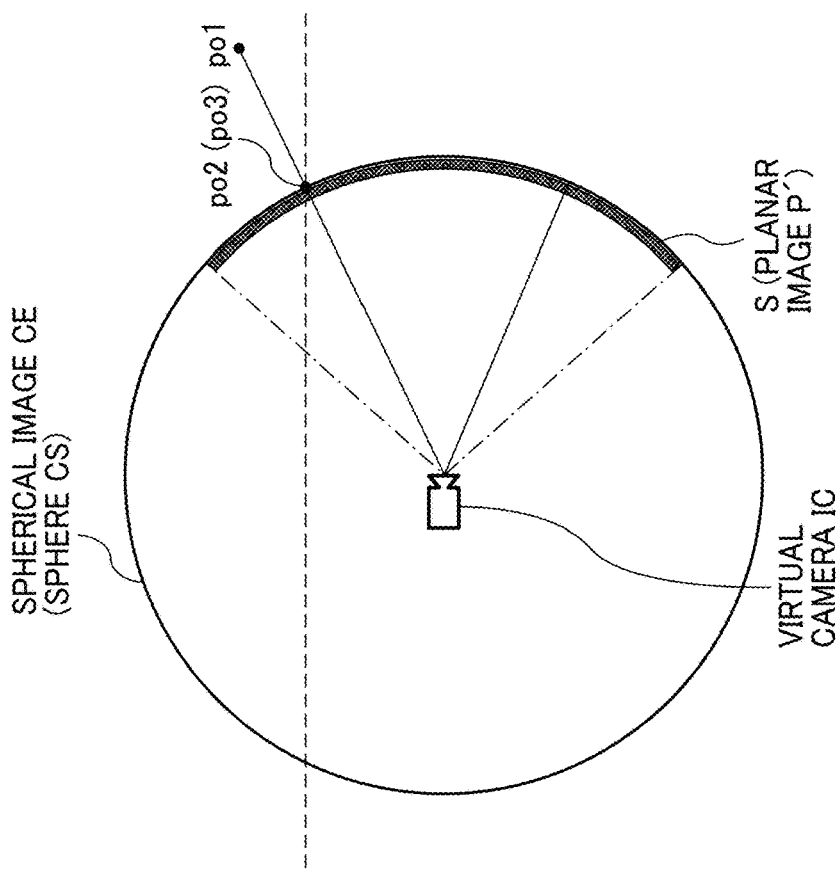

IMAGE PROCESSING APPARATUS, IMAGE CAPTURING SYSTEM, IMAGE PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2018-048514, filed on Mar. 15, 2018, and 2019-042289, filed on Mar. 8, 2019, filed on, in the Japan Patent Office, the entire disclosure of which is hereby incorporated by reference herein.

BACKGROUND

Technical Field

The present invention relates to an image processing apparatus, an image capturing system, an image processing method, and a recording medium.

Description of the Related Art

The wide-angle image, taken with a wide-angle lens, is useful in capturing such as landscape, as the image tends to cover large areas. For example, there is an image capturing system, which captures a wide-angle image of a target object and its surroundings, and an enlarged image of the target object. The wide-angle image is combined with the enlarged image such that, even when a part of the wide-angle image showing the target object is enlarged, that part embedded with the enlarged image is displayed in high resolution.

On the other hand, a digital camera that captures two hemispherical images from which a 360-degree, spherical image is generated, has been proposed. Such digital camera generates an equirectangular projection image based on two hemispherical images, and transmits the equirectangular projection image to a communication terminal, such as a smart phone, for display to a user.

SUMMARY

Example embodiments of the present invention include an image processing apparatus includes processing circuitry to: obtain a first image in a first projection, and a second image in a second projection; transform projection of a first corresponding area of the first image that corresponds to the second image, from the first projection to the second projection, to generate a third image in the second projection; identify a plurality of feature points, respectively, in the second image and the third image; determine a second corresponding area in the third image that corresponds to the second image, based on the plurality of feature points respectively identified in the second image and the third image; generate a reference shape in the second projection, having a relation of projection transformation with the second image; transform projection of the reference shape, from the second projection to the first projection, to generate a reference shape in the first projection; calculate reference shape conversion data for converting the reference shape in the second projection to the second corresponding area, using data for transforming projection from the second image to the second corresponding area; and store, in a memory, the reference shape conversion data in association with reference location data indicating the locations of a plurality of points of the reference shape in the first projection, the reference shape conversion data including at least one of reference shape rotation data defining rotation processing to be applied to the reference shape, and reference shape scaling data for defining scaling to be applied to the reference shape.

Example embodiments of the present invention include an image capturing system including the above-described image processing apparatus.

Example embodiments of the present invention include an image processing method performed by the above-described image processing apparatus, and a recording medium storing a control program for performing the image processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 1A, 1B, 1C, and 1D (FIG. 1) are a left side view, a rear view, a plan view, and a bottom side view of a special image capturing device, according to embodiments;

FIG. 4A and FIG. 4B (FIG. 4) are views respectively illustrating the image in equirectangular projection covering a surface of a sphere, and a spherical image, according to embodiments;

FIG. 5 is a view illustrating positions of a virtual camera and a predetermined area in a case in which the spherical image is represented as a three-dimensional solid sphere according to embodiments;

FIG. 17 is an illustration of a data structure of superimposed display metadata according to the first embodiment;

FIGS. 24A, 24B, 24C, 24D, 24E, and 24F (FIG. 24) are illustrations for explaining interpolation processing applied to a parameter obtained from the reference shape conversion data, according to the first embodiment;

FIGS. 25A, 25B, 25C, 25D, 25E, 25F, and 25G (FIG. 25) are illustrations for explaining processing to calculate a location parameter, according to the first embodiment;

FIGS. 32A and 32B (FIG. 32) are conceptual diagrams illustrating a two-dimensional view of the spherical image superimposed with the planar image, using the location parameter, in the first embodiment;

Figure 2:
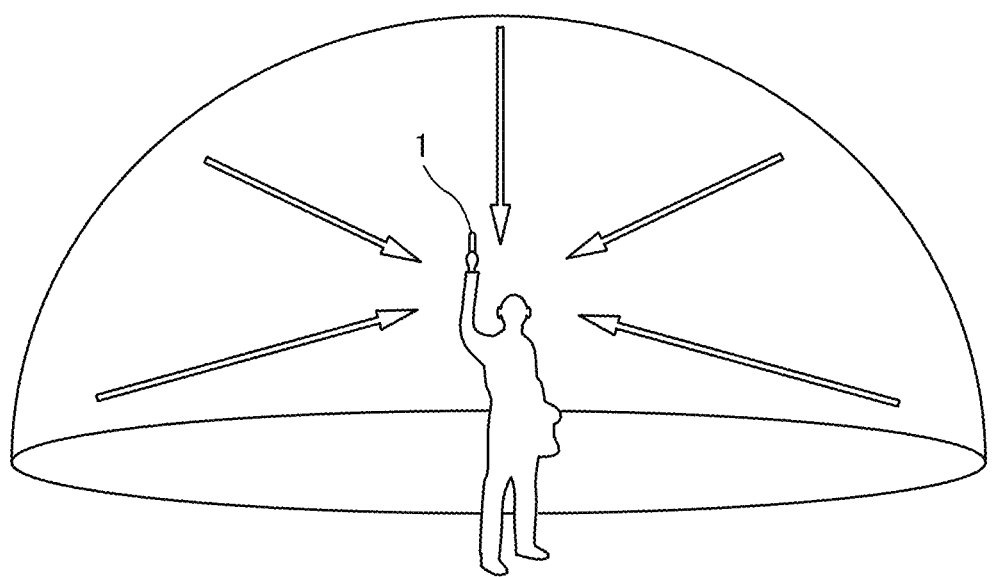
FIG. 2 is an illustration for explaining how a user uses the image capturing device, according to embodiments.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In this disclosure, a first image is an image superimposed with a second image, and a second image is an image to be superimposed on the first image. For example, the first image is an image covering an area larger than that of the second image. In another example, the second image is an image with image quality higher than that of the first image, for example, in terms of image resolution. For instance, the first image may be a low-definition image, and the second image may be a high-definition image. In another example, the first image and the second image are images expressed in different projections (projective spaces). Examples of the first image in a first projection include an equirectangular projection image, such as a spherical image. Examples of the second image in a second projection include a perspective projection image, such as a planar image. In this disclosure, the second image, such as the planar image captured with the general image capturing device, is treated as one example of the second image in the second projection (that is, in the second projective space).

The first image, and even the second image, if desired, can be made up of multiple pieces of image data which have been captured through different lenses, or using different image sensors, or at different times.

Further, in this disclosure, the spherical image does not have to be the full-view spherical image. For example, the spherical image may be the wide-angle view image having an angle of about 180 to 360 degrees in the horizontal direction. As described below, it is desirable that the spherical image is image data having at least a part that is not entirely displayed in the predetermined area T.

Further, in the following, a peripheral area image is an example of a third image.

Referring to the drawings, embodiments of the present invention are described below.

First, referring to FIGS. 1 to 7, operation of generating a spherical image is described according to an embodiment.

First, referring to FIGS. 1A to 1D, an external view of a special-purpose (special) image capturing device 1, is described according to the embodiment. The special image capturing device 1 is a digital camera for capturing images from which a 360-degree spherical image is generated. FIGS. 1A to 1D are respectively a left side view, a rear view, a plan view, and a bottom view of the special image capturing device 1.

As illustrated in FIGS. 1A to 1D, the special image capturing device 1 has an upper part, which is provided with a fish-eye lens 102a on a front side (anterior side) thereof, and a fish-eye lens 102b on a back side (rear side) thereof. The special image capturing device 1 includes imaging elements (imaging sensors) 103a and 103b in its inside. The imaging elements 103a and 103b respectively capture images of an object or surroundings via the lenses 102a and 102b, to each obtain a hemispherical image (the image with an angle of view of 180 degrees or greater). As illustrated in FIG. 1B, the special image capturing device 1 further includes a shutter button 115a on a rear side of the special image capturing device 1, which is opposite of the front side of the special image capturing device 1. As illustrated in FIG. 1A, the left side of the special image capturing device 1 is provided with a power button 115b, a Wireless Fidelity (Wi-Fi) button 115c, and an image capturing mode button 115d. Any one of the power button 115b and the Wi-Fi button 115c switches between ON and OFF, according to selection (pressing) by the user. The image capturing mode button 115d switches between a still-image capturing mode and a moving image capturing mode, according to selection (pressing) by the user. The shutter button 115a, power button 115b, Wi-Fi button 115c, and image capturing mode button 115d are a part of an operation unit 115. The operation unit 115 is any section that receives a user instruction, and is not limited to the above-described buttons or switches.

As illustrated in FIG. 1D, the special image capturing device 1 is provided with a tripod mount hole 151 at a center of its bottom face 150. The tripod mount hole 151 receives a screw of a tripod, when the special image capturing device 1 is mounted on the tripod. In this embodiment, the tripod mount hole 151 is where the generic image capturing device 3 is attached via an adapter 9, described later referring to FIG. 9. The bottom face 150 of the special image capturing device 1 further includes a Micro Universal Serial Bus (Micro USB) terminal 152, on its left side. The bottom face 150 further includes a High-Definition Multimedia Interface (HDMI, Registered Trademark) terminal 153, on its right side.

Next, referring to FIG. 2, a description is given of a situation where the special image capturing device 1 is used. FIG. 2 illustrates an example of how the user uses the special image capturing device 1. As illustrated in FIG. 2, for example, the special image capturing device 1 is used for capturing objects surrounding the user who is holding the special image capturing device 1 in his or her hand. The imaging elements 103a and 103b illustrated in FIGS. 1A to 1D capture the objects surrounding the user to obtain two hemispherical images.

Figure 3A:
FIGS. 3A, 3B, and 3C (FIG. 3) are views illustrating a front side of a hemispherical image, a hack side of the hemispherical image, and an image in equirectangular projection, respectively, captured by the image capturing device, according to embodiments.
Figure 3B:
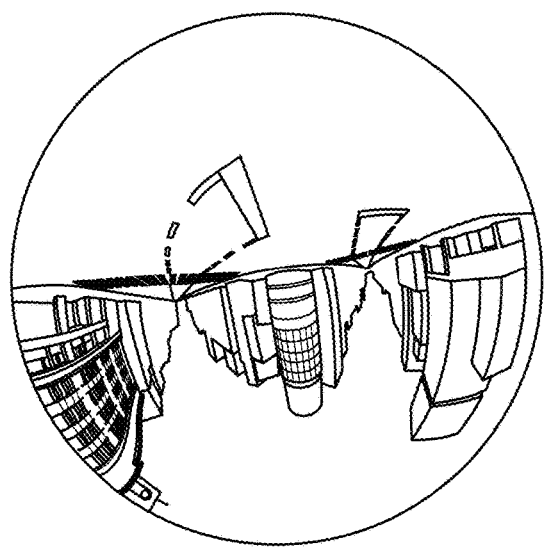
Figure 3C:
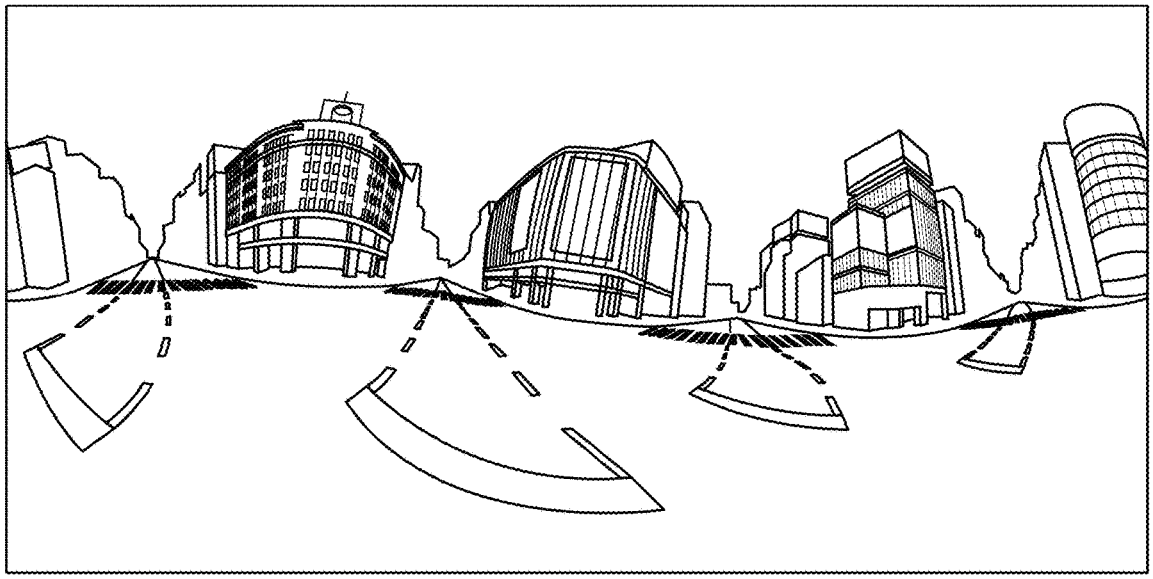

Next, referring to FIGS. 3A to 3C and FIGS. 4A and 4B, a description is given of an overview of an operation of generating an equirectangular projection image EC and a spherical image CE from the images captured by the special image capturing device 1. FIG. 3A is a view illustrating a hemispherical image (front side) captured by the special image capturing device 1. FIG. 3B is a view illustrating a hemispherical image (back side) captured by the special image capturing device 1. FIG. 3C is a view illustrating an image in equirectangular projection, which is referred to as an "equirectangular projection image" (or equidistant cylindrical projection image) EC. FIG. 4A is a conceptual diagram illustrating an example of how the equirectangular projection image maps to a surface of a sphere. FIG. 4B is a view illustrating the spherical image.

As illustrated in FIG. 3A, an image captured by the imaging element 103a is a curved hemispherical image (front side) taken through the fish-eye lens 102a. Also, as illustrated in FIG. 3B, an image captured by the imaging element 103b is a curved hemispherical image (back side) taken through the fish-eye lens 102b. The hemispherical image (front side) and the hemispherical image (back side), which are reversed by 180-degree from each other, are combined by the special image capturing device 1. This results in generation of the equirectangular projection image EC as illustrated in FIG. 3C.

The equirectangular projection image is mapped on the sphere surface using Open Graphics Library for Embedded Systems (OpenGL ES) as illustrated in FIG. 4A. This results in generation of the spherical image CE as illustrated in FIG. 4B. In other words, the spherical image CE is represented as the equirectangular projection image EC, which corresponds to a surface facing a center of the sphere CS. It should be noted that OpenGL ES is a graphic library used for visualizing two-dimensional (2D) and three-dimensional (3D) data. The spherical image CE is either a still image or a moving image.

Since the spherical image CE is an image attached to the sphere surface, as illustrated in FIG. 4B, a part of the image may look distorted when viewed from the user, providing a feeling of strangeness. To resolve this strange feeling, an image of a predetermined area, which is a part of the spherical image CE, is displayed as a flat image having fewer curves. The predetermined area is, for example, a part of the spherical image CE that is viewable by the user. In this disclosure, the image of the predetermined area is referred to as a "predetermined-area image" Q. Hereinafter, a description is given of displaying the predetermined-area image Q with reference to FIG. 5 and FIGS. 6A and 6B.

Figure 6A:
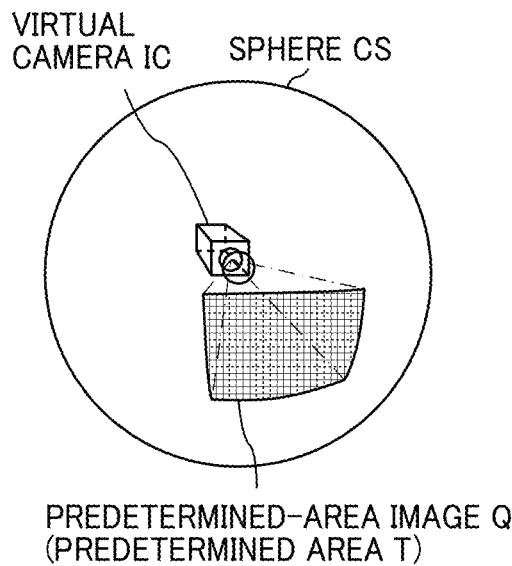
FIGS. 6A and 6B (FIG. 6) are respectively a perspective view of FIG. 5, and a view illustrating an image of the predetermined area on a display, according to embodiments.
Figure 6B:
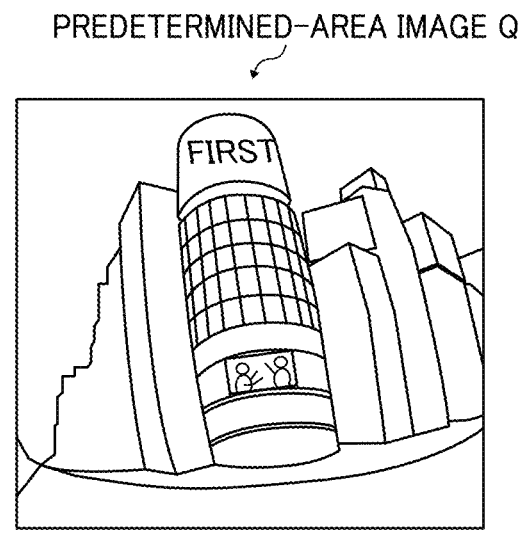

FIG. 5 is a view illustrating positions of a virtual camera IC and a predetermined area T in a case in which the spherical image is represented as a surface area of a three-dimensional solid sphere. The virtual camera IC corresponds to a position of a point of view (viewpoint) of a user who is viewing the spherical image CE represented as a surface area of the three-dimensional solid sphere CS. FIG. 6A is a perspective view of the spherical image CE illustrated in FIG. 5. FIG. 6B is a view illustrating the predetermined-area image Q when displayed on a display. In FIG. 6A, the spherical image CE illustrated in FIG. 4B is represented as a surface area of the three-dimensional solid sphere CS. Assuming that the spherical image CE is a surface area of the solid sphere CS, the virtual camera IC is inside of the spherical image CE as illustrated in FIG. 5. The predetermined area T in the spherical image CE is an imaging area of the virtual camera IC. Specifically, the predetermined area T is specified by predetermined-area information indicating an imaging direction and an angle of view α of the virtual camera IC in a three-dimensional virtual space containing the spherical image CE.

The predetermined-area image Q, which is an image of the predetermined area T illustrated in FIG. 6A, is displayed on a display as an image of an imaging area of the virtual camera IC, as illustrated in FIG. 6B. FIG. 6B illustrates the predetermined-area image Q represented by the predetermined-area information that is set by default. The following explains the position of the virtual camera IC, using an imaging direction (ea, aa) and an angle of view α of the virtual camera IC.

Figure 7:
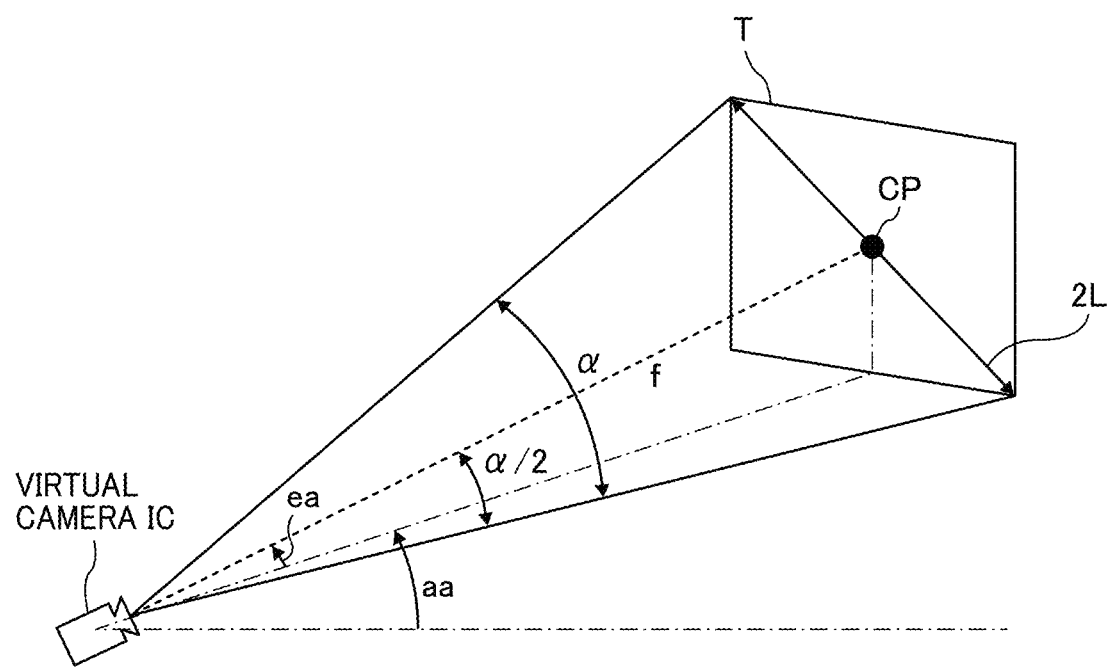
FIG. 7 is a view illustrating a relation between predetermined-area information and a predetermined-area image according to embodiments.

Referring to FIG. 7, a relation between the predetermined-area information and the image of the predetermined area T is described according to the embodiment. FIG. 7 is a view illustrating a relation between the predetermined-area information and the image of the predetermined area T. As illustrated in FIG. 7, "ea" denotes an elevation angle, "aa" denotes an azimuth angle, and "α" denotes an angle of view, respectively, of the virtual camera IC. The position of the virtual camera IC is adjusted, such that the point of gaze of the virtual camera IC, indicated by the imaging direction (ea, aa), matches the central point CP of the predetermined area T as the imaging area of the virtual camera IC. The predetermined-area image Q is an image of the predetermined area T, in the spherical image CE. "f" denotes a distance from the virtual camera IC to the central point CP of the predetermined area T. "L" denotes a distance between the central point CP and a given vertex of the predetermined area T (2L is a diagonal line). In FIG. 7, a trigonometric function equation generally expressed by the following Equation 1 is satisfied.

$$L/f = \tan(\alpha/2) \quad \text{(Equation 1)}$$

First Embodiment

Referring to FIGS. 8 to 34D, the image capturing system according to a first embodiment of the present invention is described.

<Overview of Image Capturing System>

Figure 8:
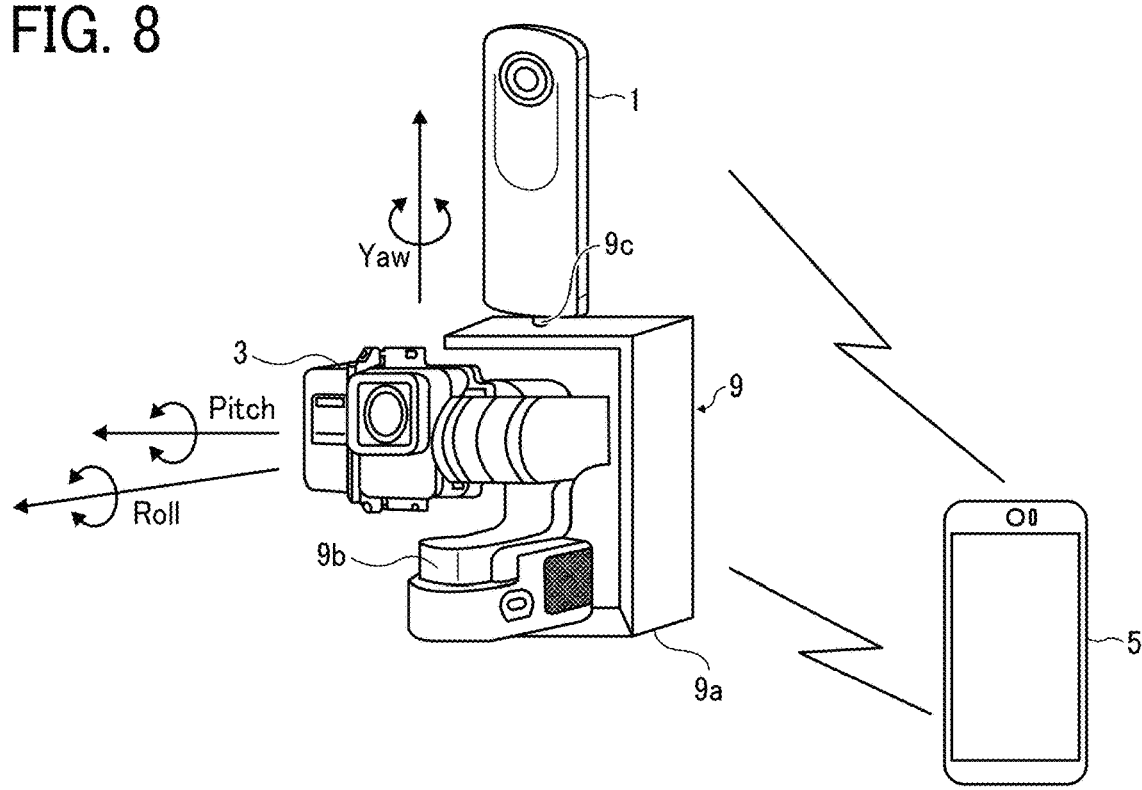
FIG. 8 is a schematic view illustrating an image capturing system according to a first embodiment.

First, referring to FIG. 8, an overview of the image capturing system is described according to the first embodiment. FIG. 8 is a schematic diagram illustrating a configuration of the image capturing system according to the embodiment.

As illustrated in FIG. 8, the image capturing system includes the special image capturing device 1, a general-purpose (generic) capturing device 3, a smart phone 5, and an adapter 9. The special image capturing device 1 is connected to the generic image capturing device 3 via the adapter 9.

The special image capturing device 1 is a special digital camera, which captures an image of an object or surroundings such as scenery to obtain two hemispherical images, from which a spherical (panoramic) image is generated, as described above referring to FIGS. 1 to 7.

The generic image capturing device 3 is a compact digital camera, however, it may be implemented as a digital single-lens reflex camera.

The smart phone 5 is wirelessly communicable with the special image capturing device 1 and the generic image capturing device 3 using short-range wireless communication, such as Wi-Fi, Bluetooth (Registered Trademark), and Near Field Communication (NFC). The smart phone 5 is capable of displaying the images obtained respectively from the special image capturing device 1 and the generic image capturing device 3, on a display 517 provided for the smart phone 5 as described below.

The smart phone 5 may communicate with the special image capturing device 1 and the generic image capturing device 3, without using the short-range wireless communication, but using wired communication such as a cable. The smart phone 5 is an example of an image processing apparatus capable of processing images being captured. Other examples of the image processing apparatus include, but not limited to, a tablet personal computer (PC), a note PC, and a desktop PC. The smart phone 5 may operate as a communication terminal described below.

The adapter 9 includes a bracket 9a and a rotation mechanism 9b. The bracket 9a has a tripod screw 9c at its distal end, which is used for connecting to the tripod mount hole 151 of the special image capturing device 1. The bracket 9a further has the rotation mechanism 9b at its base end. The rotation mechanism 9b, to which the generic image capturing device 3 is attached, rotates the generic image capturing device 3 in three axial directions of Pitch, Yaw, and Roll as illustrated in FIG. 8.

Figure 9:
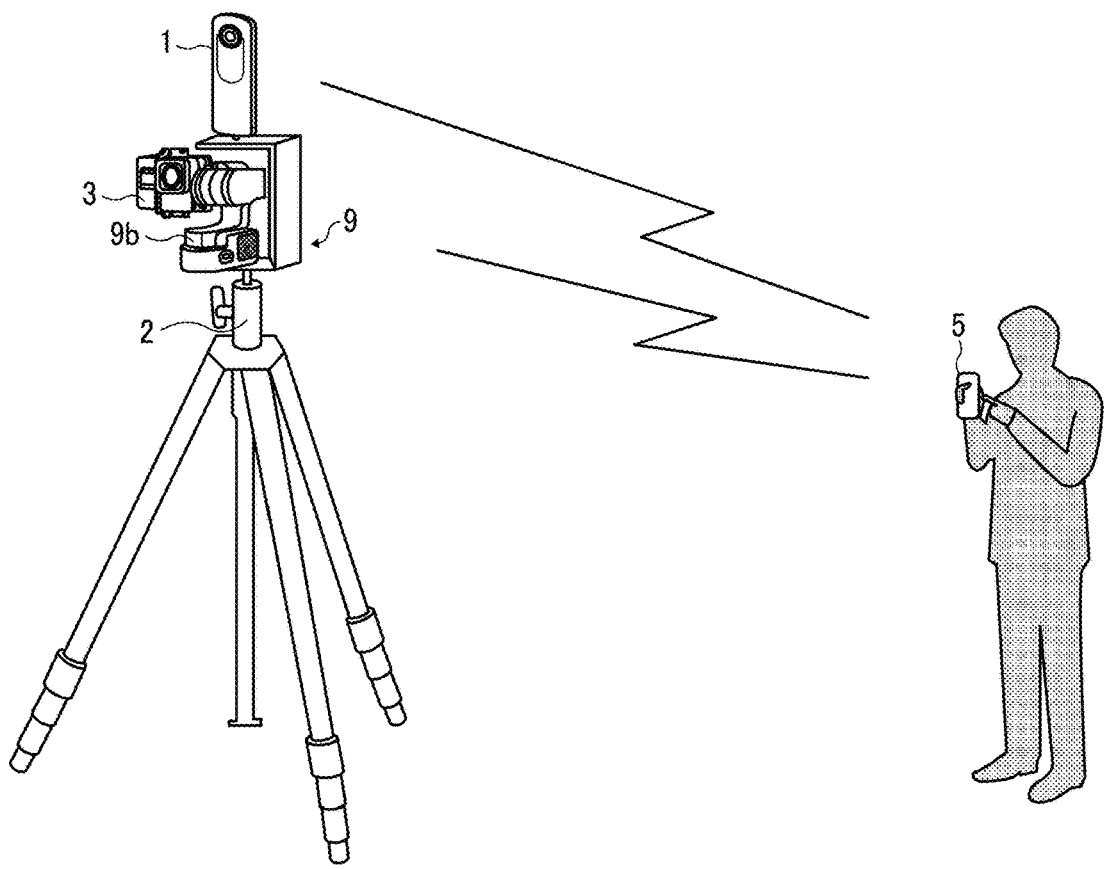
FIG. 9 illustrates how a user uses the image capturing system, according to the first embodiment.

FIG. 9 illustrates how a user uses the image capturing system of FIG. 8, according to the embodiment. As illustrated in FIG. 9, the user connects, to the tripod 2, the adapter 9 to which the special image capturing device 1 and the generic image capturing device 3 are attached. The user may operate the smart phone 5 to remotely control operation of the rotation mechanism 9b, or to start or end capturing of images using the special image capturing device 1 or the generic image capturing device 3. In alternative to the tripod 2, any structure such as a base for installation may be used to secure the generic image capturing device 3 or the special image capturing device 1.

<Hardware Configuration>

Figure 10:
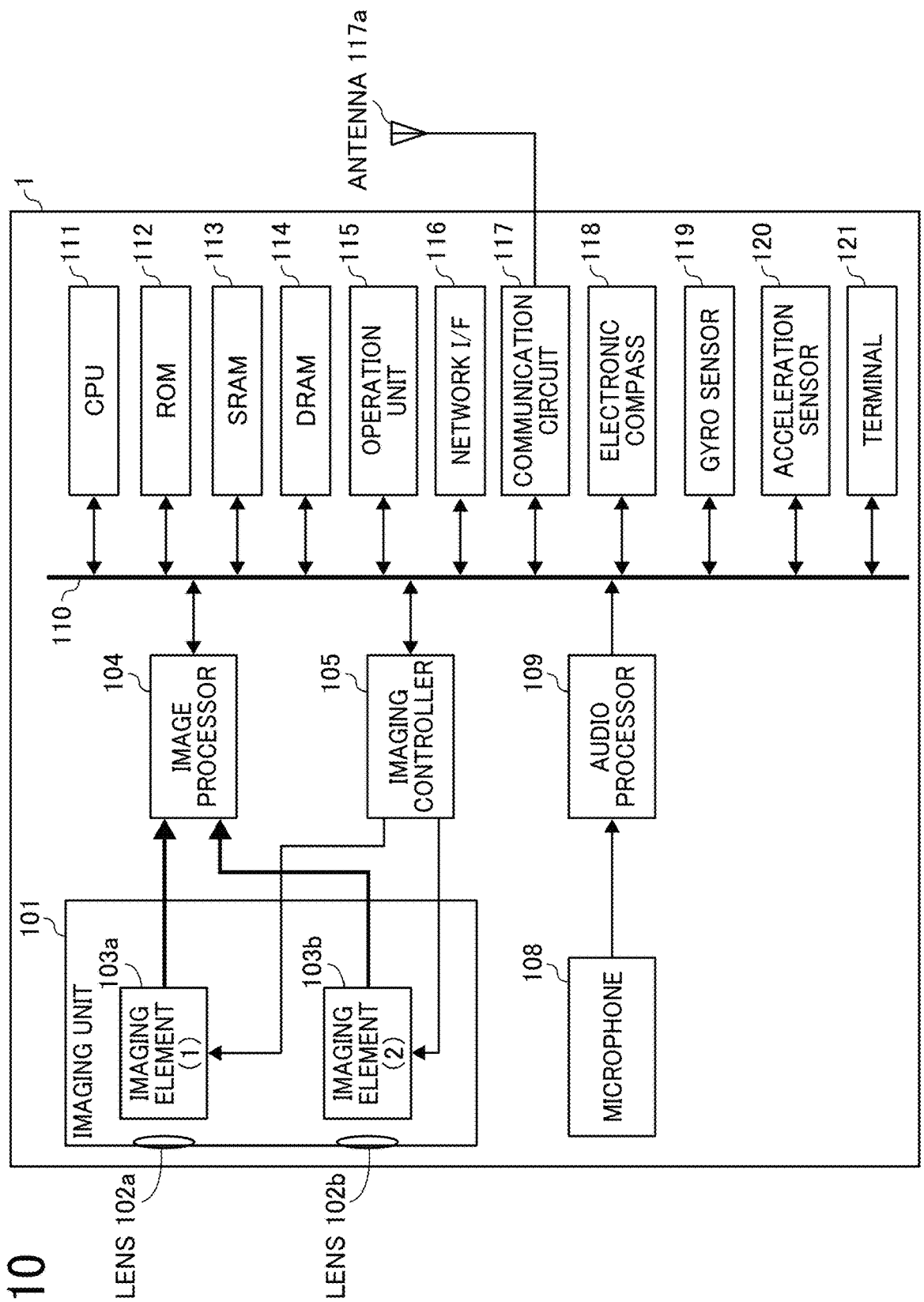
FIG. 10 is a schematic block diagram illustrating a hardware configuration of a special-purpose image capturing device according to the first embodiment.
Figure 11:
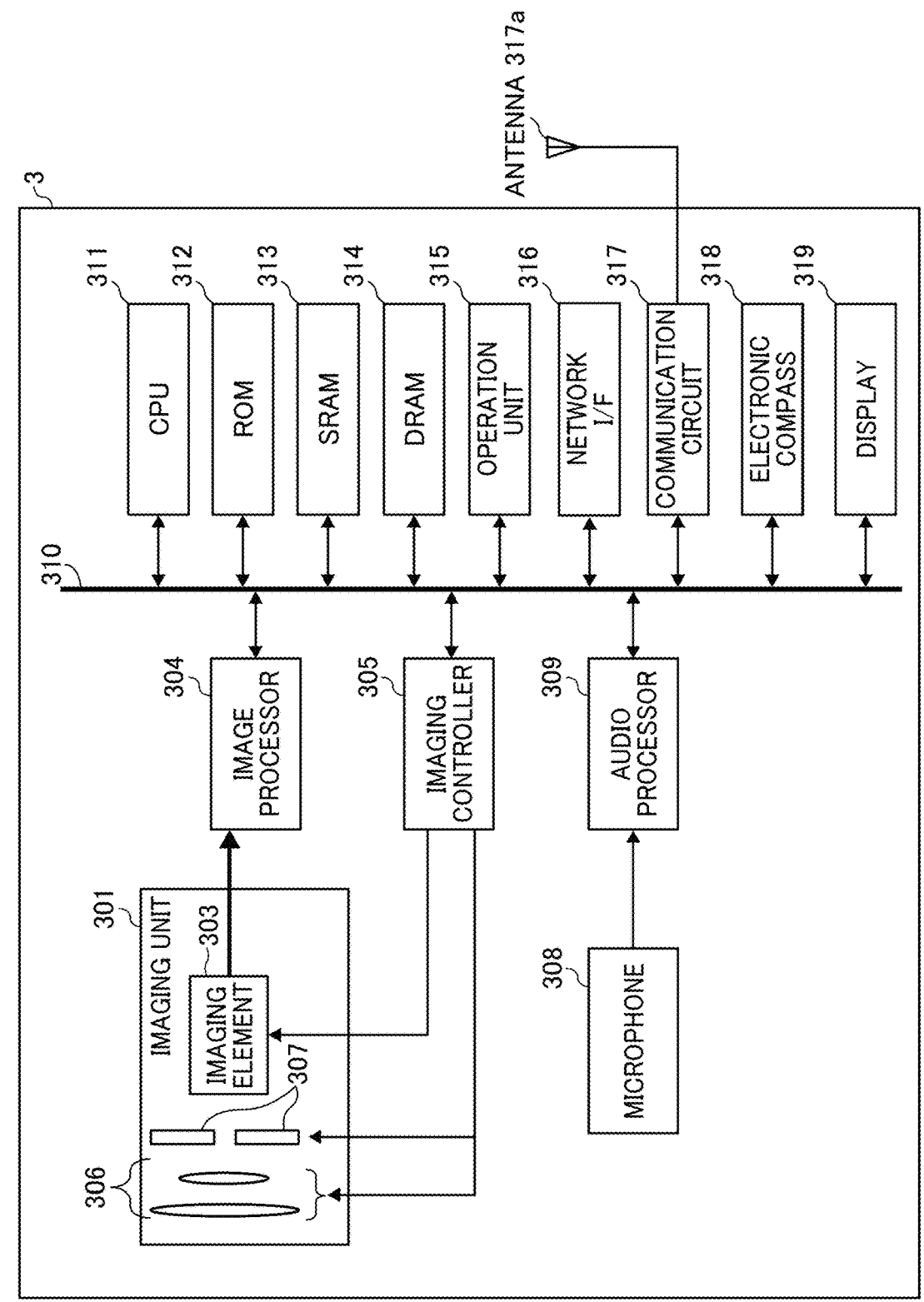
FIG. 11 is a schematic block diagram illustrating a hardware configuration of a general-purpose image capturing device according to the first embodiment.
Figure 12:
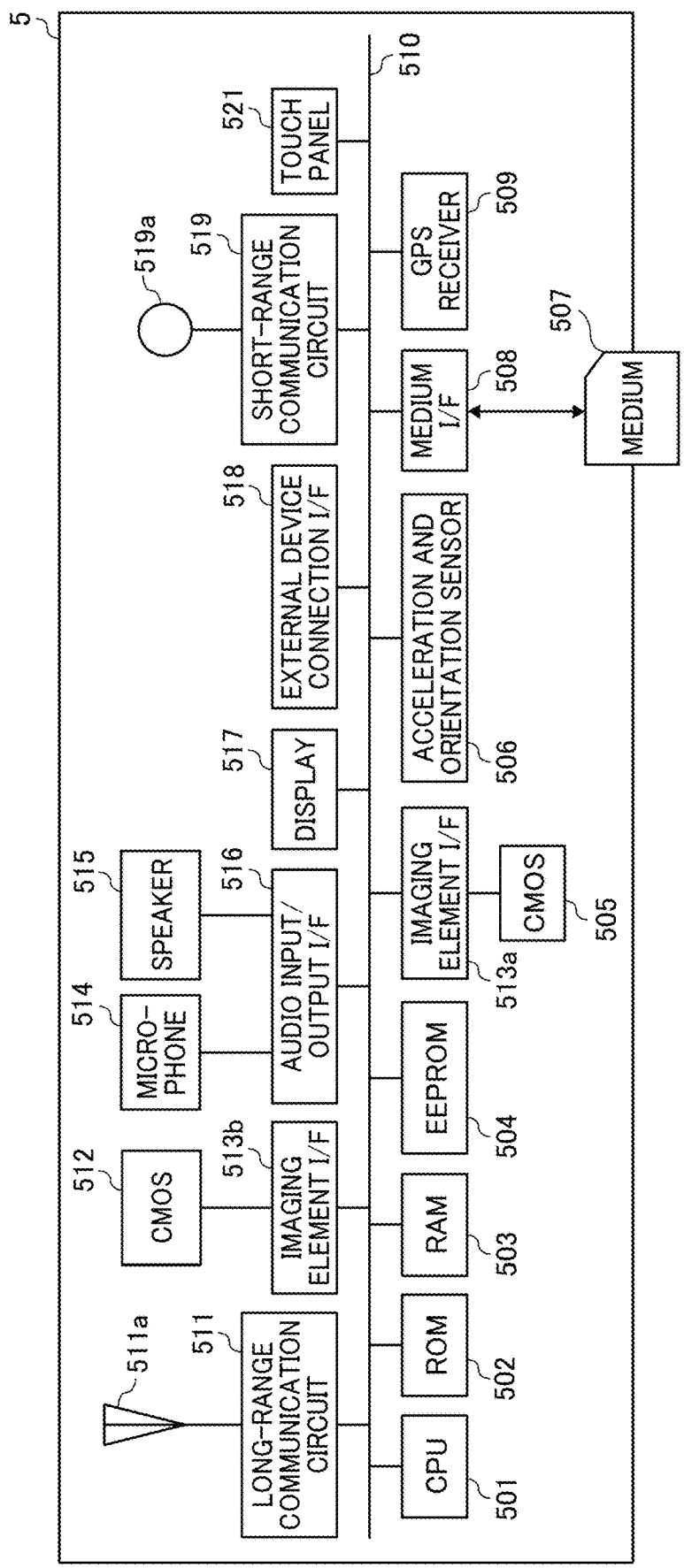
FIG. 12 is a schematic block diagram illustrating a hardware configuration of a smart phone, according to the first embodiment.

Next, referring to FIGS. 10 to 12, hardware configurations of the special image capturing device 1, generic image capturing device 3, and smart phone 5 are described according to the embodiment.

<Hardware Configuration of Special Image Capturing Device>

As illustrated in FIG. 10, the special image capturing device 1 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, the operation unit 115, a network interface (I/F) 116, a communication circuit 117, an antenna 117a, an electronic compass 118, a gyro sensor 119, an acceleration sensor 120, and a Micro USB terminal 121.

The imaging unit 101 includes two wide-angle lenses (so-called fish-eye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. The imaging elements 103a and 103b each includes an imaging sensor such as a complementary metal oxide semiconductor (CMOS) sensor and a charge-coupled device (CCD) sensor, a timing generation circuit, and a group of registers. The imaging sensor converts an optical image formed by the wide-angle lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an I2C bus. The image processor 104, the imaging controller 105, and the audio processor 109 are each connected to the CPU 111 via a bus 110. Furthermore, the ROM 112, the SRAM 113, the DRAM 114, the operation unit 115, the network I/F 116, the communication circuit 117, the electronic compass 118, and the terminal 121 are also connected to the bus 110.

The image processor 104 acquires image data from each of the imaging elements 103a and 103b via the parallel I/F bus and performs predetermined processing on each image data. Thereafter, the image processor 104 combines these image data to generate data of the equirectangular projection image as illustrated in FIG. 3C.

The imaging controller 105 usually functions as a master device while the imaging elements 103a and 103b each usually functions as a slave device. The imaging controller 105 sets commands and the like in the group of registers of the imaging elements 103a and 103b via the serial I/F bus such as the I2C bus. The imaging controller 105 receives various commands from the CPU 111. Further, the imaging controller 105 acquires status data and the like of the group of registers of the imaging elements 103a and 103b via the serial I/F bus such as the I2C bus. The imaging controller 105 sends the acquired status data and the like to the CPU 111. The imaging controller 105 instructs the imaging elements 103a and 103b to output the image data at a time when the shutter button 115a of the operation unit 115 is pressed. In some cases, the special image capturing device 1 is capable of displaying a preview image on a display (e.g., the display of the smart phone 5) or displaying a moving image (movie). In case of displaying movie, the image data are continuously output from the imaging elements 103a and 103b at a predetermined frame rate (frames per minute).

Furthermore, the imaging controller 105 operates in cooperation with the CPU 111 to synchronize the time when the imaging element 103a outputs image data and the time when the imaging element 103b outputs the image data. It should be noted that, although the special image capturing device 1 does not include a display in this embodiment, the special image capturing device 1 may include the display.

The microphone 108 converts sounds to audio data (signal). The audio processor 109 acquires the audio data output from the microphone 108 via an I/F bus and performs predetermined processing on the audio data.

The CPU 111 controls entire operation of the special image capturing device 1, for example, by performing predetermined processing. The ROM 112 stores various programs for execution by the CPU 111. The SRAM 113 and the DRAM 114 each operates as a work memory to store programs loaded from the ROM 112 for execution by the CPU 111 or data in current processing. More specifically, in one example, the DRAM 114 stores image data currently processed by the image processor 104 and data of the equirectangular projection image on which processing has been performed.

The operation unit 115 collectively refers to various operation keys, such as a shutter button. In addition to the hardware keys, the operation unit 115 may also include a touch panel. The user operates the operation unit 115 to input various image capturing (photographing) modes or image capturing (photographing) conditions.

The network I/F 116 collectively refers to an interface circuit such as a USB I/F that allows the special image capturing device 1 to communicate data with an external medium such as an SD card or an external personal computer. The network I/F 116 supports at least one of wired and wireless communications. The data of the equirectangular projection image, which is stored in the DRAM 114, is stored in the external medium via the network I/F 116 or transmitted to the external device such as the smart phone 5 via the network I/F 116, at any desired time.

The communication circuit 117 communicates data with the external device such as the smart phone 5 via the antenna 117a of the special image capturing device 1 by short-range wireless communication such as Wi-Fi, NFC, and Bluetooth. The communication circuit 117 is also capable of transmitting the data of equirectangular projection image to the external device such as the smart phone 5.

The electronic compass 118 calculates an orientation of the special image capturing device 1 from the Earth's magnetism to output orientation information. This orientation information is an example of related information, which is metadata described in compliance with Exif. This information is used for image processing such as image correction of captured images. The related information also includes a date and time when the image is captured by the special image capturing device 1, and a size of the image data.

The gyro sensor 119 detects the change in tilt of the special image capturing device 1 (roll, pitch, yaw) with movement of the special image capturing device 1. The change in angle is one example of related information (metadata) described in compliance with Exif. This information is used for image processing such as image correction of captured images.

The acceleration sensor 120 detects acceleration in three axial directions. The position (an angle with respect to the direction of gravity) of the special image capturing device 1 is determined, based on the detected acceleration. With the gyro sensor 119 and the acceleration sensor 120, accuracy in image correction improves.

The Micro USB terminal 121 is a connector (with a recess) to be connected with such as a Micro USB cable, or other electronic device.

<Hardware Configuration of Generic Image Capturing Device>

Next, referring to FIG. 11, a hardware configuration of the generic image capturing device 3 is described according to the embodiment. FIG. 11 illustrates the hardware configuration of the generic image capturing device 3. As illustrated in FIG. 11, the generic image capturing device 3 includes an imaging unit 301, an image processor 304, an imaging controller 305, a microphone 308, an audio processor 309, a bus 310, a CPU 311, a ROM 312, a SRAM 313, a DRAM 314, an operation unit 315, a network I/F 316, a communication circuit 317, an antenna 317a, an electronic compass 318, and a display 319. The image processor 304 and the imaging controller 305 are each connected to the CPU 311 via the bus 310.

The elements 304, 310, 311, 312, 313, 314, 315, 316, 317, 317a, and 318 of the generic image capturing device 3 are substantially similar in structure and function to the elements 104, 110, 111, 112, 113, 114, 115, 116, 117, 117a, and 118 of the special image capturing device 1 illustrated in FIG. 10, such that the description thereof is omitted.

Further, as illustrated in FIG. 11, in the imaging unit 301 of the generic image capturing device 3, a lens unit 306 having a plurality of lenses, a mechanical shutter button 307, and the imaging element 303 are disposed in this order from a side facing the outside (that is, a side to face the object to be captured).

The imaging controller 305 is substantially similar in structure and function to the imaging controller 105. The imaging controller 305 further controls operation of the lens unit 306 and the mechanical shutter button 307, according to user operation input through the operation unit 315.

The display 319 is capable of displaying an operational menu, an image being captured, or an image that has been captured, etc.

<Hardware Configuration of Smart Phone>

Referring to FIG. 12, a hardware configuration of the smart phone 5 is described according to the embodiment. FIG. 12 illustrates the hardware configuration of the smart phone 5. As illustrated in FIG. 12, the smart phone 5 includes a CPU 501, a ROM 502, a RAM 503, an EEPROM 504, a Complementary Metal Oxide Semiconductor (CMOS) sensor 505, an imaging element I/F 513a, an acceleration and orientation sensor 506, a medium I/F 508, and a GPS receiver 509.

The CPU 501 controls entire operation of the smart phone 5. The ROM 502 stores a control program for controlling the CPU 501 such as an IPL. The RAM 503 is used as a work area for the CPU 501. The EEPROM 504 reads or writes various data such as a control program for the smart phone 5 under control of the CPU 501. The CMOS sensor 505 captures an object (for example, the user operating the smart phone 5) under control of the CPU 501 to obtain captured image data. The imaging element I/F 513a is a circuit that controls driving of the CMOS sensor 505. The acceleration and orientation sensor 506 includes various sensors such as an electromagnetic compass for detecting geomagnetism, a gyrocompass, and an acceleration sensor. The medium I/F 508 controls reading or writing of data with respect to a recording medium 507 such as a flash memory. The GPS receiver 509 receives a GPS signal from a GPS satellite.

The smart phone 5 further includes a long-range communication circuit 511, an antenna 511a for the long-range communication circuit 511, a CMOS sensor 512, an imaging element I/F 513b, a microphone 514, a speaker 515, an audio input/output I/F 516, a display 517, an external device connection I/F 518, a short-range communication circuit 519, an antenna 519a for the short-range communication circuit 519, and a touch panel 521.

The long-range communication circuit 511 is a circuit that communicates with other device through the communication network 100. The CMOS sensor 512 is an example of a built-in imaging device capable of capturing a subject under control of the CPU 501. The imaging element I/F 513a is a circuit that controls driving of the CMOS sensor 512. The microphone 514 is an example of built-in audio collecting device capable of inputting audio under control of the CPU 501. The audio I/O I/F 516 is a circuit for inputting or outputting an audio signal between the microphone 514 and the speaker 515 under control of the CPU 501. The display 517 may be a liquid crystal or organic electro luminescence (EL) display that displays an image of a subject, an operation icon, or the like. The external device connection I/F 518 is an interface circuit that connects the smart phone 5 to various external devices. The short-range communication circuit 519 is a communication circuit that communicates in compliance with the Wi-Fi, NFC, Bluetooth, and the like. The touch panel 521 is an example of input device that enables the user to input a user instruction through touching a screen of the display 517.

The smart phone 5 further includes a bus line 510. Examples of the bus line 510 include an address bus and a data bus, which electrically connects the elements such as the CPU 501.

<Functional Configuration of Image Capturing System>

Figure 13:
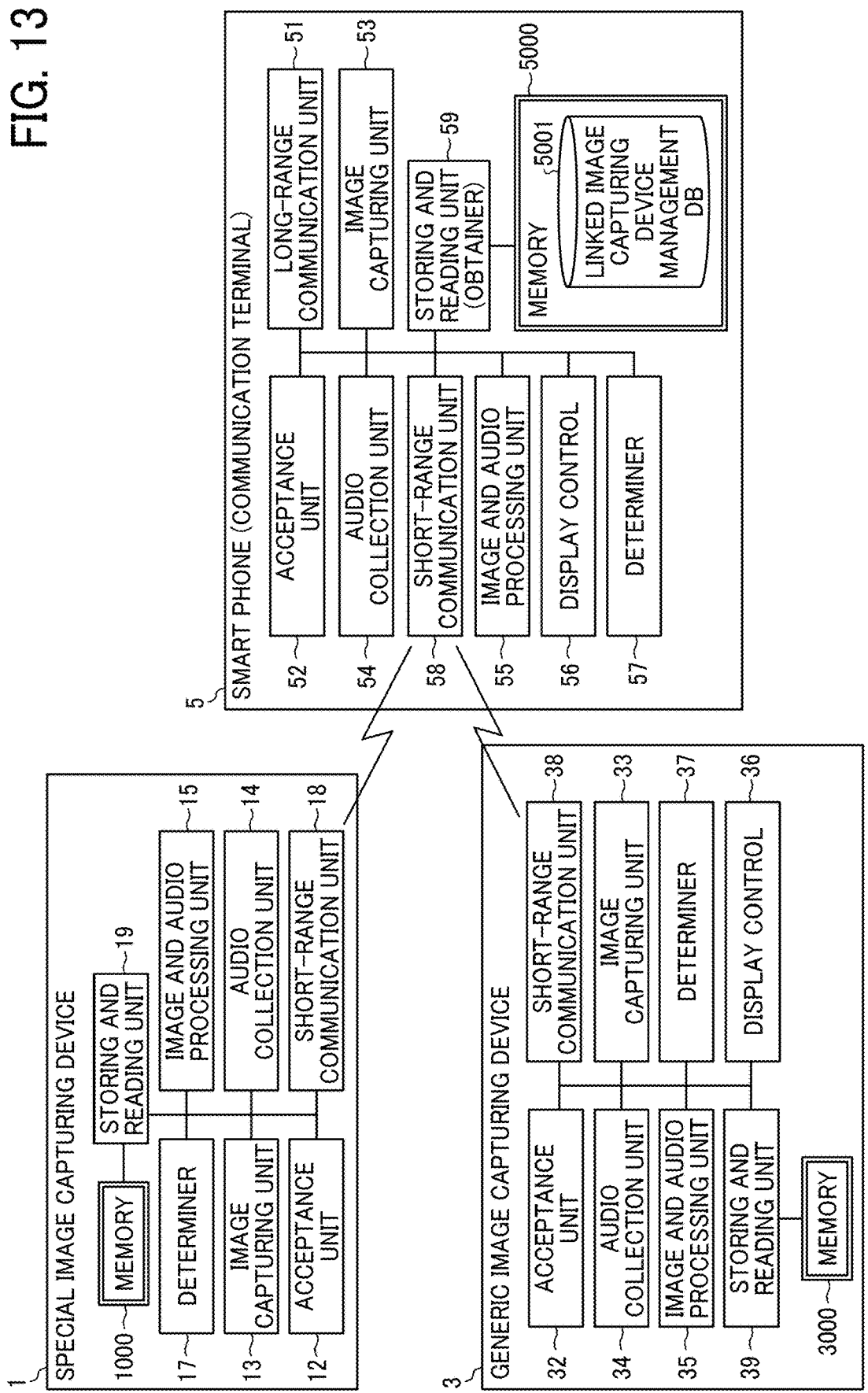
FIG. 13 is a functional block diagram of the image capturing system according to the first embodiment.

Referring now to FIGS. 10 to 13, a functional configuration of the image capturing system is described according to the embodiment. FIG. 13 is a schematic block diagram illustrating functional configurations of the special image capturing device 1, generic image capturing device 3, and smart phone 5, in the image capturing system, according to the embodiment.

<Functional Configuration of Special Image Capturing Device>

Referring to FIGS. 10 and 13, a functional configuration of the special image capturing device 1 is described according to the embodiment. As illustrated in FIG. 13, the special image capturing device 1 includes an acceptance unit 12, an image capturing unit 13, an audio collection unit 14, an image and audio processing unit 15, a determiner 17, a short-range communication unit 18, and a storing and reading unit 19. These units are functions that are implemented by or that are caused to function by operating any of the elements illustrated in FIG. 10 in cooperation with the instructions of the CPU 111 according to the special image capturing device control program expanded from the SRAM 113 to the DRAM 114.

The special image capturing device 1 further includes a memory 1000, which is implemented by the ROM 112, the SRAM 113, and the DRAM 114 illustrated in FIG. 10.

Still referring to FIGS. 10 and 13, each functional unit of the special image capturing device 1 is described according to the embodiment.

The acceptance unit 12 of the special image capturing device 1 is implemented by the operation unit 115 illustrated in FIG. 10, which operates under control of the CPU 111. The acceptance unit 12 receives an instruction input from the operation unit 115 according to a user operation.

The image capturing unit 13 is implemented by the imaging unit 101, the image processor 104, and the imaging controller 105, illustrated in FIG. 10, each operating under control of the CPU 111. The image capturing unit 13 captures an image of the object or surroundings to obtain captured image data. As the captured image data, the two hemispherical images, from which the spherical image is generated, are obtained as illustrated in FIGS. 3A and 3B.

The audio collection unit 14 is implemented by the microphone 108 and the audio processor 109 illustrated in FIG. 10, each of which operates under control of the CPU 111. The audio collection unit 14 collects sounds around the special image capturing device 1.

The image and audio processing unit 15 is implemented by the instructions of the CPU 111, illustrated in FIG. 10. The image and audio processing unit 15 applies image processing to the captured image data obtained by the image capturing unit 13. The image and audio processing unit 15 applies audio processing to audio obtained by the audio collection unit 14. For example, the image and audio processing unit 15 generates data of the equirectangular projection image (FIG. 3C), using two hemispherical images (FIGS. 3A and 3B) respectively obtained by the imaging elements 103a and 103b.

The determiner 17, which is implemented by instructions of the CPU 111, performs various determinations.

The short-range communication unit 18, which is implemented by instructions of the CPU 111, and the communication circuit 117 with the antenna 117a, communicates data with a short-range communication unit 58 of the smart phone 5 using the short-range wireless communication in compliance with such as Wi-Fi.

The storing and reading unit 19, which is implemented by instructions of the CPU 111 illustrated in FIG. 10, stores various data or information in the memory 1000 or reads out various data or information from the memory 1000.

<Functional Configuration of Generic Image Capturing Device>

Next, referring to FIGS. 11 and 13, a functional configuration of the generic image capturing device 3 is described according to the embodiment. As illustrated in FIG. 13, the generic image capturing device 3 includes an acceptance unit 32, an image capturing unit 33, an audio collection unit 34, an image and audio processing unit 35, a display control 36, a determiner 37, a short-range communication unit 38, and a storing and reading unit 39. These units are functions that are implemented by or that are caused to function by operating any of the elements illustrated in FIG. 11 in cooperation with the instructions of the CPU 311 according to the image capturing device control program expanded from the SRAM 313 to the DRAM 314.

The generic image capturing device 3 further includes a memory 3000, which is implemented by the ROM 312, the SRAM 313, and the DRAM 314 illustrated in FIG. 11.

The acceptance unit 32 of the generic image capturing device 3 is implemented by the operation unit 315 illustrated in FIG. 11, which operates under control of the CPU 311. The acceptance unit 32 receives an instruction input from the operation unit 315 according to a user operation.

The image capturing unit 33 is implemented by the imaging unit 301, the image processor 304, and the imaging controller 305, illustrated in FIG. 11, each of which operates under control of the CPU 311. The image capturing unit 13 captures an image of the object or surroundings to obtain captured image data. In this example, the captured image data is planar image data, captured with a perspective projection method (format).

The audio collection unit 34 is implemented by the microphone 308 and the audio processor 309 illustrated in FIG. 11, each of which operates under control of the CPU 311. The audio collection unit 34 collects sounds around the generic image capturing device 3.

The image and audio processing unit 35 is implemented by the instructions of the CPU 311, illustrated in FIG. 12. The image and audio processing unit 35 applies image processing to the captured image data obtained by the image capturing unit 33. The image and audio processing unit 35 applies audio processing to audio obtained by the audio collection unit 34.

The display control 36, which is implemented by the instructions of the CPU 311 illustrated in FIG. 11, controls the display 319 to display a planar image P based on the captured image data that is being captured or that has been captured.

The determiner 37, which is implemented by instructions of the CPU 311, performs various determinations. For example, the determiner 37 determines whether the shutter button 315a has been pressed by the user.

The short-range communication unit 38, which is implemented by instructions of the CPU 311, and the communication circuit 317 with the antenna 317a, communicates data with the short-range communication unit 58 of the smart phone 5 using the short-range wireless communication in compliance with such as Wi-Fi.

The storing and reading unit 39, which is implemented by instructions of the CPU 311 illustrated in FIG. 11, stores various data or information in the memory 3000 or reads out various data or information from the memory 3000.

<Functional Configuration of Smart Phone>

Referring now to FIGS. 12 to 16, a functional configuration of the smart phone 5 is described according to the embodiment. As illustrated in FIG. 12, the smart phone 5 includes a long-range communication unit 51, an acceptance unit 52, an image capturing unit 53, an audio collection unit 54, an image and audio processing unit 55, a display control 56, a determiner 57, the short-range communication unit 58, and a storing and reading unit 59. These units are functions that are implemented by or that are caused to function by operating any of the hardware elements illustrated in FIG. 12 in cooperation with the instructions of the CPU 501 according to the control program for the smart phone 5, expanded from the EEPROM 504 to the RAM 503.

Figures 14A, 14B:
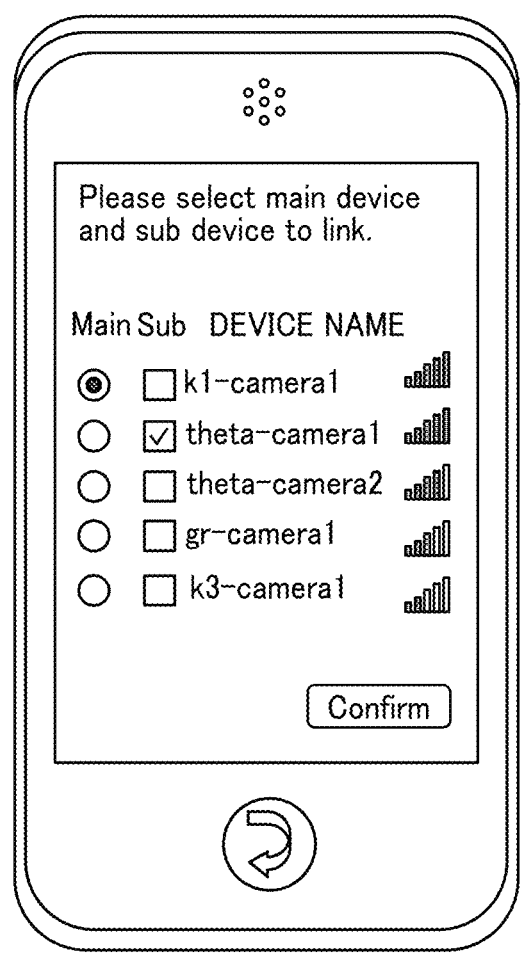
FIG. 14A is a conceptual diagram illustrating a linked image capturing device management table, according to the first embodiment.
FIG. 14B is a conceptual diagram illustrating a linked image capturing device configuration screen, according to the first embodiment.

The smart phone 5 further includes a memory 5000, which is implemented by the ROM 502, RAM 503 and EEPROM 504 illustrated in FIG. 12. The memory 5000 stores a linked image capturing device management DB 5001. The linked image capturing device management DB 5001 is implemented by a linked image capturing device management table illustrated in FIG. 14A. FIG. 14A is a conceptual diagram illustrating the linked image capturing device management table, according to the embodiment.

Referring now to FIG. 14A, the linked image capturing device management table is described according to the embodiment. As illustrated in FIG. 14A, the linked image capturing device management table stores, for each image capturing device, linking information indicating a relation to the linked image capturing device, an IP address of the image capturing device, and a device name of the image capturing device, in association with one another. The linking information indicates whether the image capturing device is "main" device or "sub" device in performing the linking function. The image capturing device as the "main" device, starts capturing the image in response to pressing of the shutter button provided for that device. The image capturing device as the "sub" device, starts capturing the image in response to pressing of the shutter button provided for the "main" device. The IP address is one example of destination information of the image capturing device. The IP address is used in case the image capturing device communicates using Wi-Fi. Alternatively, a manufacturer's identification (ID) or a product ID may be used in case the image capturing device communicates using a wired USB cable. Alternatively, a Bluetooth Device (BD) address is used in case the image capturing device communicates using wireless communication such as Bluetooth.

The long-range communication unit 51 of the smart phone 5 is implemented by the long-range communication circuit 511 that operates under control of the CPU 501, illustrated in FIG. 12, to transmit or receive various data or information to or from other device (for example, other smart phone or server) through a communication network such as the Internet.

The acceptance unit 52 is implement by the touch panel 521, which operates under control of the CPU 501, to receive various selections or inputs from the user. While the touch panel 521 is provided separately from the display 517 in FIG. 12, the display 517 and the touch panel 521 may be integrated as one device. Further, the smart phone 5 may include any hardware key, such as a button, to receive the user instruction, in addition to the touch panel 521.

The image capturing unit 53 is implemented by the CMOS sensors 505 and 512, which operate under control of the CPU 501, illustrated in FIG. 12. The image capturing unit 13 captures an image of the object or surroundings to obtain captured image data.

In this example, the captured image data is planar image data, captured with a perspective projection method.

The audio collection unit 54 is implemented by the microphone 514 that operates under control of the CPU 501. The audio collecting unit 14a collects sounds around the smart phone 5.

The image and audio processing unit 55 is implemented by the instructions of the CPU 501, illustrated in FIG. 12. The image and audio processing unit 55 applies image processing to an image of the object that has been captured by the image capturing unit 53. The image and audio processing unit 15 applies audio processing to audio obtained by the audio collection unit 54.

The display control 56, which is implemented by the instructions of the CPU 501 illustrated in FIG. 12, controls the display 517 to display the planar image P based on the captured image data that is being captured or that has been captured by the image capturing unit 53. The display control 56 superimposes the planar image P, on the spherical image CE, using superimposed display metadata, generated by the image and audio processing unit 55. As described below in detail, in superimposing, the display control 56 refers to the location parameter, to determine a location where the planar image P is superimposed on the spherical image CE. For example, the display control 56 refers to a reference location parameter defining a reference location, and a shape conversion parameter defining conversion processing to be applied to the reference location parameter, to obtain the location parameter. In this example, the location parameter is one example location information.

Further, the display control 56 refers to a correction parameter to correct the brightness and color values of the images to be displayed. In this example, the location parameter is one example of location information. The correction parameter is one example of correction information.

The determiner 57 is implemented by the instructions of the CPU 501, illustrated in FIG. 12, to perform various determinations.

The short-range communication unit 58, which is implemented by instructions of the CPU 501, and the short-range communication circuit 519 with the antenna 519a, communicates data with the short-range communication unit 18 of the special image capturing device 1, and the short-range communication unit 38 of the generic image capturing device 3, using the short-range wireless communication in compliance with such as Wi-Fi.

The storing and reading unit 59, which is implemented by instructions of the CPU 501 illustrated in FIG. 12, stores various data or information in the memory 5000 or reads out various data or information from the memory 5000. For example, the superimposed display metadata may be stored in the memory 5000. In this embodiment, the storing and reading unit 59 functions as an obtainer that obtains various data from the memory 5000.

Figure 18:
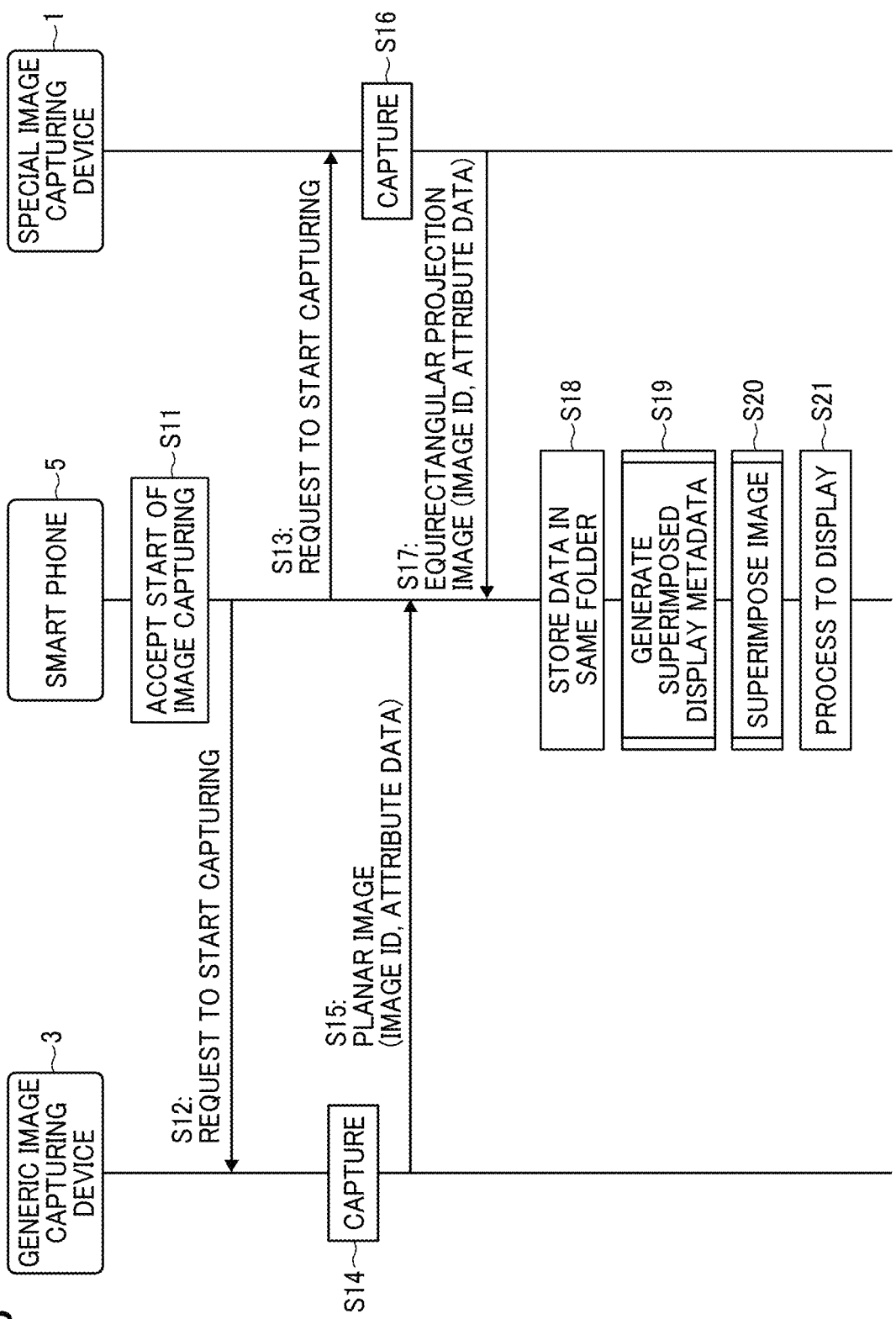
FIG. 18 is a data sequence diagram illustrating operation of capturing the images and processing the images for display, performed by the image capturing system, according to the first embodiment.

The image and audio processing unit 55 includes a metadata generator 55a that performs encoding, and a superimposing unit 55b that performs decoding. In this example, the encoding corresponds to processing to generate metadata to be used for superimposing images for display ("superimposed display metadata"). Further, in this example, the decoding corresponds to processing to generate images for display using the superimposed display metadata. The metadata generator 55a pertains processing of S19, which is processing to generate superimposed display metadata, as illustrated in FIG. 18. The superimposing unit 55b performs processing of S20, which is processing to superimpose the images using the superimposed display metadata, as illustrated in FIG. 18.

Further, the following example describes a case in which a planar image P (example of second image) is superimposed on a spherical image CE (example of first image), each of images being a video image. For the descriptive purposes, the planar image may be referred to as a foreground video image, and the spherical image CE may be referred to as a background video image.

Figure 15:
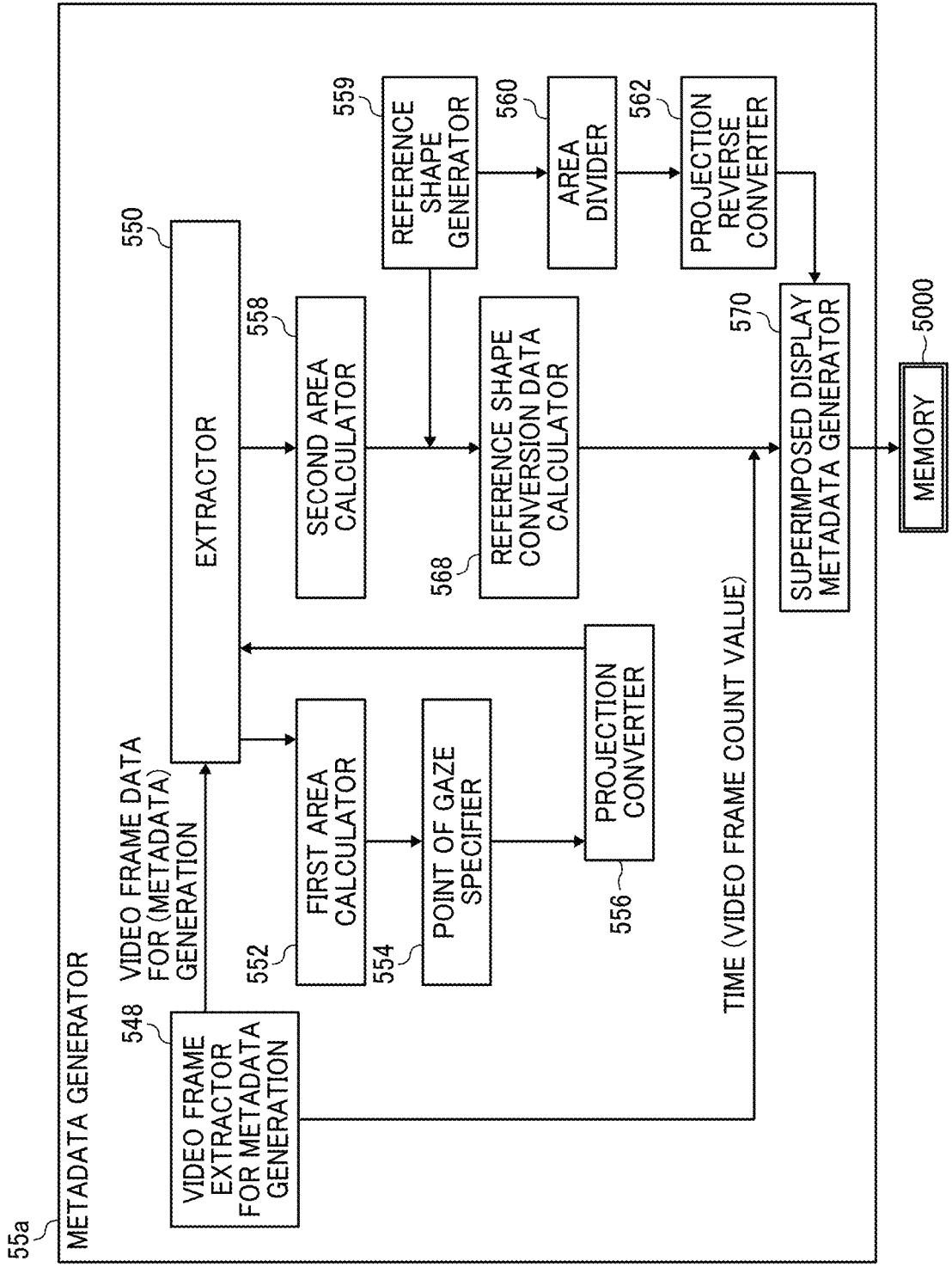
FIG. 15 is a functional block diagram illustrating a metadata generator according to the first embodiment.
Figure 16:
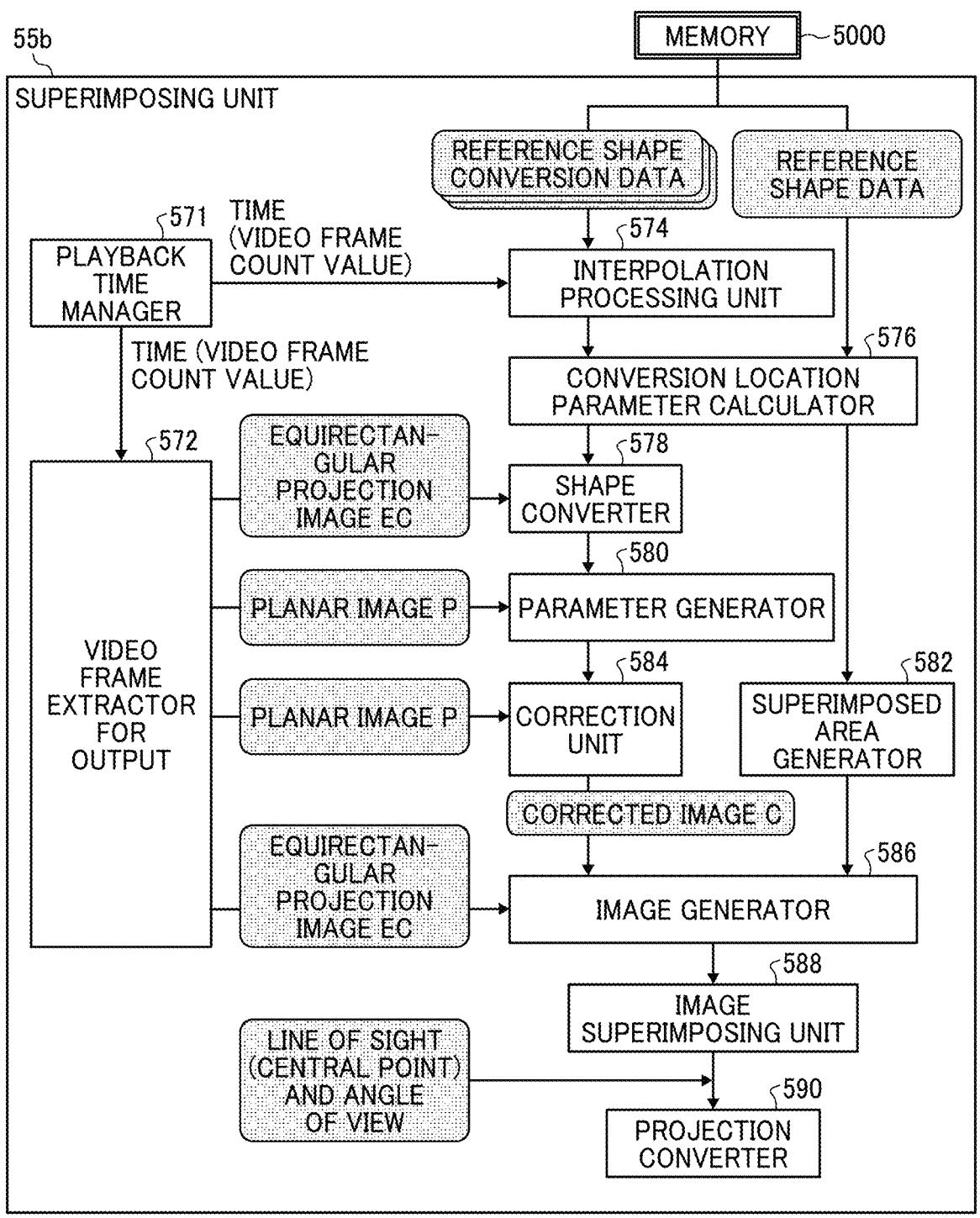
FIG. 16 is a block diagram illustrating a functional configuration of a superimposing unit according to the first embodiment.

Referring to FIGS. 15 and 16, a functional configuration of the image and audio processing unit 55 including the metadata generator 55a and the superimposing unit 55b is described according to the embodiment. FIG. 15 is a block diagram illustrating the functional configuration of the metadata generator 55a according to the first embodiment. FIG. 16 is a block diagram illustrating the functional configuration of the superimposing unit 55b according to the first embodiment.

Figure 19:
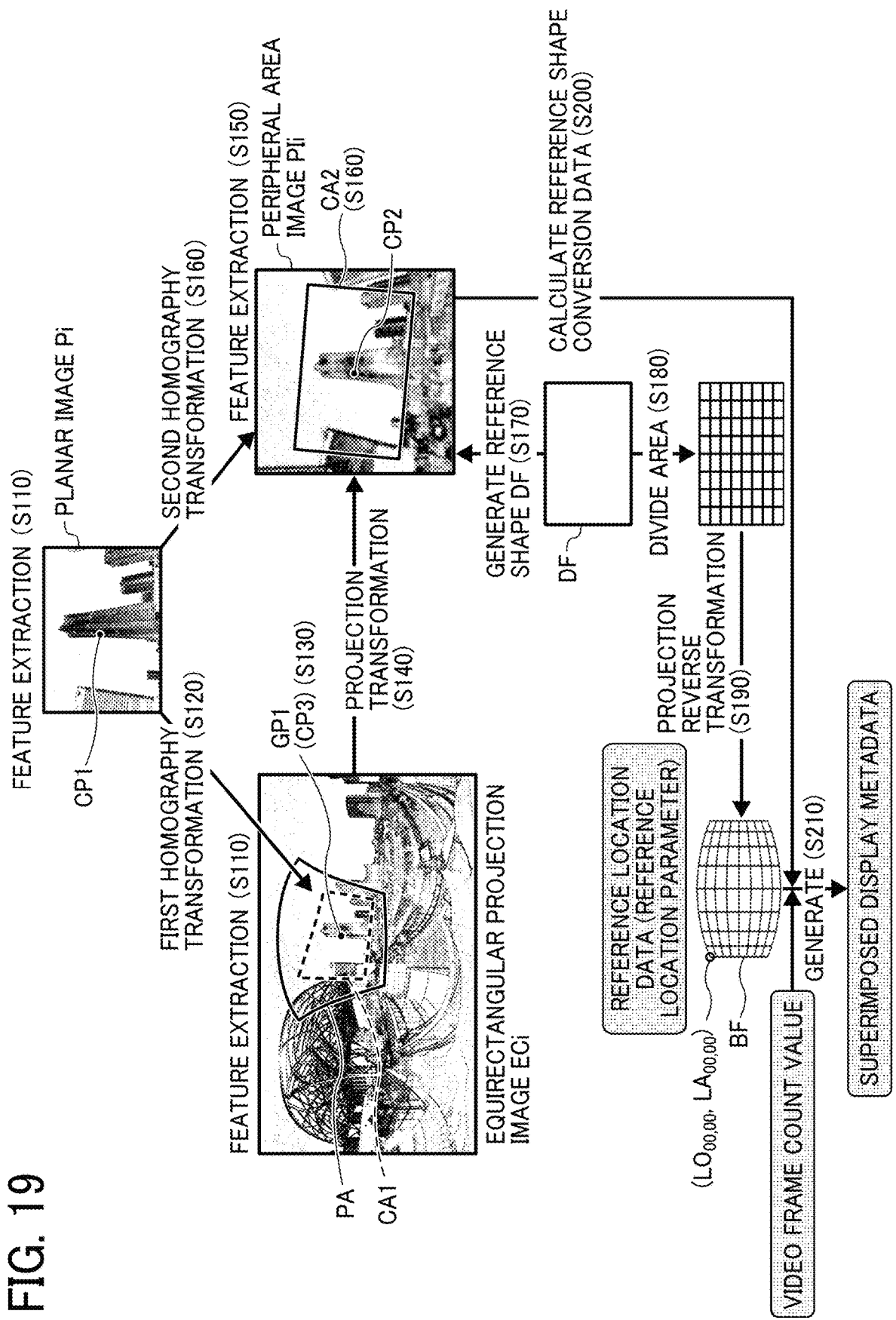
FIG. 19 is a conceptual diagram illustrating operation of generating superimposed display metadata, according to the first embodiment.

First, a functional configuration of the metadata generator 55a is described according to the embodiment. The metadata generator 55a includes a metadata generation video frame extractor 548 (video frame extractor for metadata generation), an extractor 550, a first area calculator 552, a point of gaze specifier 554, a projection converter 556, a second area calculator 558, a reference shape generator 559, an area divider 560, a projection reverse converter 562, a reference shape conversion data calculator 568, and a superimposed display metadata generator 570. FIG. 19 is a conceptual diagram illustrating operation of generating the superimposed display metadata, with images processed or generated in such operation.

The metadata generation video frame extractor 548 extracts a set of frame images corresponding to a specified time, each from the background video image and the foreground video image. The video image, which may be generated in any desired encoding method, is made up of a plurality of still images that are arranged in time-series. The number of still images constituting a video image of one second is referred to as a frame rate, which may be expressed, for example, as the number of frames per second (fps). Assuming that a time when the first frame is captured after start of capturing video is set to the time 0, the metadata generation video frame extractor 548 is able to specify a fame number of a frame image captured at a specified time Ti, from the frame rate and information on the specified time Ti. If there is no frame image captured exactly at the specified time Ti, a frame image preceding or following the specified time Ti may be obtained. In some cases, a frame image extracted from the background video image and a frame image extracted from the foreground video image may have been captured at different times, but these images are selected so as to minimize the time differences. Further, when the times when these frame images have been captured differ, the captured time for any one of the frame images may be corrected to make the captured times to be equal between these two frame images. The time differences may be corrected using any desired method. In one example, for the video images recorded with audio, the metadata generation video frame extractor 548 refers to audio data for each video image, to select a set of frame images in which differences in audio is minimum. If there is no audio being recorded, the metadata generation video frame extractor 548 selects a set of frame images in which differences in image, such as differences in image content, is minimum.

The above-described operation of extracting a set of frame images from the background video image and the foreground video image is described in detail. The following case assumes that the background video image has a frame rate of 30 fps, and the foreground video image has a frame rate of 24 fps. In such case, the metadata generation video frame extractor 548 selects a set of frame images in which differences in audio is minimized. If the frame image for the background video image has been captured 0.5 seconds earlier than the frame image for the foreground video image, the time when the frame rate for the background video image is offset by 15 frames (30 fps*0.5), to make the captured times to be equal between the background video image and the foreground video image. After offset, if frame numbers (frame counts) of the foreground video image for one second is 0, 24, 48, and 72, frame numbers (frame counts) of the background video image for one second after offset processing becomes 15, 45, 75, and 105.

In the following, a frame image of the background video image (that is, the equirectangular projection image EC) captured at the specified time Ti is referred to as the equirectangular projection image ECi, and a frame image of the foreground video image (that is, the planar image P) captured at the specified time Ti is referred to as the planar image Pi. Further, it is assumed that the equirectangular projection image ECi and the planar image Pi are frame images that are assumed to be taken at the same time, which may be corrected as described above.

The extractor 550 extracts feature points according to local features of each of two images having the same object. The feature points are distinctive keypoints in both images. The local features correspond to a pattern or structure detected in the image such as an edge or blob. In this embodiment, the extractor 550 extracts the features points for each of two images that are different from each other. These two images to be processed by the extractor 550 may be the images that have been generated using different image projection methods. Unless the difference in projection methods cause highly distorted images, any desired image projection methods may be used. As described above, in this embodiment, the images are the equirectangular projection image ECi and the planar image Pi, each being a frame of the video image. For example, referring to FIG. 19, the extractor 550 extracts feature points from the rectangular, equirectangular projection image ECi in equirectangular projection (S110), and the rectangular, planar image Pi in perspective projection (S110), based on local features of each of these images including the same object. Further, the extractor 550 extracts feature points from the rectangular, planar image Pi (S110), and a peripheral area image PIi converted by the projection converter 556 (S150), based on local features of each of these images having the same object. In this embodiment, the equirectangular projection method is one example of a first projection method, and the perspective projection method is one example of a second projection method. The equirectangular projection image is one example of the first projection image, and the planar image is one example of the second projection image.

The first area calculator 552 calculates the feature value fv1 based on the plurality of feature points fp1 in the equirectangular projection image ECi. The first area calculator 552 further calculates the feature value fv2 based on the plurality of feature points fp2 in the planar image Pi. The feature values, or feature points, may be detected in any desired method. However, it is desirable that feature values, or feature points, are invariant or robust to changes in scale or image rotation. The first area calculator 552 identifies corresponding points between the images, based on similarity between the feature value fv1 of the feature points fp1 in the equirectangular projection image ECi, and the feature value fv2 of the feature points fp2 in the planar image Pi. Based on the corresponding points between the images, the first area calculator 552 calculates the homography for transformation between the equirectangular projection image ECi and the planar image Pi. The first area calculator 552 then applies first homography transformation to the planar image Pi (S120). Accordingly, the first area calculator 552 obtains a first corresponding area CA1 ("first area CA1"), in the equirectangular projection image ECi, which corresponds to the planar image Pi. In such case, a central point CP1 of a rectangle defined by four vertices of the planar image Pi, is converted to the point of gaze GP1 in the equirectangular projection image ECi, by the first homography transformation.

Here, the coordinates of four vertices p1, p2, p3, and p4 of the planar image Pi are p1=(x1, y1), p2=(x2, y2), p3=(x3, y3), and p4=(x4, y4). The first area calculator 552 calculates the central point CP1 (x, y) using the equation 2 below.

$$S1=\{(x4-x2)*(y1-y2)-(y4-y2)*(x1-x2)\}/2, S2=\{(x4-x2)*(y2-y3)-(y4-y2)*(x2-x3)\}/2, x=x1+(x3-x1)*S1/(S1+S2), y=y1+(y3-y1)*S1/(S1+S2)$$ (Equation 2)

While the planar image Pi is a rectangle in the case of FIG. 19, the central point CP1 may be calculated using the equation 2 with an intersection of diagonal lines of the planar image Pi, even when the planar image Pi is a square, trapezoid, or rhombus. When the planar image Pi has a shape of rectangle or square, the central point of the diagonal line may be set as the central point CP1. In such case, the central points of the diagonal lines of the vertices p1 and p3 are calculated, respectively, using the equation 3 below.

$$x=(x1+x3)/2, y=(y1+y3)/2$$ (Equation 3)

The point of gaze specifier 554 identifies the point (referred to as the point of gaze) in the equirectangular projection image ECi, which corresponds to the central point CP1 of the planar image Pi after the first homography transformation (S130).

Here, the point of gaze GP1 is expressed as a coordinate on the equirectangular projection image ECi. The coordinate of the point of gaze GP1 may be transformed to the latitude and longitude. Specifically, a coordinate in the vertical direction of the equirectangular projection image ECi is expressed as a latitude in the range of −90 degree (−0.5π) to +90 degree (+0.5π). Further, a coordinate in the horizontal direction of the equirectangular projection image ECi is expressed as a longitude in the range of −180 degree (−π) to +180 degree (+π). With this transformation, the coordinate of each pixel, according to the image size of the equirectangular projection image ECi, can be calculated from the latitude and longitude system.

The projection converter 556 extracts a peripheral area PA, which is a part surrounding the point of gaze GP1, from the equirectangular projection image ECi. The projection converter 556 converts the peripheral area PA, from the equirectangular projection to the perspective projection, to generate a peripheral area image PIi (S140). The peripheral area PA is determined, such that, after projection transformation, the square-shaped, peripheral area image PIi (See FIG. 20B) has a vertical angle of view α (or a horizontal angle of view), which is the same as the diagonal angle of view α of the planar image Pi (taken at a particular time) (See FIG. 20A). Here, the central point CP2 of the peripheral area image PIi corresponds to the point of gaze GP1.

(Transformation of Projection)

The following describes transformation of a projection, performed at S140 of FIG. 19, in detail. As described above referring to FIGS. 3 to 5, the equirectangular projection image ECi covers a surface of the sphere CS, to generate the spherical image CE. Therefore, each pixel in the equirectangular projection image ECi corresponds to each pixel in the surface of the sphere CS, that is, the three-dimensional, spherical image. The projection converter 556 applies the following transformation equation. Here, the coordinate system used for the equirectangular projection image ECi is expressed with (latitude, longitude)=(ea, aa), and the rectangular coordinate system used for the three-dimensional sphere CS is expressed with (x, y, z).

$$(x,y,z)=(\cos(ea)\times\cos(aa),\cos(ea)\times\sin(aa),\sin(ea)),$$
wherein the sphere CS has a radius of 1. (Equation 4)

The planar image Pi in perspective projection, is a two-dimensional image. When the planar image Pi is represented by the two-dimensional polar coordinate system (moving radius, argument)=(r, a), the moving radius r, which corresponds to the diagonal angle of view α, has a value in the range from 0 to tan (diagonal angle view/2). That is, $0<=r<=\tan(\text{diagonal angle view}/2)$. The planar image Pi, which is represented by the two-dimensional rectangular coordinate system (u, v), can be expressed using the polar coordinate system (moving radius, argument)=(r, a) using the following transformation equation 5.

$$u=r\times\cos(a), v=r\times\sin(a)$$ (Equation 5)

The equation 5 is represented by the three-dimensional coordinate system (moving radius, polar angle, azimuth). For the surface of the sphere CS, the moving radius in the three-dimensional coordinate system is "1". The equirectangular projection image, which covers the surface of the sphere CS, is converted from the equirectangular projection to the perspective projection, using the following equations 6 and 7. Here, the equirectangular projection image is represented by the above-described two-dimensional polar coordinate system (moving radius, azimuth)=(r, a), and the virtual camera IC is located at the center of the sphere.

$$r=\tan(\text{polar angle})$$ (Equation 6)

$$a=\text{azimuth}$$ (Equation 7)

Assuming that the polar angle is t, Equation 6 can be expressed as: $t=\arctan(r)$.

Accordingly, the three-dimensional polar coordinate (moving radius, polar angle, azimuth) is expressed as (1, arctan(r),a).

The three-dimensional polar coordinate system is transformed into the rectangle coordinate system (x, y, z), using Equation 8.

$$(x,y,z)=(\sin(t)\times\cos(a),\sin(t)\times\sin(a),\cos(t))$$ (Equation 8)

Equation 8 is applied to convert between the equirectangular projection image ECi in equirectangular projection, and the planar image Pi in perspective projection. More specifically, the moving radius r, which corresponds to the diagonal angle of view α of the planar image Pi, is used to calculate transformation map coordinates, which indicate correspondence of a location of each pixel between the planar image Pi and the equirectangular projection image ECi. With this transformation map coordinates, the equirectangular projection image ECi is transformed to generate the peripheral area image PIi in perspective projection.

Through the above-described projection transformation, the coordinate (latitude=90°, longitude=0°) in the equirectangular projection image ECi becomes the central point CP2 in the peripheral area image PIi in perspective projection. In case of applying projection transformation to an arbitrary point in the equirectangular projection image ECi as the point of gaze, the sphere CS covered with the equirectangular projection image ECi is rotated such that the coordinate (latitude, longitude) of the point of gaze is positioned at (90°, 0°).

The sphere CS may be rotated using any known equation for rotating the coordinate.

(Determination of Peripheral Area Image)

Figure 20B:
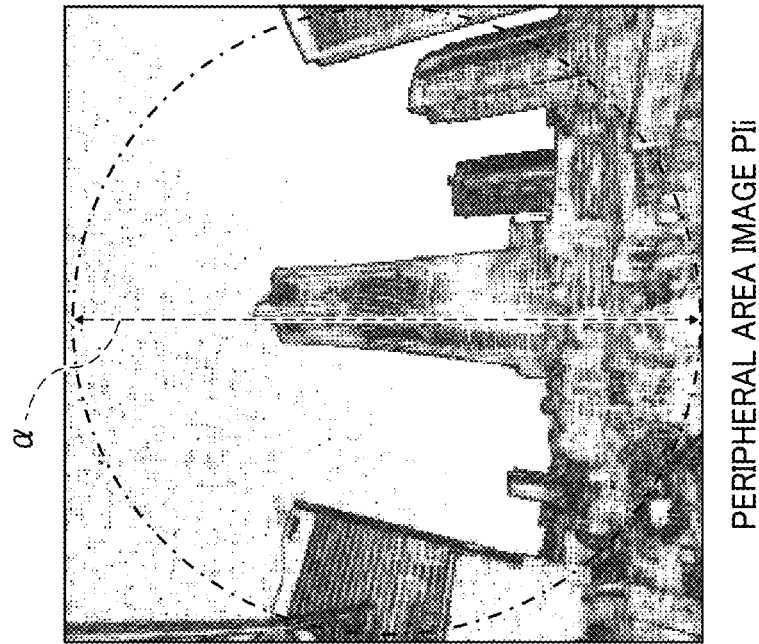
FIGS. 20A and 20B are conceptual diagrams for describing determination of a peripheral area image, according to the first embodiment.
Figure 20A:
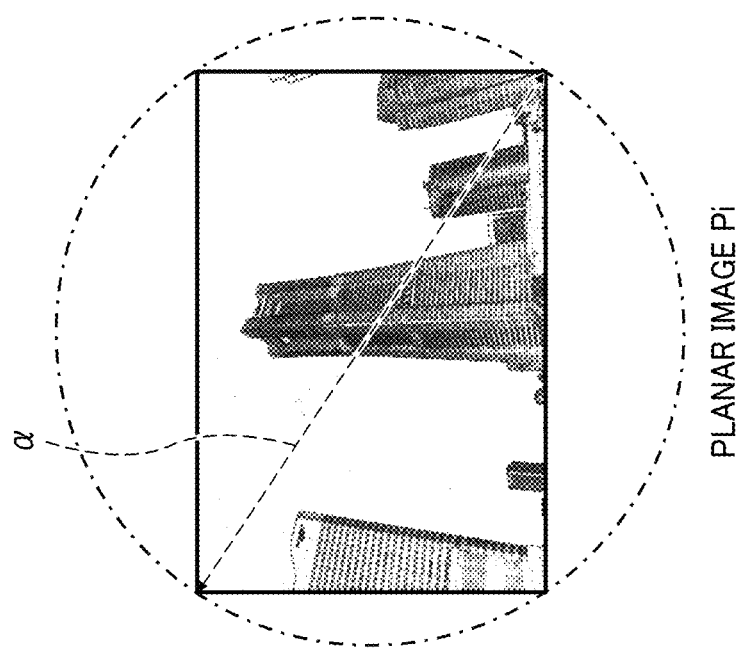

Next, referring to FIGS. 20A and 20B, determination of a peripheral area image PIi is described according to the embodiment. FIGS. 20A and 20B are conceptual diagrams for describing determination of the peripheral area image PIi.

To enable the first area calculator 552 to determine correspondence between the planar image Pi and the peripheral area image PIi, it is desirable that the peripheral area image PIi is sufficiently large to include the entire second area CA2. If the peripheral area image PIi has a large size, the second area CA2 is included in such large-size area image. With the large-size peripheral area image PIi, however, the time required for processing increases as there are a large number of pixels subject to similarity calculation. For this reasons, the peripheral area image PIi should be a minimum-size image area including at least the entire second area CA2. In this embodiment, the peripheral area image PIi is determined as follows.

More specifically, the peripheral area image PIi is determined using the 35 mm equivalent focal length of the planar image, which is obtained from the Exif data recorded when the image is captured. Since the 35 mm equivalent focal length is a focal length corresponding to the 24 mm×36 mm film size, it can be calculated from the diagonal and the focal length of the 24 mm×36 mm film, using Equations 9 and 10.

$$\text{film diagonal}=\text{sqrt}(24*24+36*6)$$ (Equation 9)

$$\text{angle of view of the image to be combined}/2=\arctan \\ ((\text{film diagonal}/2)/35 \text{ mm equivalent focal} \\ \text{length of the image to be combined})$$ (Equation 10)

The image with this angle of view has a circular shape. Since the actual imaging element (film) has a rectangular shape, the image taken with the imaging element is a rectangle that is inscribed in such circle. In this embodiment, the peripheral area image PIi is determined such that, a vertical angle of view α of the peripheral area image PIi is made equal to a diagonal angle of view α of the planar image Pi. That is, the peripheral area image PIi illustrated in FIG. 20B is a rectangle, circumscribed around a circle containing the diagonal angle of view α of the planar image Pi illustrated in FIG. 20A. The vertical angle of view α is calculated from the diagonal angle of a square and the focal length of the planar image Pi, using Equations 11 and 12.

$$\text{angle of view of square}=\text{sqrt}(\text{film diagonal}*\text{film} \\ \text{diagonal}+\text{film diagonal}*\text{film diagonal})$$ (Equation 11)

$$\text{vertical angle of view } \alpha/2=\arctan((\text{angle of view of} \\ \text{square}/2)/35 \text{ mm equivalent focal length of pla-} \\ \text{nar image}))$$ (Equation 12)

The calculated vertical angle of view α is used to obtain the peripheral area image PIi in perspective projection, through projection transformation. The obtained peripheral area image PIi at least contains an image having the diagonal angle of view α of the planar image Pi while centering on the point of gaze, but has the vertical angle of view α that is kept small as possible.

(Calculation of Location Information)

Referring back to FIGS. 15 and 19, the second area calculator 558 calculates the feature value fp2 of a plurality of feature points fp2 in the planar image Pi, and the feature value fp3 of a plurality of feature points fp3 in the peripheral area image PIi. The second area calculator 558 identifies corresponding points between the images, based on similarity between the feature value fv2 and the feature value fv3. Based on the corresponding points between the images, the second area calculator 558 calculates the homography for transformation between the planar image Pi and the peripheral area image PIi. The second area calculator 558 then applies second homography transformation to the planar image Pi (S160). Accordingly, the second area calculator 558 obtains a second corresponding area CA2 ("second area CA2"), in the peripheral area image PIi, which corresponds to the planar image Pi (S160).

In the above-described transformation, in order to increase the calculation speed, an image size of at least one of the planar image Pi and the equirectangular projection image ECi may be changed, before applying the first homography transformation. For example, assuming that the planar image Pi has 40 million pixels, and the equirectangular projection image ECi has 30 million pixels, the planar image Pi may be reduced in size to 30 million pixels. Alternatively, both of the planar image Pi and the equirectangular projection image ECi may be reduced in size to 10 million pixels. Similarly, an image size of at least one of the planar image P and the peripheral area image PIi may be changed, before applying the second homography transformation.

The homography is generally known as a technique to project one plane onto another plane through projection transformation.

Specifically, through the first homography transformation, a first homography is calculated based on a relation in projective space between the planar image Pi and the equirectangular projection image ECi, to obtain the point of gaze GP1. Through homography transformation, from the peripheral area PA, which is defined by the GP1, the peripheral area image PIi is obtained. A second homography can be represented as a transformation matrix indicating a relation in projective space between the peripheral area image PIi and the planar image Pi. As described above, the peripheral area image PIi is obtained by applying predetermined projection transformation to the equirectangular projection image ECi. Any point (such as a quadrilateral) on the planar image Pi (that is, one reference system) is multiplied by the transformation matrix (homography), which is calculated, to obtain a corresponding point (corresponding quadrilateral) on the peripheral area image PIi (that is, another reference system).

As described above, the following examples describe the cases where the video images are superimposed one above the other. In such case, storing location information on the image to be superimposed, with respect to another image, for each frame of video image results in a large amount of data. In view of this, as described below, the location information on the image to be superimposed, with respect to another image, is expressed using a reference shape that is previously set.

First, referring to FIGS. 19, and 21A to 21C, generation of the reference shape (S170) is described according to the embodiment. For the descriptive purposes, the reference shape that is initially set is referred to as a reference shape DF. Specifically, the reference shape is set so as to have a relation of projection transformation with respect to a shape of the planar image. As described below, the reference shape is set according to a predetermined angle of view and a predetermined projection method, so as to have a relation of projection transformation with a shape of the planar image. The predetermined projection method may be referred to as a projective space, or an aspect ratio of a rectangle. In the following embodiment, the reference shape DF is generated so as to have an angle of view β and a projective space that is the same as a projective space of the planar image Pi. Further, as described below, a reference shape that is converted from the initially-set reference shape DF, to have a projective space that is the same as a projective space of the equirectangular projection image ECi is referred to as a reference shape BF.

Figure 21C:
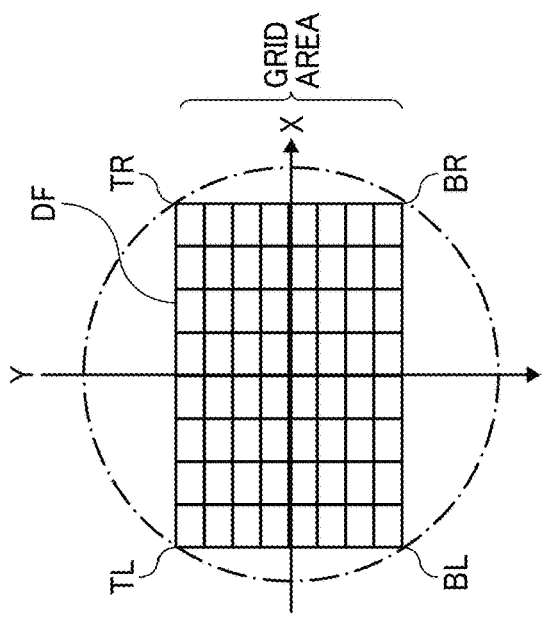
FIG. 21C is a conceptual diagram illustrating a plurality of divided areas of the reference shape illustrated in FIG. 21A, according to the first embodiment.
Figure 21B:
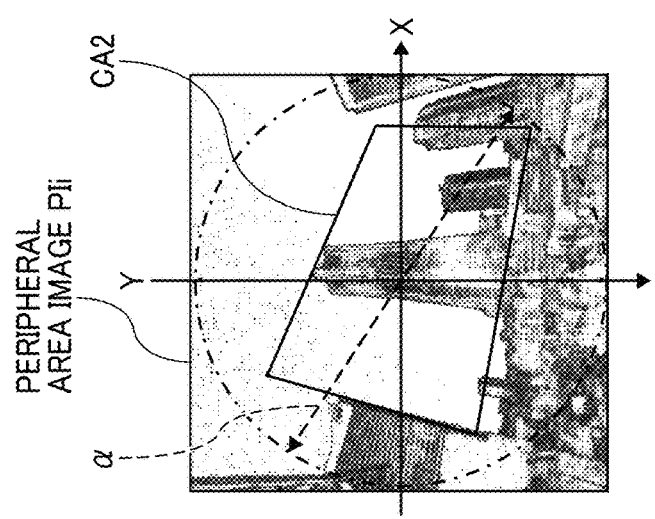
FIG. 21B is a conceptual diagram illustrating a peripheral area image and a second corresponding area, according to the first embodiment.
Figure 21A:
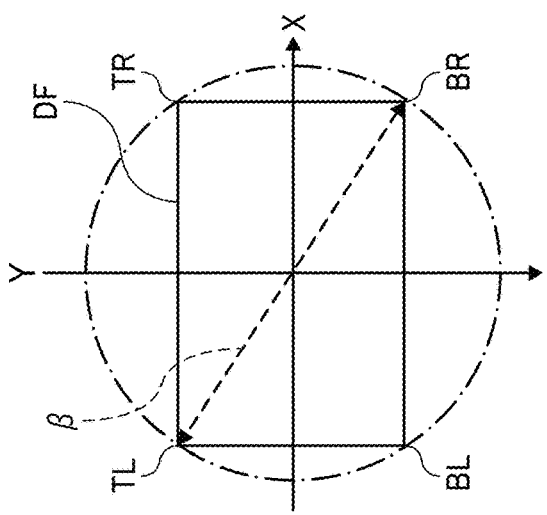
FIG. 21A is a conceptual diagram illustrating a reference shape according to the first embodiment.

FIG. 21A is a conceptual diagram illustrating a reference shape, according to the embodiment. FIG. 21B is a conceptual diagram illustrating a peripheral area image and a second corresponding area, according to the embodiment. FIG. 21C is a conceptual diagram illustrating a plurality of divided areas of the reference shape illustrated in FIG. 21A, according to the embodiment.

The reference shape generator 550 generates a shape that is initially set as a reference shape DF. For example, the reference shape DF may be set based on a predetermined angle of view β and a predetermined projection method. With the reference shape DF that is appropriately set, processing to rotate, scale (changing a size), or move (changing the coordinate location) the image to be superimposed can be appropriately performed, without causing a shift in images to be displayed. That is, the reference shape DF, together with the reference shape conversion data, is appropriately set so as to appropriately define the location and the area (shape) of the image to be superimposed.

The reference shape can be applied with projection transformation (homography) to be converted into a shape corresponding to the planar image Pi. Here, the planar image Pi, which is the first frame of the video image (referred to as the planar image P1), is used for generating the reference shape DF to be used for that video image, however, any of the frames in the video image may be used for generating the reference shape DF. In this disclosure, processing to generate the reference shape DF corresponds to processing to set such shape, which is referred to when generating the reference shape conversion data and the reference location data. Examples of the processing to set the reference shape DF include previously setting the reference shape, and newly generating the reference shape.

That is, the reference shape may be a predetermined shape, such as a rectangle or a circle, which is previously determined based on a predetermined angle of view β and a predetermined projection method.

For example, the reference shape, or the angle of view β and the projection method, for determining the reference shape, may be set according to the shape, or the angle of view β and the projection method, of the planar image Pi subjected to processing. The angle of view may be calculated based on a focal length, for example.

Specifically, in one example, the reference shape generator 559 generates a reference shape according to an angle of view and a projection method, based on a shape of the first planar image P1 that has been captured first among a plurality of frames of video image. The reference shape generator 559 uses the reference shape, which has been generated for the first planar image P1, as a reference shape for the second planar image P2 or any other subsequent planar image Pn. That is, an angle of view used for capturing the first planar image P1, and a projection method of the planar image P1, may be set to determine the reference shape DF.

In another example, the reference shape generator 559 generates a reference shape according to an angle of view and a projection method, based on a shape of the planar image Pi that has been captured after the first planar image P1 but before the last planar image P that has been captured last among a plurality of frames of video image. For example, assuming that an angle of view changes from 50 degrees to 110 degrees as the image is gradually zoomed out, an angle of view of 80 degrees may be set to determine the reference shape DF. The projection method may be determined to be the same as that of the planar image, as described above.

The reference shape is used to appropriately locate the planar image Pi and the equirectangular projection image ECi when they are displayed together. More specifically, with the reference location data and reference shape conversion data to be described later, the location and area of the planar image Pi can be defined such that the planar image Pi and the equirectangular projection image ECi will be displayed as they were one combined image.

As illustrated in FIG. 21A, the reference shape DF is generated to have a projection that is the same as a projection of the planar image Pi (foreground video image). Specifically, in this embodiment, assuming that the planar image Pi is an image captured by a general digital camera, the reference shape DF is generated in perspective projection.

Still referring to FIG. 21A, the reference shape DF is a rectangle inscribed in a circle having the angle of view β, for example. For simplicity, the vertical side and horizontal side of the rectangle are parallel to the X axis and the Y axis of a coordinate system, respectively, while the center of the rectangle is the origin of the coordinate system. The diagonal angle of view β can be arbitrarily determined to be within a range greater than 0 degree and less than 180 degrees. Since there is a possibility that the calculation error may become large if an extreme value is specified, the diagonal angle of view β may be set to, for example, 50 degrees. Further, an angle of view that has been used for capturing the planar image P (foreground video image) may be used as the diagonal angle of view β, as described above.

Next, the reference shape conversion data calculator 568 calculates data to be used for converting a projection (projective space) of the reference shape DF to a projection (projective space) of the second area CA2, using information (parameter) used for applying projection transformation (homography) to convert from a projection of the planar image Pi to a projection of the second area CA2. This calculated data is referred to as reference shape conversion data for converting a reference shape, to match a projection of the second area CA2.

As illustrated in FIG. 17, the reference shape conversion data mainly includes reference shape rotation data for defining rotation, and reference shape scaling data for defining scaling, i.e., enlarging or reducing a size of the reference shape. With the reference shape conversion data, an area of the second corresponding area CA2 can be defined using the reference shape.

The reference shape conversion data may further include reference shape movement data for defining an amount of shift, from a reference location of the reference shape as indicated by the reference location data. With the reference shape movement data, a location of the second corresponding area can be defined using information on the location of the reference shape. More specifically, the reference shape conversion data calculator 568 applies projection transformation to the central point CP2 of the second area CA2, to calculate the coordinate of the corresponding point CP3 in the equirectangular projection image ECi. Through this calculation, the reference shape movement data is obtained, which is information for shifting the coordinate of the reference shape BF by offset being defined.

That is, the reference shape conversion data is used for determining a location and an area of the reference shape DF, and includes information on rotation, scaling (enlarging or reducing a size), and movement (offsets) to be applied to the reference shape DF.

Referring now to FIG. 21B, processing performed by the reference shape conversion data calculator 568 will be described in detail. FIG. 21B is a conceptual diagram illustrating a peripheral area image and a second corresponding area, according to the embodiment.

FIG. 21B specifically illustrates a peripheral area image PIi and a second corresponding area CA2, as an example. As illustrated in FIGS. 20A and 20B, the peripheral area image PIi is determined such that, a vertical angle of view α of the peripheral area image PIi is made equal to a diagonal angle of view α of the planar image Pi. The homography transformation can be applied between the second corresponding area CA2 and the planar image Pi. The homography here is a transformation of a perspective space such that one projective plane is converted into another projective plane. Accordingly, the reference shape DF and the second corresponding area CA2 may be expressed as having a projective relation, or they are related by a homography. Depending on four vertices of the second corresponding area CA2, it may be difficult to express the second corresponding area CA2 on the plane represented by the reference shape DF using the homography alone. In some cases, approximation may be applied such that deviations of the four vertices become the smallest using the least square method. Any known calculation method based on homography is used. For example, in the case of Open CV (Open Source Computer Vision Library), the function for calculating a homography matrix using inputs of four points may be used.

The reference shape conversion data calculator 568 calculates reference shape rotation data and reference shape scaling data, each to be used for converting the reference shape BF using the homography. Any desired homography decomposition method may be used to obtain the rotation data and the scaling data by the homography. For example, the homography decomposition method may be used, which is described in Zhang, Z. "A Flexible New Technique for CameraCalibration" IEEE Transactions on Pattern Analysis and Machine Intelligence. Vol. 22, No. 11, 2000, pp. 1330-1334.

In this example, the reference shape rotation data is represented by the Euler angle with respect to each axis of a three-dimensional model space. Further, the reference shape movement data is represented by the point of gaze GP1 on the equirectangular projection image EC.

Referring back to FIG. 15, the area divider 560 divides an area of the reference shape DF into a plurality of grid areas. Referring to FIGS. 21A and 21C, operation of dividing the area of the reference shape DF into a plurality of grid areas is described according to the embodiment. FIG. 21C is a conceptual diagram illustrating a plurality of divided areas of the reference shape DF illustrated in FIG. 21A, according to the embodiment.

The area divider 560 divides the rectangle defined by four vertices of the reference shape DF as illustrated in FIG. 21A, into a plurality of grid areas as illustrated in FIG. 21C. As described above, the reference shape DF has been generated using a diagonal angle of view β and an aspect ratio of the rectangle as illustrated in FIG. 21A. For example, the area of the reference shape DF is equally divided into 8 grid areas in the horizontal direction, and into 8 grid areas in the vertical direction.

Next, dividing the area of the reference shape DF into the plurality of grid areas is explained in detail.

The area of the reference shape DF is equally divided using the following equation. Assuming that a line connecting two points, A(X1, Y1) and B(X2, Y2), is to be equally divided into "n" coordinates, the coordinate of a point Pm that is the "m"th point counted from the point A is calculated using the equation 13.

$$Pm=(X1+(X2-X1)\times m/n, Y1+(Y2-Y1)\times m/n)$$ (Equation 13)

With Equation 13, the line can be equally divided into a plurality of coordinates. The upper line and the lower line of the rectangle are each divided into a plurality of coordinates, to generate a plurality of lines connecting corresponding coordinates of the upper line and the lower line. The generated lines are each divided into a plurality of coordinates, to further generate a plurality of lines. As illustrated in FIG. 21A, coordinates of points (vertices) of the upper left, upper right, lower right, and lower left of the rectangle are respectively represented by TL, TR, BR, and BL. The line connecting TL and TR, and the line connecting BR and BL are each equally divided into 8 coordinates (0 to 8th coordinates). Next, each of the lines connecting corresponding 0 to 8th coordinates of the TL-TR line and the BR-BL line, is equally divided into 8 coordinates. Accordingly, the rectangular area is divided into 8×8, sub-areas.

Referring back to FIGS. 15 and 19, the projection reverse converter 562 reversely converts a projection of the reference shape DF, which have been divided into the grid areas, to the equirectangular projection of the equirectangular projection image EC. With this projection transformation, the points that correspond to the grids of the reference shape DF are determined on the equirectangular projection image ECi, to form a reference shape BF in equirectangular projection.

Figure 22A:
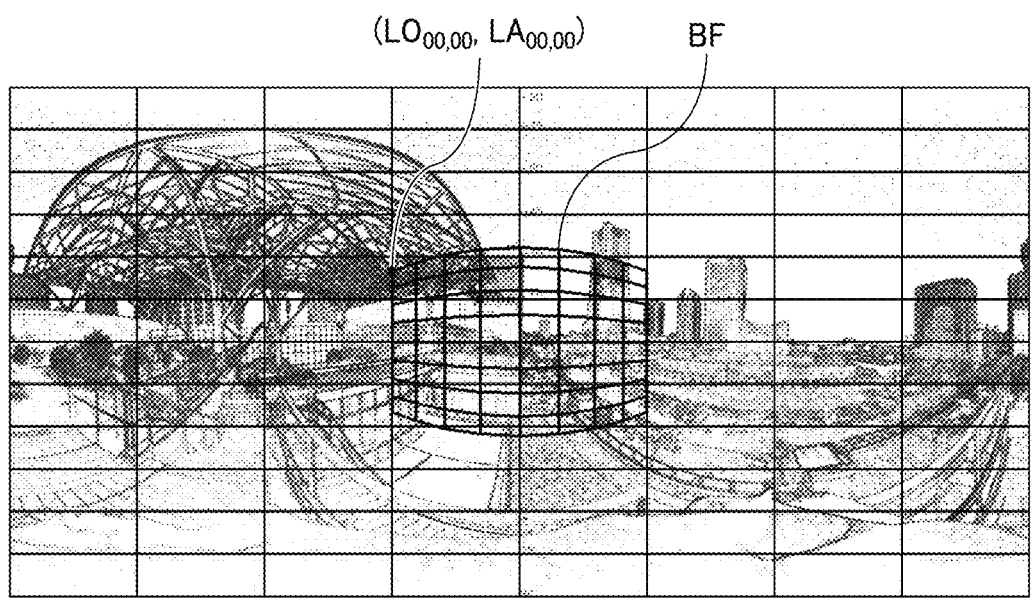
FIG. 22A is a conceptual diagram illustrating the reference shape, mapped at a center of the spherical image, according to the first embodiment.

FIG. 22A is a conceptual diagram illustrating a plurality of grids of the reference shape BF, which correspond to the plurality of grids of the reference shape DF illustrated in FIG. 21C, placed at the center of the equirectangular projection image ECi. The center is determined to be the point of gaze (latitude 0, longitude 0). As described above in projection transformation, correspondences between images in different projections can be obtained through mapping the coordinates of the image on a three-dimensional sphere. FIG. 22A illustrates an example case of the coordinate $(LO_{00,00}, LA_{00,00})$ of the upper left point TL.

In this example, the reference shape is generated in perspective projection as the reference shape DF, based on a predetermined angle of view and a predetermined aspect ratio of the rectangle. Even after applying projection transformation to the reference shape DF to generate the reference shape BF, information indicating where the reference shape BF is to be located on the equirectangular projection image ECi is needed. The coordinates where the grid areas of the reference shape BF are located, are defined using the latitude and longitude coordinates on the equirectangular projection image ECi. That is, the coordinates can be expressed as a point of gaze, which represents a direction that the center of the three-dimensional sphere CS faces.

Figure 22B:
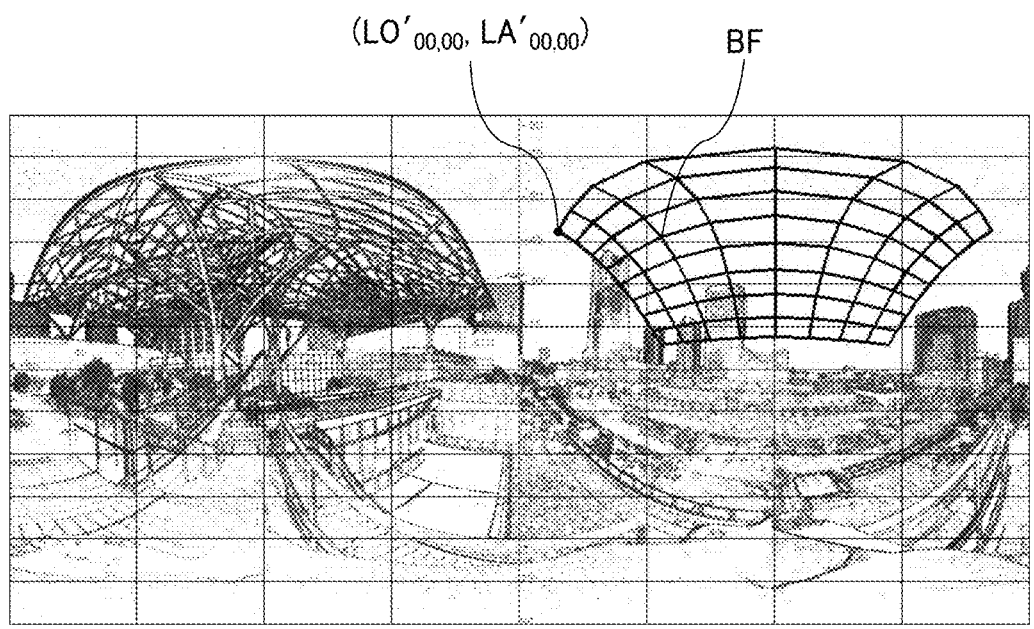
FIG. 22B is a conceptual diagram illustrating the reference shape, moved from the center of the spherical image, according to the first embodiment.

FIG. 22B is a conceptual diagram illustrating the reference shape BF of FIG. 22A, which is placed at a location having the latitude of −45 degrees and the longitude of 90 degrees, with the point of gaze being changed. Since the equirectangular projection is a projection in which the horizontal direction is stretched from the vicinity of the equator toward the pole, the reference shape BF becomes a fan-like shape as illustrated in FIG. 22B.

As illustrated in FIG. 5 and FIG. 6, in this embodiment, information indicating where the reference shape BF is to be located is referred to as "reference shape movement data", and expressed as latitude and longitude coordinates on the equirectangular projection image. As described above, the reference shape BF is shifted from a position indicated by FIG. 22A to a position indicated by FIG. 22B, using the reference shape movement data. Specifically, the central point CP2 of the second corresponding area CA2 is applied with reverse projection transformation, to obtain the corresponding point CP3 on the equirectangular projection image ECi. The coordinate of this corresponding point CP3 is set as the reference shape movement data. Using the reference shape conversion data including the reference shape rotation data, the reference shape scaling data, and the reference shape movement data, the reference shape BF is rotated and scaled (enlarged or reduced in size), and further is shifted to a position indicated by the point of gaze GP1 on the equirectangular projection image ECi. That is, the corresponding area in the equirectangular projection image ECi, which corresponds to the second corresponding area CA2, can be determined using the reference shape conversion data and the reference location data (specifically, the reference location parameter). The reference location parameter is obtained by reversely transforming coordinates of grid areas divided from the reference shape DF to coordinates of grid areas in equirectangular projection. In this example, the gird may be referred to as a single point of a plurality of points.

The reference shape movement data may be referred to as pan and tilt data, since it is equivalent to moving the line of sight of the virtual camera IC, which is in the center of the sphere CS, in the directions of pan (longitudinal direction) and tilt (latitude direction).

The superimposing unit 55b, which will be described later, applies rotation and scaling to the reference shape DF, transforms a projection of the reference shape DF to generate the reference shape BF, and shifts the reference shape BF, using the reference shape conversion data, to display the planar image P while being superimposed on the spherical image CE (equirectangular projection image EC). As illustrated in FIGS. 15 and 17, the relation in location between the equirectangular projection image ECi and the planar image Pi can be calculated, using the reference location parameter and the video frame count value.

Referring back to FIG. 15, the superimposed display metadata generator 570 then generates the superimposed display metadata as illustrated in FIG. 17.

(Superimposed Display Metadata)

Referring to FIG. 17, a data structure of the superimposed display metadata is described according to the embodiment. FIG. 17 illustrates a data structure of the superimposed display metadata according to the embodiment.

As illustrated in FIG. 17, the superimposed display metadata includes equirectangular projection image information, planar image information, reference location data, a plurality of items of reference shape conversion data 1 to N (N being an integer), and metadata generation information.

The equirectangular projection image information is metadata, which is transmitted from the special image capturing device 1 with the captured image data. The equirectangular projection image information includes an image identifier (image ID) and attribute data of the captured image data. The image identifier, included in the equirectangular projection image information, is used to identify the equirectangular projection image. While FIG. 17 uses an image file name as an example of image identifier, an image ID for uniquely identifying the image may be used instead.

The attribute data, included in the equirectangular projection image information, is any information related to the equirectangular projection image. In the case of metadata of FIG. 17, the attribute data includes positioning correction data (Pitch, Yaw, Roll) of the equirectangular projection image, which is obtained by the special image capturing device 1 in capturing the image. The positioning correction data is stored in compliance with a standard image recording format, such as Exchangeable image file format (Exif). Alternatively, the positioning correction data may be stored in any desired format defined by Google Photo Sphere schema (GPano). As long as an image is taken at the same place, the special image capturing device 1 captures the image in 360 degrees with any positioning. However, in displaying such spherical image CE, the positioning information and the center of image (point of gaze) should be specified. Generally, the spherical image CE is corrected for display, such that its zenith is right above the user capturing the image. With this correction, a horizontal line is displayed as a straight line, thus the displayed image have more natural look. Since the image processed in this embodiment is a video image, positioning information may be stored for each frame of the video image and corrected for each frame of the video image.

The planar image information is transmitted from the generic image capturing device 3 with the captured image data (video image data). The planar image information includes an image identifier (image ID) and attribute data of the captured image data. The image identifier, included in the planar image information, is used to identify the planar image P. While the example of FIG. 17 uses an image file name as an example of image identifier, an image ID for uniquely identifying the image may be used instead.

The attribute data, included in the planar image information, is any information related to the planar image P. In the case of metadata of FIG. 17, the planar image information includes, as attribute data, a value of 35 mm equivalent focal length. The value of 35 mm equivalent focal length is not necessary to display the image on which the planar image P is superimposed on the spherical image CE. However, the value of 35 mm equivalent focal length may be referred to determine an angle of view when displaying superimposed images. In the video image, since the focal length changes when zoomed, the focal length for each frame of the video image may be recorded as attribute data.

The reference location data includes area division number information, and a coordinate of a grid in each grid area (reference location parameter). The area division number information indicates a number of divisions of the reference shape BF, both in the horizontal (longitude) direction and the vertical (latitude) direction. The area division number information is referred to when dividing the reference shape BF into a plurality of grid areas.

Further, the reference location parameter is used together with the reference shape conversion data items 1 to N. Specifically, the reference shape conversion data includes video frame identification data, which identifies a frame of the foreground video image (the planar image Pi) to be extracted, and frame of the background video image (the equirectangular projection image ECi) to be extracted. With the reference location parameter, mapping information is calculated to determine a location of each grid, obtained by dividing the extracted planar image Pi into a plurality of grid areas, on the equirectangular projection image ECi.

The reference shape conversion data includes the reference shape rotation data, reference shape scaling data, reference shape movement data, and video frame identification data. The reference shape rotation data, the reference shape scaling data, and the reference shape movement data are as described above.

The video image frame specification data is generated by the metadata generation video frame extractor 548. With the video image frame specification data, a frame can be extracted from the video image identified with the image ID for each of the equirectangular projection image EC and the planar image P. For each frame, the location or area of the planar image P on the equirectangular projection image EC is determined, using the reference shape conversion data, which indicates rotation, scaling, or movement to be applied to the reference shape (or the location or area of the reference shape). More specifically, the reference location parameter and the shape conversion parameter, obtained using the reference shape conversion data, are used to generate mapping information indicating where, in the equirectangular projection image ECi (a frame extracted from the spherical image CE), each grid of a plurality of grid areas of the planar image Pi is to be located. The reference shape conversion data calculator 568 does not have to calculate the reference shape conversion data for all frames of the video image, but may calculate the reference shape conversion data for one or more frames of the planar image Pi (foreground video image) that are obtained through sampling. Accordingly, 1 to N of reference shape conversion data items are obtained in this embodiment. Specifically, a number of samples may be changed. For example, when the change in image contents between frames is large in the foreground video image, the reference shape conversion data calculator 568 takes out a larger number of samples from the foreground video image along an axis representing time. When the change in image contents between the frames is small, the reference shape conversion data calculator 568 takes out a less number of samples from the foreground video image. The change in image contents may be determined using, for example, the reference shape conversion data.

Referring back to FIG. 17, the metadata generation information includes version information indicating a version of the superimposed display metadata. With the superimposed display metadata, a data size of the parameter used for calculating a location where, in the background video image, the foreground video image is superimposed, can be reduced. Further, the reference shape conversion data is recorded for a limited number of frames obtained through sampling, rather than for all frames of the video image. This effectively reduces an amount of data for parameters. Such parameters with less amount of data further reduces a time, or load, required for processing to be performed when displaying the images, for example, via a viewer. Examples of processing that the load can be reduced include, but not limited to, processing performed by OpenGL ES, which is a graphic library used for visualizing two-dimensional (2D) and three-dimensional (3D) data. As described above, the superimposed display metadata is recorded as metadata that can be referred to by an external program. The external program reads time-series data of reference shape conversion data regarding rotation, scaling, or movement, and further applies interpolation when needed, to seamlessly process superimposition of images in real time.

(Functional Configuration of Superimposing Unit)

Referring to FIG. 16, a functional configuration of the superimposing unit 55b is described according to the embodiment. The superimposing unit 55b includes a playback time manager 571, an output video frame extractor (video frame extractor for output) 572, an interpolation processing unit 574, a location parameter calculator 576, a shape converter 578, a correction parameter generator 580, a superimposed area generator 582, a correction unit 584, an image generator 586, an image superimposing unit 588, and a projection converter 590.

The playback time manager 571 manages the reference video image playback time, and outputs the playback time (or the video image frame count value) that is the current time. For example, when the video image is to be played at 30 fps, the playback time manager 571 outputs total of 30 frames, while increasing the time by 1/30 seconds per second. The following describes an example of synchronization between the background video image and the foreground video image. Firstly, any image is specified to be a reference image. The images can be synchronized, so as to reduce a time difference between the time when the reference image is captured and the time when the image subjected to processing is captured. For example, the first background video image (equirectangular projection image EC) is selected as a reference image. When the foreground video image (planar image P) is captured 0.5 seconds earlier than the time when the first background video image is captured, the time difference is −0.5 seconds. When the foreground video image is captured 0.5 seconds later than the time when the first background video image is captured, the time difference is +0.5 seconds. Based on the time difference, a number of frames to be offset is calculated. By offsetting, the images can be synchronized to be displayed at substantially a same time. When displaying, reading of one or more frames may be skipped for one video image, so that the one video image is synchronized with other video image having the captured time that is later. Alternatively, time for starting displaying may be adjusted, such that there is no time difference in displaying between the background video image and the foreground video image.

Based on the time managed by the playback time manager 571, the output video frame extractor 572 extracts a frame corresponding to the specified time, each from the background video image (equirectangular projection image EC), and the foreground video image (planar image P).

The interpolation processing unit 574 reads reference shape conversion data generated by the metadata generator 55a, in accordance with the frame playback time (or the video frame count value) managed by the playback time manager 571, and applies interpolation processing as needed to calculate a shape conversion parameter for each time when a frame of video image is playback. The shape conversion parameter is generated in the same data format as that of the reference shape conversion data, such as in terms of angle. Further, in this example, the interpolation processing unit 574 applies interpolation to a shape conversion parameter obtained from the reference shape conversion data of a frame to be playback, to output a shape conversion parameter to which interpolation is applied. In applying interpolation, reference shape conversion data for a frame that is closest (preceding or following) to the playback time is obtained, and applied with linear interpolation. In the metadata generator 55a, for example, the metadata generation video frame extractor 548 extracts a video frame at 1 fps. The superimposed display metadata generator 570 then generates one item of reference shape conversion data per second. If the playback time manager 571 outputs 30 frames per second, the interpolation processing unit 574 applies interpolation to the reference shape conversion data of one frame, to obtain a shape conversion parameter for each of 29 frames. Accordingly, the shape conversion parameters for 30 frames per second are obtained.

The location parameter calculator 576 calculates a location parameter using the shape conversion parameter obtained by the interpolation processing unit 574, and the reference location data (specifically, the reference location parameter) generated by the metadata generator 55a. This calculation is performed for each playback time of each frame of the video image.

Although the planar image P is superimposed on the equirectangular projection image EC at a right location with the location parameter, these equirectangular projection image EC and the planar image P may vary in brightness or color (such as tone), causing an unnatural look. The shape converter 578 and the correction parameter generator 580 are provided to avoid this unnatural look, even when these images that differ in brightness and color, are partly superimposed one above the other.

The shape converter 578 converts the area on the equirectangular projection image EC, indicated by the location parameter calculated by the location parameter calculator 576, into the same rectangular shape as the planar image P, to generate a third corresponding area CA3 (the third area CA3).

Figure 26A:
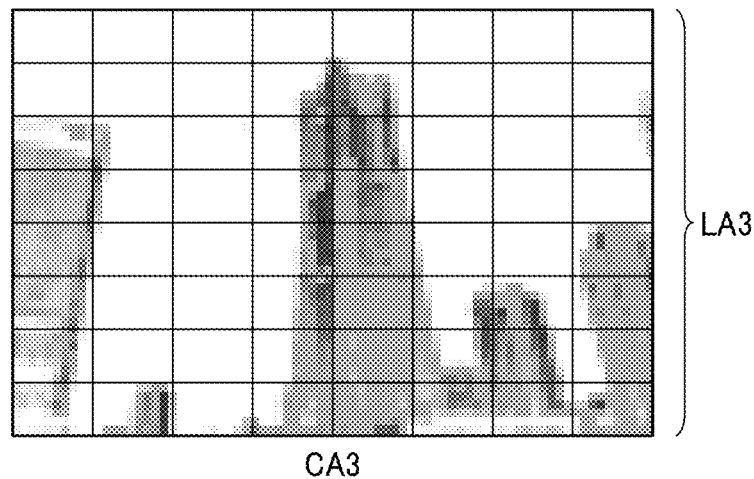
FIG. 26A is a conceptual diagram illustrating a plurality of grid areas in a third corresponding area, according to the first embodiment.
Figure 26B:
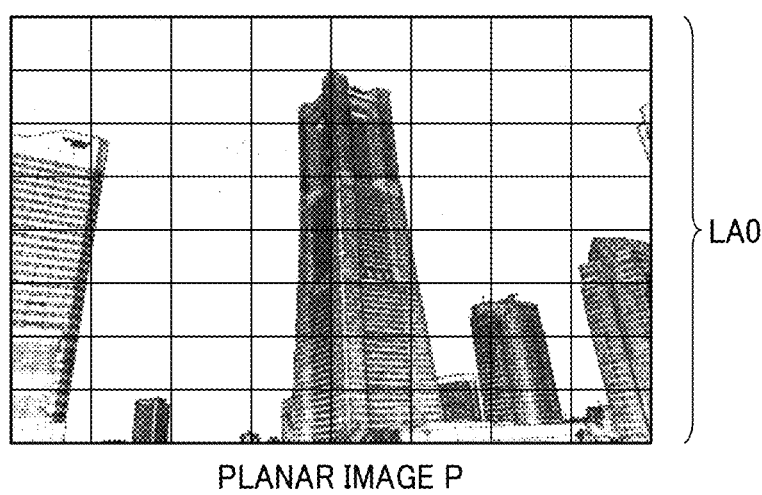
FIG. 26B is a conceptual diagram illustrating a plurality of grid areas in a planar image, according to the first embodiment.
Figure 27:
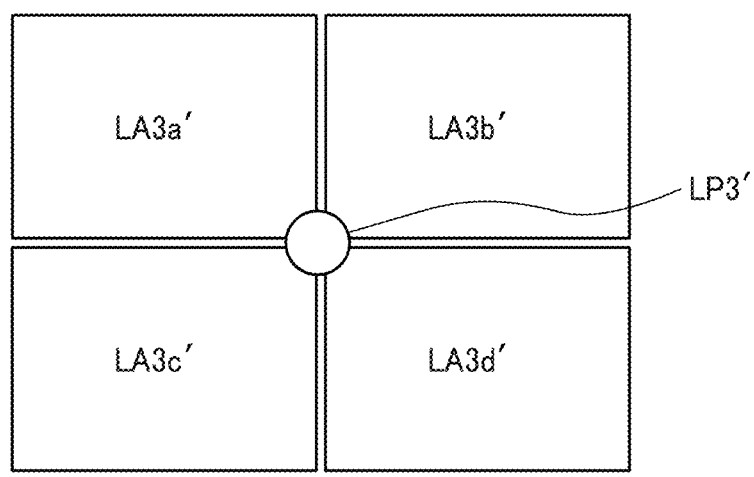
FIG. 27 is an illustration for explaining a grid shared by the gird areas in the third corresponding area of FIG. 26A, according to the first embodiment.

As illustrated in FIG. 26A, the correction parameter generator 580 divides the third corresponding area CA3 based on the area division number information of the superimposition display metadata, in a substantially similar manner as described for the processing performed by the area divider 560, to generate a plurality of grid areas LA3. Further, as illustrated in FIG. 26B, the correction parameter generator 580 divides the planar image P based on the area division number information of the superimposition display metadata, in a substantially similar manner as described for the processing performed by the area divider 560, to generate a plurality of grid areas LA0. In FIG. 26B, the grid areas LA0 include 8×8=64 grid areas. The correction parameter generator 580 generates the correction parameter, which is to be applied to each grid area LA3 in the third area CA3, such that each grid area LA3 is equal to the corresponding grid area LA0 in the planar image P in brightness and color. Specifically, the correction parameter generator 580 identifies four grid areas LA0 that share one common grid, and calculates an average avg=($R_{ave}$, $G_{ave}$, $B_{ave}$) of brightness and color values (R, G, B) of all pixels contained in the specified four grid areas LA0. Similarly, the correction parameter generator 566 identifies four grid areas LA3 that share one common grid, and calculates an average avg'= ($R'_{ave}$, $G'_{ave}$, $B'_{ave}$) of brightness and color values (R', G', B') of all pixels contained in the specified four grid areas LA3. For the descriptive purposes, FIG. 27 illustrates four grid areas (LA3$a'$, LA3$b'$, LA3$c'$, LA3$d'$) and a common grid LP3' shared by these four grid areas. If one gird of the specified grid areas LA0 and the corresponding grid of the specific grid areas LA3 correspond to one of four vertices of the second area CA3, the correction parameter generator 580 calculates the average avg and the average avg' of the brightness and color of pixels from one grid area located at the corner. If one grid of the specific grid areas LA0 and the corresponding grid of the specific grid areas LA3 correspond to a gird of the outline of the third area CA3, the correction parameter generator 580 calculates the average avg and the average avg' of the brightness and color of pixels from two grid areas inside the outline. In this embodiment, the correction parameter is gain data for correcting the brightness and color of the planar image P. Accordingly, the correction parameter Pa is obtained by dividing the avg' by the avg, as represented by the following equation 14.

$$Pa = avg'/avg \qquad \text{(Equation 14)}$$

In displaying the superimposed image, each grid area LA0 is multiplied with the gain, represented by the correction parameter. Accordingly, the brightness and color of the planar image P is made substantially equal to that of the equirectangular projection image EC (spherical image CE). This prevents unnatural look, even when the planar image P is superimposed on the equirectangular projection image EC. In addition to or in alternative to the average value, the correction parameter may be calculated using the median or the most frequent value of brightness and color of pixels in the grid areas.

In this embodiment, the values (R, G, B) are used to calculate the brightness and color of each pixel. Alternatively, any other color space may be used to obtain the brightness and color, such as brightness and color difference using YUV, and brightness and color difference using sYCC (YCbCr) according to the JPEG. The color space may be converted from RGB, to YUV, or to sYCC (YCbCr), using any desired known method. For example, RGB, in compliance with JPEG file interchange format (MO, may be converted to YCbCr, using Equation 15.

$$\begin{pmatrix} Y \\ Cb \\ Cr \end{pmatrix} = \begin{pmatrix} 0.299 & 0.587 & 0.114 \\ -0.1687 & -0.3313 & 0.5 \\ 0.5 & -0.4187 & -0.0813 \end{pmatrix} \begin{pmatrix} R \\ G \\ B \end{pmatrix} + \begin{pmatrix} 0 \\ 128 \\ 128 \end{pmatrix} \qquad \text{(Equation 15)}$$

The correction unit 584 corrects the brightness and color of the planar image P, using the correction parameter calculated by the correction parameter generator 580, to match the brightness and color of the equirectangular projection image EC. The planar image P that has been corrected is referred to as a correction image C. The correction unit 584 may not always perform correction on brightness and color. In one example, the correction unit 584 may only correct the brightness of the planar image P using the correction parameter.

Based on the location parameter calculated by the location parameter calculator 576, the superimposed area generator 582 identifies a part of the virtual sphere CS, on which the planar image P is superimposed, to generate a partial sphere PS.

The image generator 586 superimposes (maps) the planar image P (or the corrected image C of the planar image P), on the partial sphere PS to generate an image to be superimposed on the spherical image CE, which is referred to as a superimposed image S for simplicity. The image generator 586 further generates mask data M, based on a surface area of the partial sphere PS. The image generator 586 covers (attaches) the equirectangular projection image EC, over the sphere CS, to generate the spherical image CE. The mask data M sets the degree of transparency for each pixel, or a set of pixels, such that the degree of transparency increases from the center of the superimposed image S toward the boundary of the superimposed image S with the spherical image CE. With this mask data M, the pixels around the center of the superimposed image S have brightness and color of the superimposed image S, and the pixels near the boundary between the superimposed image S and the spherical image CE have brightness and color of the spherical image CE. Accordingly, superimposition of the superimposed image S on the spherical image CE is made unnoticeable. However, application of the mask data M can be made optional, such that the mask data M does not have to be generated. The mask data M is not needed, for example, when the brightness in the boundary between the superimposed image S and the spherical image CE is not changed gradually.

The image superimposing unit 588 superimposes the superimposed image S and the mask data M, on the spherical image CE. The image is generated, in which the high-definition superimposed image S is superimposed on the low-definition spherical image CE. With the mask data, the boundary between the two different images is made unnoticeable.

As illustrated in FIG. 7, the projection converter 590 converts projection, such that the predetermined area T of the spherical image CE, with the superimposed image S being superimposed, is displayed on the display 517, for example, in response to a user instruction for display. The projection transformation is performed based on the line of sight of the user (the direction of the virtual camera IC, represented by the central point CP of the predetermined area T), and the angle of view α of the predetermined area T. In projection transformation, the projection converter 590 converts a resolution of the predetermined area T, to match with a resolution of a display area of the display 517. Specifically, when the resolution of the predetermined area T is less than the resolution of the display area of the display 517, the projection converter 590 enlarges a size of the predetermined area T to match the display area of the display 517. In contrary, when the resolution of the predetermined area T is greater than the resolution of the display area of the display 517, the projection converter 590 reduces a size of the predetermined area T to match the display area of the display 517. Accordingly, the display control 56 displays the predetermined-area image Q, that is, the image of the predetermined area T, in the entire display area of the display 517.

<Operation>

Referring now to FIGS. 18 to 34, operation of capturing the images and processing the images for display, performed by the image capturing system, is described according to the embodiment. First, referring to FIG. 18, operation of capturing the images, performed by the image capturing system, is described according to the embodiment. FIG. 18 is a data sequence diagram illustrating operation of capturing the image, according to the embodiment. The following describes the example case in which the object and surroundings of the object are captured. However, in addition to capturing the object, audio may be recorded by the audio collection unit 14 as the captured image is being generated.

As illustrated in FIG. 18, the acceptance unit 52 of the smart phone 5 accepts a user instruction to start linked image capturing (S11). In response to the user instruction to start linked image capturing, the display control 56 controls the display 517 to display a linked image capturing device configuration screen as illustrated in FIG. 14B. The screen of FIG. 14B includes, for each image capturing device available for use, a radio button to be selected when the image capturing device is selected as a main device, and a check box to be selected when the image capturing device is selected as a sub device. The screen of FIG. 14B further displays, for each image capturing device available for use, a device name and a received signal intensity level of the image capturing device. Assuming that the user selects one image capturing device as a main device, and other image capturing device as a sub device, and presses the "Conform" key, the acceptance unit 52 of the smart phone 5 accepts the instruction for starting linked image capturing. In this example, more than one image capturing device may be selected as the sub device. For this reasons, more than one check box may be selected.

The short-range communication unit 58 of the smart phone 5 transmits a request to start capturing images ("image capturing request") to the short-range communication unit 38 of the generic image capturing device 3 (S12). The short-range communication unit 58 of the smart phone 5 transmits an image capturing start request, which requests to start image capturing, to the short-range communication unit 18 of the special image capturing device 1 (S13).

The generic image capturing device 3 starts capturing the image (S14). The processing of S14 includes capturing the object and surroundings to generate captured image data (planar image data), which is frame data of video image, with the image capturing unit 33, and storing the captured image data in the memory 3000 with the storing and reading unit 39. The short-range communication unit 38 of the generic image capturing device 3 transmits planar image data, obtained at S14, to the smart phone 5 (S15). With the planar image data, the image identifier for identifying the planar image data, and attribute data, are transmitted. The short-range communication unit 58 of the smart phone 5 receives the planar image data, the image identifier, and the attribute data.

The special image capturing device 1 starts capturing the image (S16). In capturing the image, the image capturing unit 13 captures an object and its surroundings, to generate two hemispherical images as illustrated in FIGS. 3A and 3B, as frame data of video image. The image and audio processing unit 15 generates data of the equirectangular projection image as illustrated in FIG. 3C, based on the two hemispherical images. The storing and reading unit 19 stores the equirectangular projection image in the memory 1000. The short-range communication unit 18 of the special image capturing device 1 transmits the equirectangular projection image data, obtained at S16, to the smart phone 5 (S17). With the equirectangular projection image data, the image identifier for identifying the equirectangular projection image data, and attribute data, are transmitted. The short-range communication unit 58 of the smart phone 5 receives the equirectangular projection image data, the image identifier, and the attribute data. The equirectangular projection image data may be generated by the smart phone 5, instead of the special image capturing device 1. In such case, the special image capturing device 1 transmits, to the smart phone 5, two items of hemispherical image data, the image identifier, and the attribute data.

Next, the storing and reading unit 59 of the smart phone 5 stores the planar image data received at S15, and the equirectangular projection image data received at S17, in the same folder in the memory 5000 (S18).

Next, the image and audio processing unit 55 of the smart phone 5 generates superimposed display metadata, which is used to display an image where the planar image P is partly superimposed on the spherical image CE (S19). Here, the planar image P is a high-definition image, and the spherical image CE is a low-definition image. The storing and reading unit 59 stores the superimposed display metadata in the memory 5000.

Referring to FIGS. 19 to 22, operation of generating superimposed display metadata is described in detail, according to the embodiment. Even when the generic image capturing device 3 and the special image capturing device 1 are equal in resolution of imaging element, the imaging element of the special image capturing device 1 captures a wide area to obtain the equirectangular projection image, from which the spherical image CE is generated. Accordingly, the image data captured with the special image capturing device 1 tends to be low in definition per unit area.

<Generation of Superimposed Display Metadata>

First, operation of generating the superimposed display metadata is described. The superimposed display metadata is used to display an image on the display 517, where the high-definition planar image P is superimposed on the spherical image CE. The spherical image CE is generated from the low-definition equirectangular projection image EC. The planar image Pi and the equirectangular projection image ECi, which are a set of video frames in this example, are subjected to processing.

Referring to FIG. 19, the extractor 550 extracts a plurality of feature points fp1 from the rectangular, equirectangular projection image ECi captured in equirectangular projection (S110). The extractor 550 further extracts a plurality of feature points fp2 from the rectangular, planar image Pi captured in perspective projection (S110).

Next, the first area calculator 552 calculates a rectangular, first area CA1 in the equirectangular projection image ECi, which corresponds to the planar image Pi, based on similarity between the feature value fv1 of the feature points fp1 in the equirectangular projection image ECi, and the feature value fv2 of the feature points fp2 in the planar image Pi, using the homography (S120). More specifically, the first area calculator 552 calculates a rectangular, first area CA1 in the equirectangular projection image ECi, which corresponds to the planar image Pi, based on similarity between the feature value fv1 of the feature points fp1 in the equirectangular projection image ECi, and the feature value fv2 of the feature points fp2 in the planar image Pi, using the homography (S120). The above-described processing is performed to roughly estimate corresponding pixel (gird) positions between the planar image Pi and the equirectangular projection image ECi that differ in projection.

Next, the point of gaze specifier 554 identifies the point (referred to as the point of gaze) in the equirectangular projection image ECi, which corresponds to the central point CP1 of the planar image Pi after the first homography transformation (S130).

The projection converter 556 extracts a peripheral area PA, which is a part surrounding the point of gaze GP1, from the equirectangular projection image ECi. The projection converter 556 converts the peripheral area PA, from the equirectangular projection to the perspective projection, to generate a peripheral area image PIi (S140).

The extractor 550 extracts a plurality of feature points fp3 from the peripheral area image PIi, which is obtained by the projection converter 556 (S150).

Next, the second area calculator 558 calculates a rectangular, second area CA2 in the peripheral area image PIi, which corresponds to the planar image Pi, based on similarity between the feature value fv2 of the feature points fp2 in the planar image Pi, and the feature value fv3 of the feature points fp3 in the peripheral area image PIi using the second homography (S160). In this example, the planar image Pi, which is a high-definition image of 40 million pixels, may be reduced in size.

Next, as illustrated in FIG. 21A, the reference shape generator 559 generates the reference shape DF based on the diagonal angle of view β and the aspect ratio of a rectangle (projection method) (S170).

The area divider 560 divides the area defined by the reference shape DF into a plurality of grid areas as illustrated in FIG. 21C (S180).

The projection reverse converter 562 reversely converts the projection of the reference shape DF, which have been divided into the grid areas, to the equirectangular projection of the equirectangular projection image ECi. With this projection transform the points that correspond to the grids of the reference shape DF are determined on the equirectangular projection image ECi, to form a reference shape BF in equirectangular projection (S190). Through processing by the projection reverse converter 562, the reference location data (reference location parameter) is generated, which indicates the coordinates of each grid in each grid area.

The reference shape conversion data calculator 568 calculates reference shape conversion data, which is used for transforming a projection of the reference shape BF to match a projection of the second corresponding area CA2 by rotating, scaling (enlarging or reducing), or movement (shifting) (S200).

As illustrated in FIG. 17, the superimposed display metadata generator 570 generates the superimposed display metadata, based on the equirectangular projection image information acquired from the special image capturing device 1, the planar image information acquired from the general image capturing device 3, the reference location data generated at S190, the reference shape conversion data obtained at S200, and the video frame count value output from the metadata generation video frame extractor 548. The superimposed display metadata is stored in the memory 5000 by the storing and reading unit 59.

Then, the operation of generating the superimposed display metadata performed at S19 of FIG. 18 ends. The display control 56, which cooperates with the storing and reading unit 59, superimposes the images, using the superimposed display metadata (S20).

Figure 23:
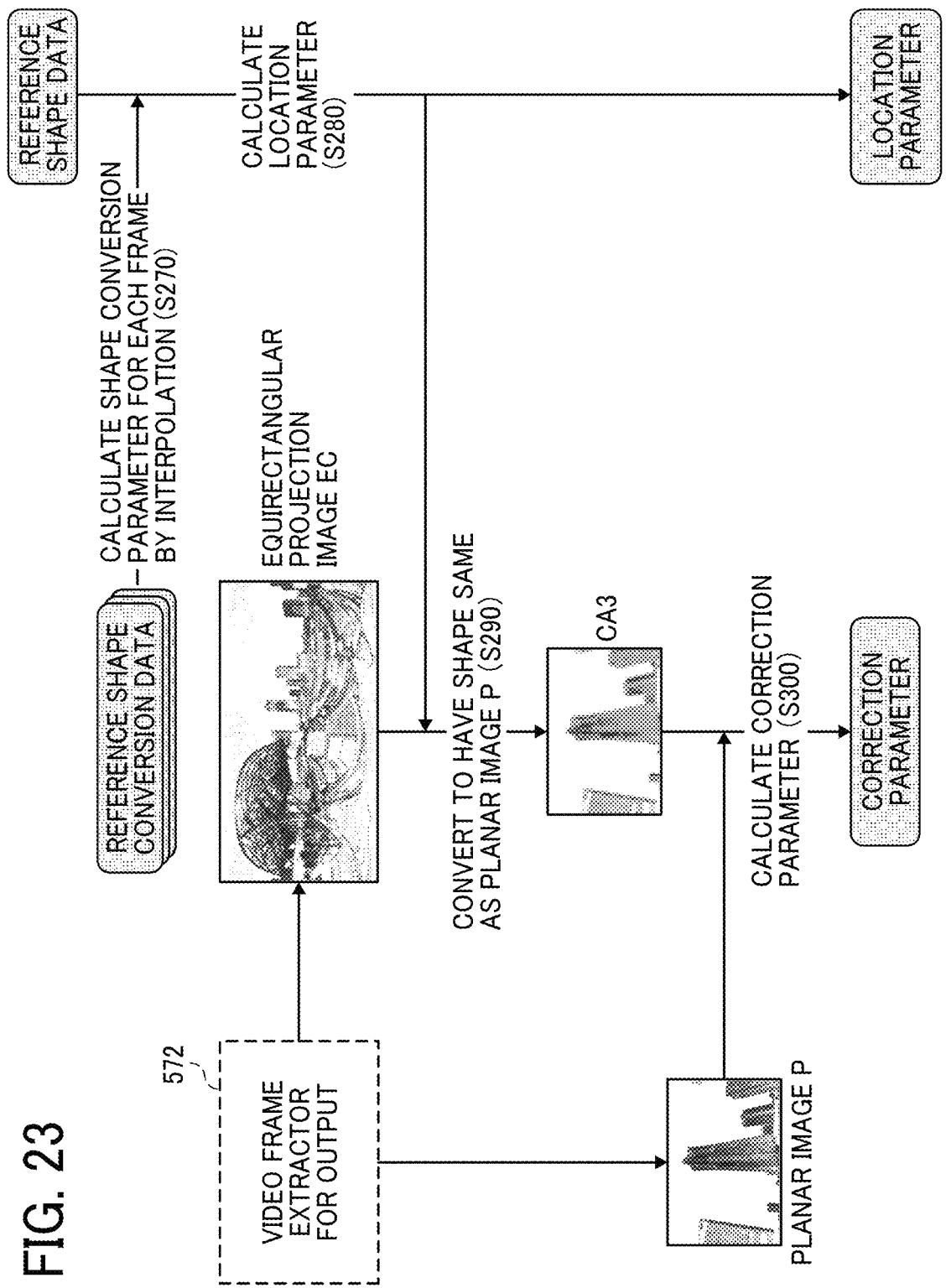
FIG. 23 is a conceptual diagram illustrating operation of superimposing images, according to the first embodiment.
Figure 28:
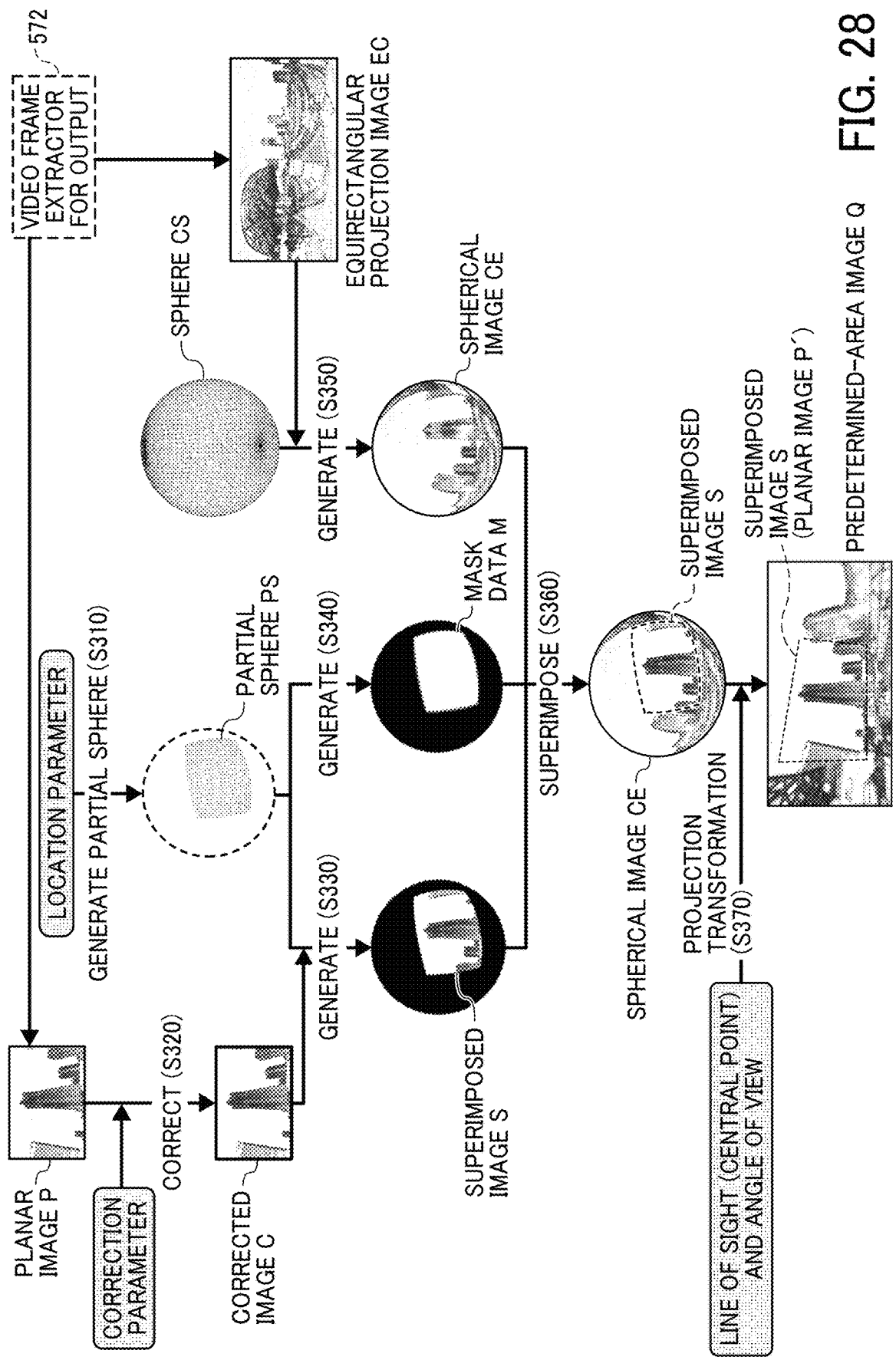
FIG. 28 is a conceptual diagram illustrating operation of superimposing images, according to the first embodiment.

Referring to FIGS. 23 to 34, operation of superimposing images is described according to the embodiment. FIGS. 23 and 28 are conceptual diagrams illustrating operation of superimposing images, with images being processed or generated, according to the embodiment. Specifically, FIG. 23 illustrates a process of calculating a location parameter and a correction parameter, which is a first half of the operation of superimposing images. FIG. 28 illustrates a process of superimposing the planar image P on the spherical image CE, which is a latter half of the operation of superimposing images.

The storing and reading unit (obtainer) 59 previously reads the reference location data and the reference shape conversion data, from the superimposed display metadata stored in the memory 5000. The storing and reading unit (obtainer) 59 obtains, for each frame of the video image, data of the equirectangular projection image EC in equirectangular projection, and data of the planar image P in perspective projection, according to a video playback time.

The interpolation processing unit 574 reads the reference shape conversion data generated by the metadata generator 55*a* having the video frame identification data that corresponds to the video playback time determined by the playback time manager 571, and applies interpolation as needed, to calculate a shape conversion parameter for a video frame to be displayed at each playback time (S270). The interpolation processing, which is linear interpolation, for example, is described above referring to FIG. 16.

Referring to FIGS. 24A to 24F (FIG. 24), generation of the shape conversion parameter is described in detail, according to the embodiment. Referring to FIG. 24, interpolation processing, which is performed in generating the shape conversion parameter, is also described. In the present embodiment, the reference shape rotation data and the reference shape movement data of the reference shape conversion data are each expressed in angle. Specifically, referring to FIG. 24, interpolation is applied to the value of longitude (Pan) illustrated in FIG. 17.

When a rotation angle is obtained from a homography matrix, the rotation angle ranges from −180 degrees to +180 degrees as illustrated in FIG. 24A. Since the angle of −180 degrees and the angle of +180 degrees is at a same position, if interpolation is applied to frames that cross the boundary of ±180 degrees, interpolation processing may output unintended result. For example, it is assumed that a video image consists of frames captured at intervals of one second, and the rotation angles of the frames are 130 degrees, 150 degrees, 170 degrees, −170 degrees, −150 degrees, and −130 degrees. In such case, as illustrated in FIG. 24B, it can be assumed that the object in the planar image (that is, the reference shape) moves at a constant speed in a counter-clockwise direction from 130 degrees to −130 degrees.

However, if interpolation processing is applied to the frames of video at 0.5 second intervals, the interpolation result of the frame of 170 degrees and the frame of −170 degrees becomes 0. This may cause a dramatic shift in a clockwise direction, which is opposite of the direction of moving, as illustrated in FIG. 24C.

In view of the above, the interpolation processing unit 574 determines which of a clockwise direction and a couter-clockwise direction, leads to a closest path to a next frame, when interpolating the frames. Further, based on this determination, the interpolation processing unit 574 determines whether the closest path crosses the boundary of ±180 degrees, and controls interpolation processing based on this determination. For example, as illustrated in FIG. 24D, when the reference shape indicated by the reference location parameter is moved or rotated from 130 degrees (point A) to −130 degrees (point B), the closest path is in the counter-clockwise direction. Since the closet path crosses the boundary of +180 degrees, the interpolation processing unit 574 applies interpolation to the frame at point A (130 degrees) and the frame at (point B+360 degrees). As illustrated in FIG. 24E, when the reference shape is moved or rotated from 130 degrees (point C) to −20 degrees (point D), the path in the clockwise direction is closer. Since the path from the point C to the point D does not cross the boundary of +180 degrees, the interpolation processing unit 574 applies interpolation to the frame at the point C (130 degrees) and the frame at the point D (−20 degrees). As illustrated in FIG. 24F, when the reference shape is moved or rotated from −130 degrees (point E) to 130 degrees (point F), the path in the clockwise direction is closer. Since the path from the point E to the point F does cross the boundary of ±180 degrees, the interpolation processing unit 574 applies interpolation to the frame at the point E (−130 degrees) and the frame at the point F (point D−360 degrees). By controlling interpolation processing based on the rotation angle, movement or rotation of the object in the planar image becomes smooth even when the closest path is taken, except for the case where the interval of a video frame is sufficiently large with respect to the speed of movement or rotation.

Referring back to FIG. 23, the location parameter calculator 576 calculates the location parameter for a specific time, using the reference location data (reference location parameter) generated by the metadata generator 55a and the shape conversion parameter obtained by the interpolation processing unit 574 using the reference shape conversion data (S280).

Referring to FIGS. 25A to 25G (FIG. 25), operation of calculating the location parameter is described in detail, according to the embodiment. FIG. 25 is a three-dimensional conceptual diagram illustrating processing, performed by the location parameter calculator 576, according to the embodiment. FIG. 25A is an illustration for explaining generation of coordinates (partial sphere PS) on a 3D sphere CS, according to the reference location parameter. The coordinates are generated using, for example, the equation 4 as described above referring to FIGS. 3 to 5.

Next, as illustrated in FIG. 25B, the location parameter calculator 576 obtains a plane composed of three points out of the four corners of the partial sphere PS, and projects each point of the plane on the sphere CS. Here, a center of the sphere CS corresponds to a viewpoint. These three points may be arbitrarily selected. Further, the plane on the three-dimensional sphere can be defined by these three points using any desired known method. For example, if projection from the partial sphere PS to the plane results in a point P (a, b, c) on the partial sphere PS, the equation for obtaining a straight line from the origin (viewpoint) to the point P is expressed as (x, y, z)=t(a, b, c), with t being a parameter. Then, the intersection of the plane and the straight line can be obtained.

As illustrated in FIG. 25C, the location parameter calculator 576 translates each point so that the center of the plane comes to the origin, i.e., the center of the sphere CS. For example, the central point of the plane may be obtained as an average of coordinates of four corners of the plane. A vector for moving that central point to the origin of the sphere CS is obtained. The obtained vector is then added to each corner of the plane.

As illustrated in FIG. 25D, the location parameter calculator 576 applies processing to each point in the plane illustrated in FIG. 25C, based on parameters indicating rotation and/or scaling, of the shape conversion parameter obtained by the interpolation processing unit 574. Here, the shape conversion parameter may be data to which interpolation has been applied to a parameter obtained using the reference shape conversion data as described above referring to FIG. 23. Since the plane (partial sphere PS) is moved to the origin, rotation and/or scaling can be applied at local coordinates without further converting the parameters indicating rotation and/or scaling.

Next, as illustrated in FIG. 25E, the location parameter calculator 576 adds a vector, which is opposite to the vector used for moving the central point of the plane to the origin, to each point of the plane. Accordingly, the plane is placed at the location as illustrated in FIG. 25A.

As illustrated in FIG. 25F, the location parameter calculator 576 transform is coordinates of each point on the plane to place on the 3D sphere CS. For example, any arbitrarily point on a plane is defined as Q(d, e, f). To project this point on a sphere of radius 1, a vector is applied to the point, such that the vector length from the origin of the sphere to the point Q becomes 1.

As illustrated in FIG. 25E, the location parameter calculator 576 moves each point of the plane (partial sphere PS) projected on the sphere CS, according to the reference shape movement data read from the reference shape conversion data obtained by the interpolation processing unit 574. Since the reference shape movement data indicates an amount of rotation about the origin, a rotation matrix is applied to (x, y, z) coordinates. As illustrated in FIG. 25F, the three-dimensional coordinates (x, y, z) to which the reference location parameter is applied, is then transformed to the coordinates in the equirectangular projection image EC. Accordingly, through the described processing, the location parameter is calculated.

In this example, the partial sphere PS is moved according to the reference shape movement data, after it is transformed to the coordinates in the equirectangular projection image EC as illustrated in FIG. 25C. Alternatively, the partial sphere PS may be moved according to the reference shape movement data, without applying projection transformation.

Referring back to FIG. 23, the shape converter 578 transforms the area on the equirectangular projection image EC, specified by the location parameter calculated by the location parameter calculator 576, into a rectangular shape that is the same as the planar image P, to generate a third corresponding area CA3 (S290). The correction parameter generator 580 compares the third corresponding area CA3 with the planar image P extracted from the output video frame extractor 572, to generate the correction parameter (S300).

Referring to FIG. 28, the storing and reading unit (obtainer) 59 illustrated in FIG. 13 reads from the memory 5000, data of the equirectangular projection image EC in equirectangular projection, data of the planar image P in perspective projection, and the location parameter. The output video frame extractor 572 selects the data of the equirectangular projection image EC and the data of the planar image P, as frames of video image.

Next, as illustrated in FIG. 28, the superimposed area generator 582 uses the reference location parameter and the location parameter to generate a partial sphere PS on the virtual sphere CS (S310).

The correction unit 584 corrects the brightness and color of the planar image P, using the correction parameter generated by the correction parameter generator 580, to match the brightness and color of the equirectangular projection image EC (S320). The planar image P that has been corrected is referred to as a correction image C. The planar image P, which has been corrected, is referred to as the "corrected planar image C".

The image generator 586 superimposes the corrected planar image C of the planar image P, on the partial sphere PS to generate the superimposed image S (S330). The image generator 586 generates mask data M based on the partial sphere PS (S340). The image generator 586 covers (attaches) the equirectangular projection image EC, over a surface of the sphere CS, to generate the spherical image CE (S350). The image superimposing unit 588 superimposes the superimposed image S and the mask data M, on the spherical image CE (S360). The image is generated, in which the high-definition superimposed image S is superimposed on the low-definition spherical image CE. With the mask data, the boundary between the two different images is made unnoticeable.

As illustrated in FIG. 7, the projection converter 590 converts projection, such that the predetermined area T of the spherical image CE, with the superimposed image S being superimposed, is displayed on the display 517, for example, in response to a user instruction for display. The projection transformation is performed based on the line of sight of the user (the direction of the virtual camera IC, represented by the central point CP of the predetermined area T), and the angle of view α of the predetermined area T (S370). The projection converter 590 may further change a size of the predetermined area T according to the resolution of the display area of the display 517. Accordingly, referring to FIG. 18, the display control 56 displays the predetermined-area image Q, that is, the image of the predetermined area T, in the entire display area of the display 517 (S21). In this example, the predetermined-area image Q includes the superimposed image S superimposed with the planar image P.

Figure 29:
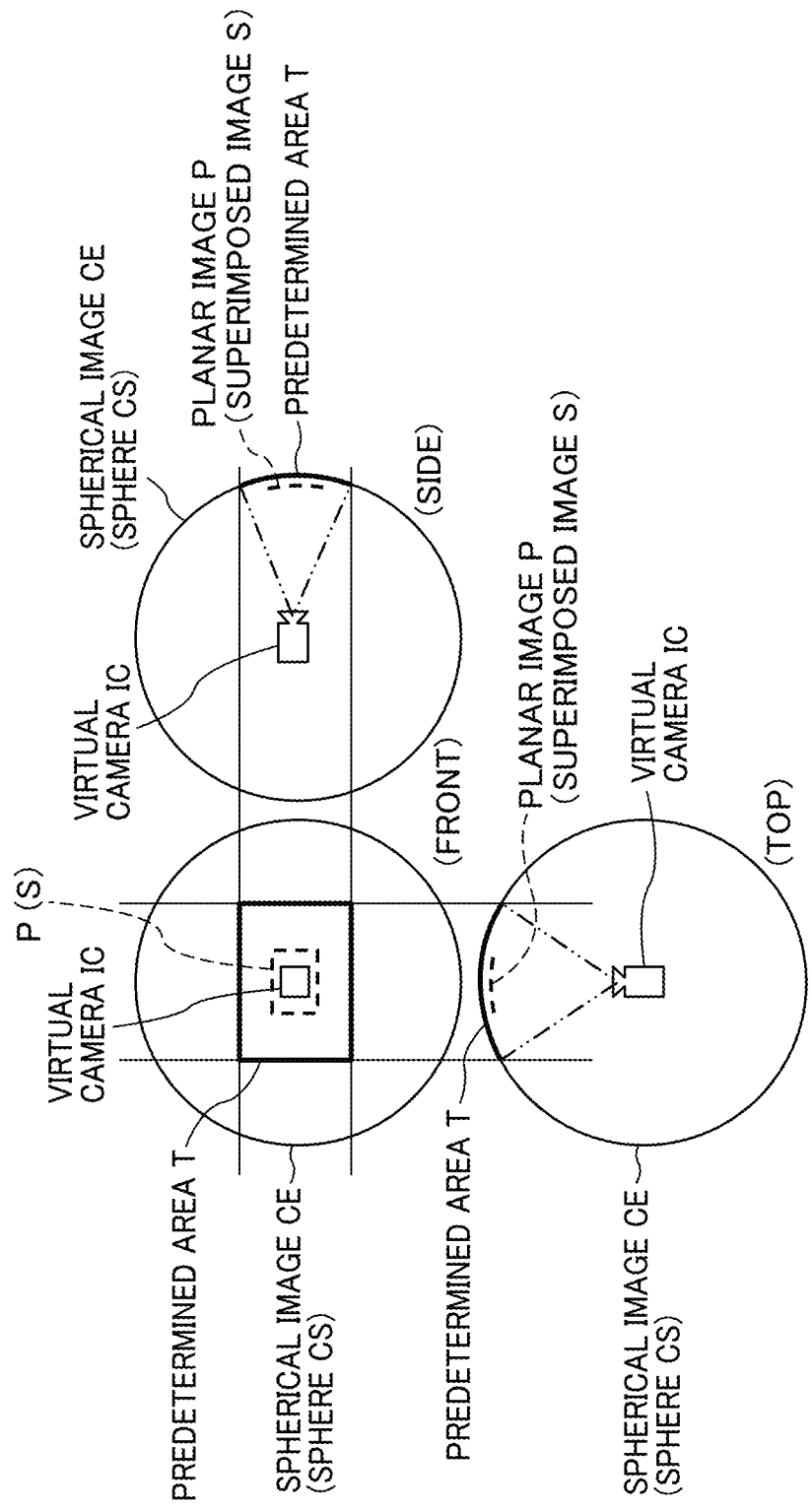
FIG. 29 is a conceptual diagram illustrating a two-dimensional view of the spherical image superimposed with the planar image, according to the first embodiment.

Referring to FIGS. 29 to 33, display of the superimposed image is described in detail, according to the embodiment. FIG. 29 is a conceptual diagram illustrating a two-dimensional view of the spherical image CE superimposed with the planar image P. The planar image P is superimposed on the spherical image CE illustrated in FIG. 5. As illustrated in FIG. 29, the high-definition superimposed image S is superimposed on the spherical image CE, which covers a surface of the sphere CS, to be within the inner side of the sphere CS, according to the location parameter.

Figure 30:
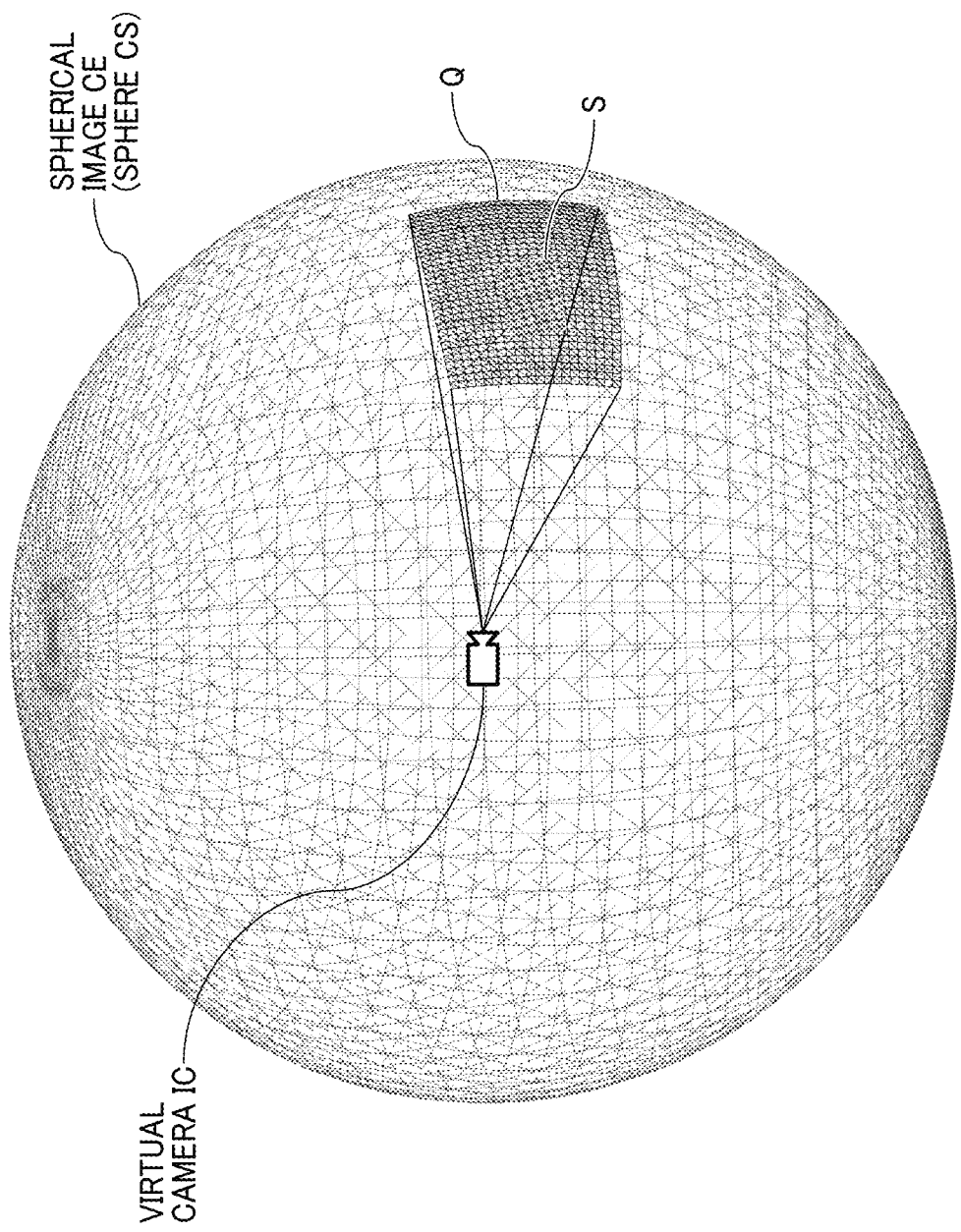
FIG. 30 is a conceptual diagram illustrating a three-dimensional view of the spherical image superimposed with the planar image, according to the first embodiment.

FIG. 30 is a conceptual diagram illustrating a three-dimensional view of the spherical image CE superimposed with the planar image P. FIG. 30 represents a state in which the spherical image CE and the superimposed image S cover a surface of the sphere CS, and the predetermined-area image Q includes the superimposed image S.

Figure 31A:
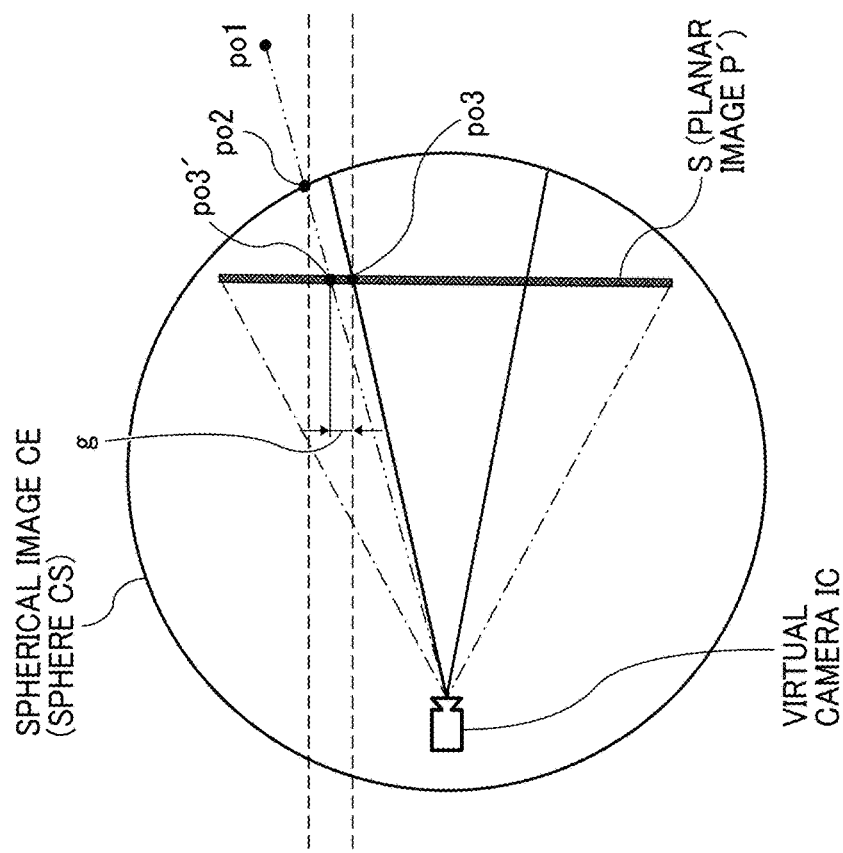
FIGS. 31A and 31B (FIG. 31) are conceptual diagrams illustrating a two-dimensional view of a spherical image superimposed with a planar image, without using the location parameter, according to a comparative example.
Figure 31B:
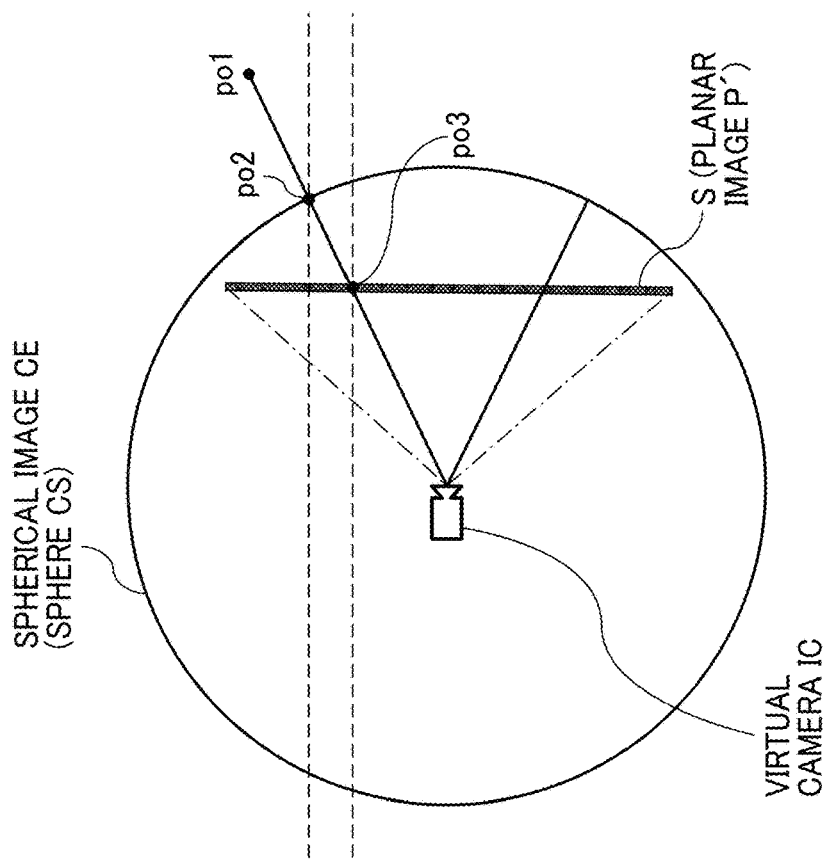

FIGS. 31A and 31B are conceptual diagrams illustrating a two-dimensional view of a spherical image superimposed with a planar image, without using the location parameter, according to a comparative example. FIGS. 32A and 32B are conceptual diagrams illustrating a two-dimensional view of the spherical image CE superimposed with the planar image P, using the location parameter, in this embodiment.

As illustrated in FIG. 31A, it is assumed that the virtual camera IC, which corresponds to the user's point of view, is located at the center of the sphere CS, which is a reference point. The object po1, as an image capturing target, is represented by the object po2 in the spherical image CE. The object po1 is represented by the object po3 in the superimposed image S. Still referring to FIG. 31A, the object po2 and the object po3 are positioned along a straight line connecting the virtual camera IC and the object po1. This indicates that, even when the superimposed image S is displayed as being superimposed on the spherical image CE, the coordinate of the spherical image CE and the coordinate of the superimposed image S match. As illustrated in FIG. 31B, if the virtual camera IC is moved away from the center of the sphere CS, the position of the object po2 stays on the straight line connecting the virtual camera IC and the object po1, but the position of the object po3 is slightly shifted to the position of an object po3'. The object po3' is an object in the superimposed image S, which is positioned along the straight line connecting the virtual camera IC and the object po1. This will cause a difference in grid positions between the spherical image CE and the superimposed image S, by an amount of shift "g" between the object po3 and the object po3'. Accordingly, in displaying the superimposed image S, the coordinate of the superimposed image S is shifted from the coordinate of the spherical image CE.

In view of the above, in this embodiment, the location parameter is generated, which indicates respective positions of a plurality of grid areas in the superimposed image S with respect to the planar image P. With this location parameter, as illustrated in FIGS. 32A and 32B, the superimposed image S is superimposed on the full-view spherical image CE at right positions, while compensating the shift. More specifically, as illustrated in FIG. 32A, when the virtual camera IC is at the center of the sphere CS, the object po2 and the object po3 are positioned along the straight line connecting the virtual camera IC and the object po1. As illustrated in FIG. 32B, even when the virtual camera IC is moved away from the center of the sphere CS, the object po2 and the object po3 are positioned along the straight line connecting the virtual camera IC and the object po1. Even when the superimposed image S is displayed as being superimposed on the spherical image CE, the coordinate of the spherical image CE and the coordinate of the superimposed image S match.

While the example illustrated in FIGS. 32A and 32B may prevent shift compared to the example illustrated in FIGS. 31A and 31B, the present application may be applicable to the example illustrated in FIGS. 31A and 31B as long as the images are superimposed one above the other as they were one image.

Figure 33A:
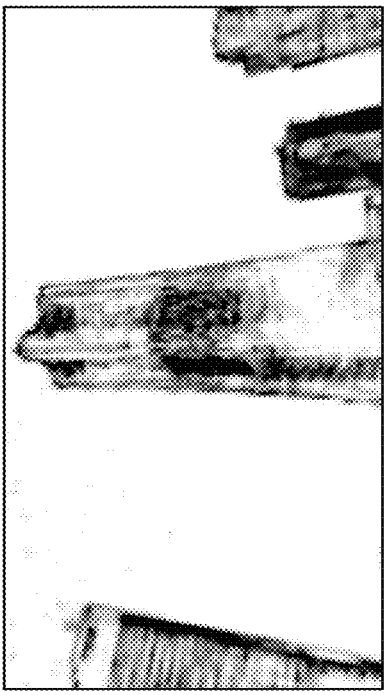
FIGS. 33A, 33B, 33C, and 33D (FIG. 33) are illustrations of a wide-angle image without superimposed display, a telephoto image without superimposed display, a wide-angle image with superimposed display, and a telephoto image with superimposed display, according to the first embodiment.
Figure 33B:
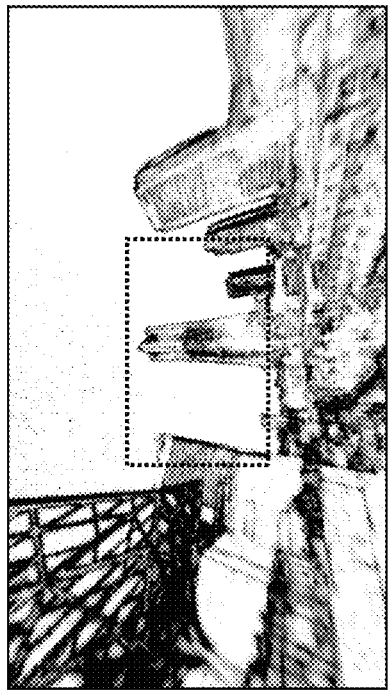
Figure 33C:
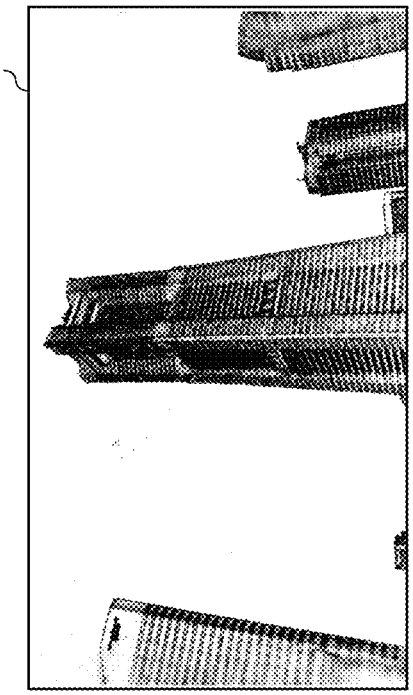
Figure 33D:
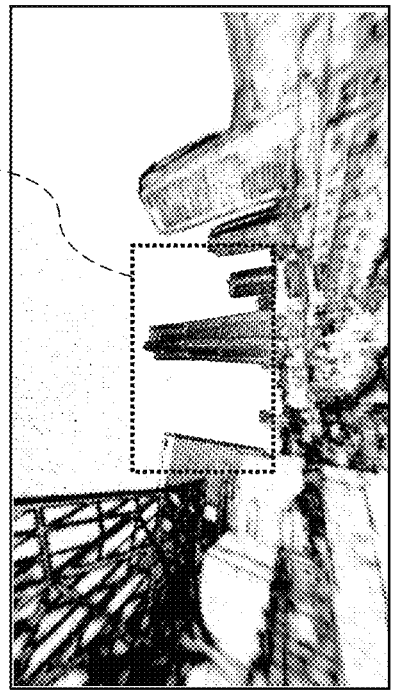

FIG. 33A illustrates the spherical image CE, when displayed as a wide-angle image. Here, the planar image P is not superimposed on the spherical image CE. FIG. 33B illustrates the spherical image CE, when displayed as a telephoto image. Here, the planar image P is not superimposed on the spherical image CE. FIG. 33C illustrates the spherical image CE, superimposed with the planar image P, when displayed as a wide-angle image. FIG. 33D illustrates the spherical image CE, superimposed with the planar image P, when displayed as a telephoto image. The dotted line in each of FIGS. 33A and 33C, which indicates the boundary of the planar image P, is shown for the descriptive purposes. Such dotted line may be displayed, or not displayed, on the display 517 to the user.

It is assumed that, while the spherical image CE without the planar image P being superimposed, is displayed as illustrated in FIG. 33A, a user instruction for enlarging an area indicated by the dotted area is received. In such case, as illustrated in FIG. 33B, the enlarged, low-definition image, which is a blurred image, is displayed to the user. As described above in this embodiment, it is assumed that, while the spherical image CE with the planar image P being superimposed, is displayed as illustrated in FIG. 33C, a user instruction for enlarging an area indicated by the dotted area is received. In such case, as illustrated in FIG. 33D, a high-definition image, which is a clear image, is displayed to the user. For example, assuming that the target object, which is shown within the dotted line, has a sign with some characters, even when the user enlarges that section, the user may not be able to read such characters if the image is blurred. If the high-definition planar image P is superimposed on that section, the high-quality image will be displayed to the user such that the user is able to read those characters.

Further, as in the present embodiment, when the planar image P that is frame data of a video image is superimposed on the spherical image CE which is also frame data of a video image, the images are displayed as illustrated in FIGS. 34A to 34D. FIGS. 34A to 34D (FIG. 34) are example illustrations of a planar image, which is a video image, being displayed on a predetermined-area image, which is also a video image.

Figure 34A:
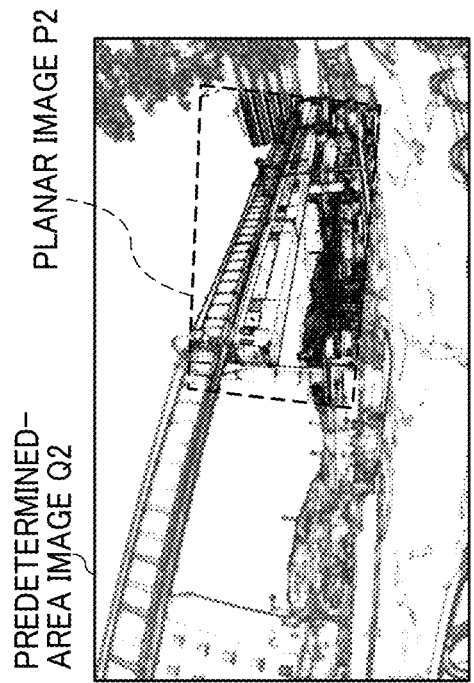
FIGS. 34A, 34B, 34C, and 34D (FIG. 34) are illustrations for screens displaying a video, planar image at a predetermined area of a video, spherical image, according to the first embodiment.
Figure 34B:
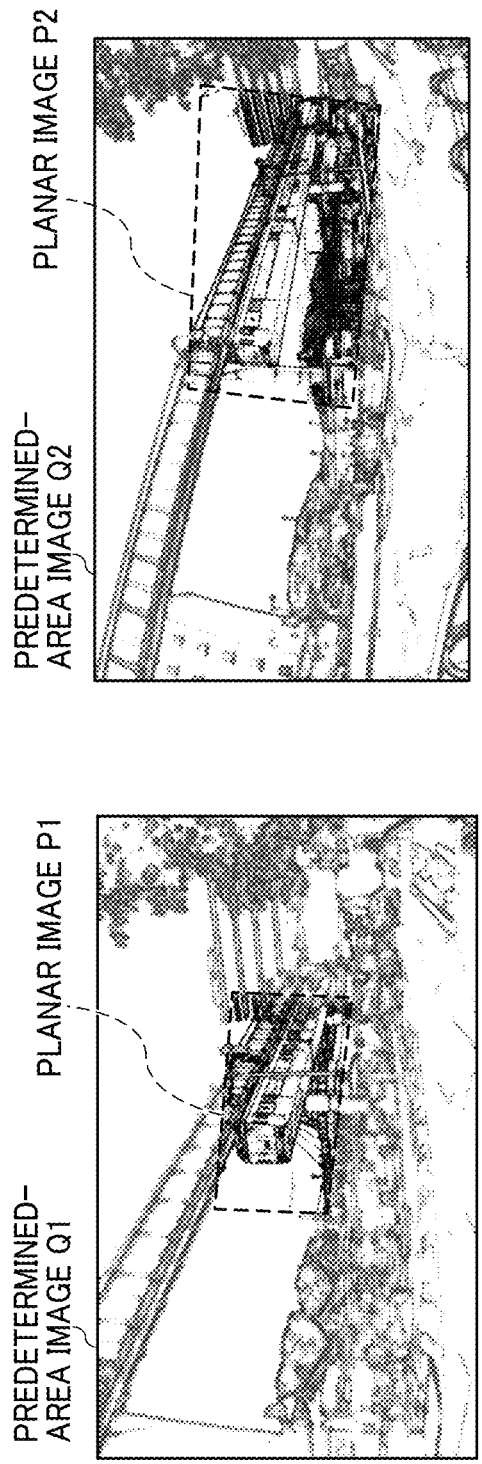
Figure 34C:
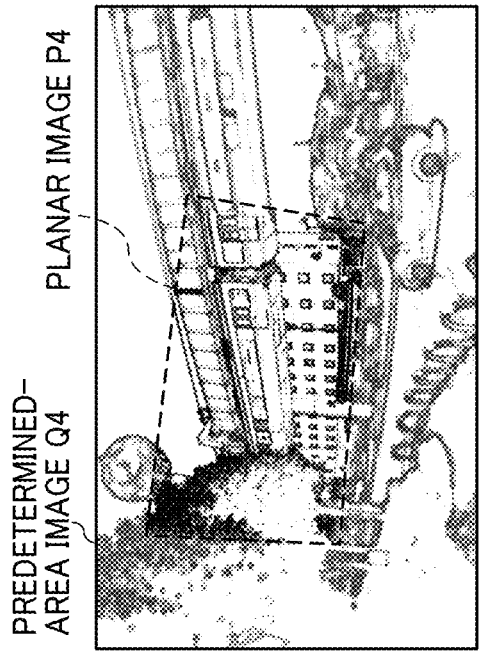
Figure 34D:
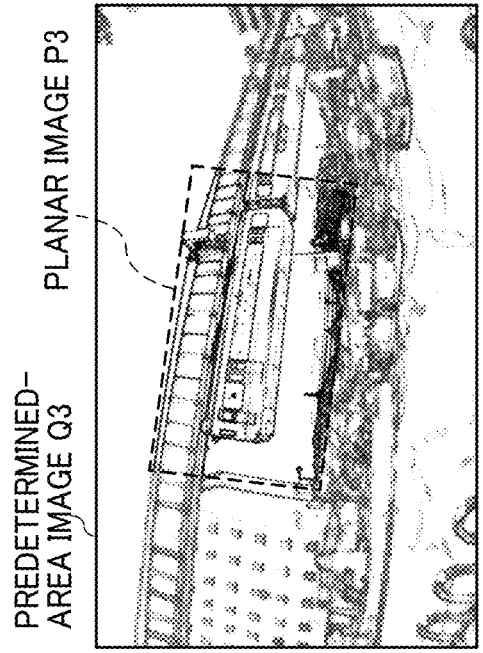

On the display 517, the predetermined-area images Q1 in FIG. 34A, Q2 in FIG. 34B, Q3 in FIG. 34C, and Q4 in FIG. 34D, are displayed in time series, in this order. The predetermined-area images Q1, Q2, Q3, and Q4 are displayed with the planar images P1, P2, P3, and P4, respectively. The predetermined-area images Q1, Q2, Q3, and Q4 are low-definition images. Since the planar images P1, P2, P3, and P4 are high-definition images, the user can enlarge the planar images P1, P2, P3, and P4 to see details of a target object.

When the background image (equirectangular projection image) and the foreground image (planar image) are still images, location information on a plurality of points in the foreground image, and correction parameters for correcting brightness or color may be stored in association with location information on a plurality of points in the background image. However, if this method of storing information is applied to a video image, an amount of the superimposed display metadata increases proportionally to a recording time of the video image. Unlike the case of still image, the superimposed location of the foreground image on the background image at a certain time, and the superimposed location of the foreground image on the background image at another certain time, usually change for the case of video image. Accordingly, it is necessary to record the superimposed location for each frame of the video image as the foreground image, for each time. That is, location information indicating the superimposed location is needed for each of frames of the video image. The superimposed display metadata thus needs to hold a large amount of location information. The superimposing unit 55b performs processing to superimpose the foreground image on the background image for each frame using the superimposed display metadata, thus increasing the processing load.

In view of the above, in the present embodiment, as illustrated in FIG. 22A, the reference shape BF is determined on the background image using the reference location parameter. With the reference shape conversion data for rotating, scaling, and moving the reference shape BF on the three-dimensional model space, a data size of the superimposed display metadata used for calculating the superimposed location in each frame of the video image can be made smaller. Further, the reference shape conversion data is recorded for a limited number of frames obtained through sampling, rather than for all frames of the video image. This effectively reduces an amount of data for parameters. Such parameter with less amount of data further reduces a time, or load, required for processing to be performed when displaying one image superimposed on another image, for example, via a viewer. Examples of processing that the load is reduced include, but not limited to, processing performed by OpenGL ES, which is a graphic library used for visualizing two-dimensional (2D) and three-dimensional (3D) data. As described above, the superimposed display metadata is recorded as metadata that can be referred to by a program stored in an external resource (external program). The interpolation processing unit 574, which is implemented by the external program, reads time-series data of reference shape conversion data regarding rotation, scaling, or movement, and further applies interpolation when needed, to seamlessly process superimposition of images in real time.

Further, as described above in this embodiment, even when images that differ in projection are superimposed one above the other, the grid shift caused by the difference in projection can be compensated. For example, even when the planar image P in perspective projection is superimposed on the equirectangular projection image EC in equirectangular projection, these images are displayed with the same coordinate positions.

As illustrated in FIG. 33C, the high-definition planar image P is superimposed on a part of the predetermined-area image on the low-definition, spherical image CE. The planar image P fits in the spherical image CE, when displayed to the user. Accordingly, the user can easily see the images, without feeling strangeness.

Further, in this embodiment, the reference shape is set, for example, according to an angle of view. The reference shape BF is further applied with the reference shape conversion data for rotating, scaling, and moving the reference shape BF on the three-dimensional model space. This greatly reduces an amount of data for the location parameter, which is used when superimposing a frame of one video image on a frame of another video image, even when the video images are in different projections. Further, the parameters are recorded for a number of frames obtained through sampling, rather than for all frames of the video image. This effectively reduces an amount of data for parameters.

Second Embodiment

Referring now to FIGS. 35 to 40, an image capturing system is described according to a second embodiment.

<Overview of Image Capturing System>

Figure 35:
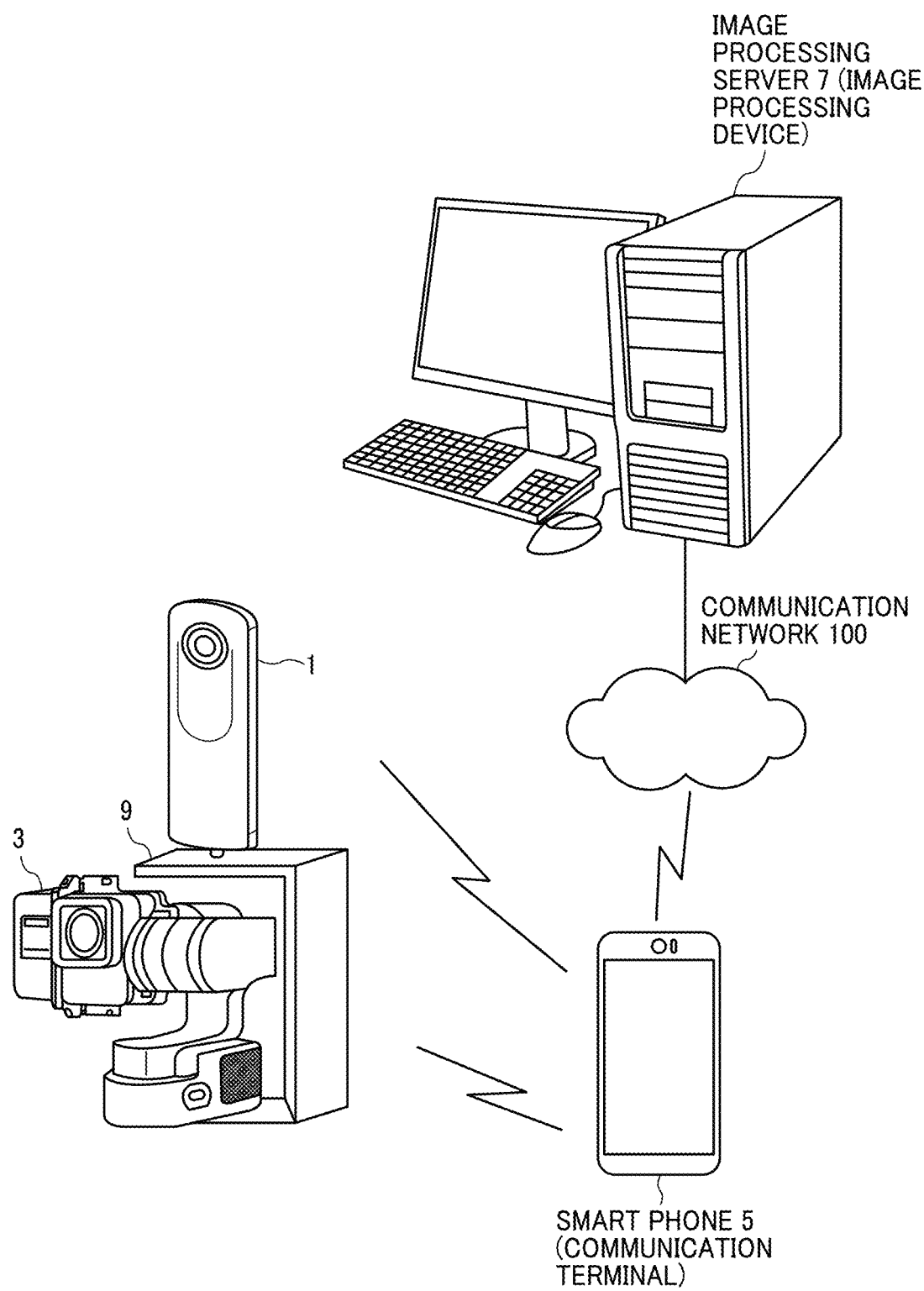
FIG. 35 is a schematic view illustrating an image capturing system according to a second embodiment.

First, referring to FIG. 35, an overview of the image capturing system is described according to the second embodiment. FIG. 35 is a schematic diagram illustrating a configuration of the image capturing system according to the embodiment.

As illustrated in FIG. 35, compared to the image capturing system of the first embodiment described above, the image capturing system of this embodiment further includes an image processing server 7. In the second embodiment, the elements that are substantially same to the elements described in the first embodiment are assigned with the same reference numerals. For descriptive purposes, description thereof is omitted. The smart phone 5 and the image processing server 7 communicate with each other through the communication network 100 such as the Internet and the Intranet.

In the first embodiment, the smart phone 5 generates superimposed display metadata, and processes superimposition of images. In this second embodiment, the image processing server 7 performs such processing, instead of the smart phone 5. The smart phone 5 in this embodiment is one example of the communication terminal, and the image processing server 7 is one example of the image processing apparatus or device.

The image processing server 7 is a server system, which is implemented by a plurality of computers that may be distributed over the network to perform processing such as image processing in cooperation with one another.

<Hardware Configuration>

Figure 36:
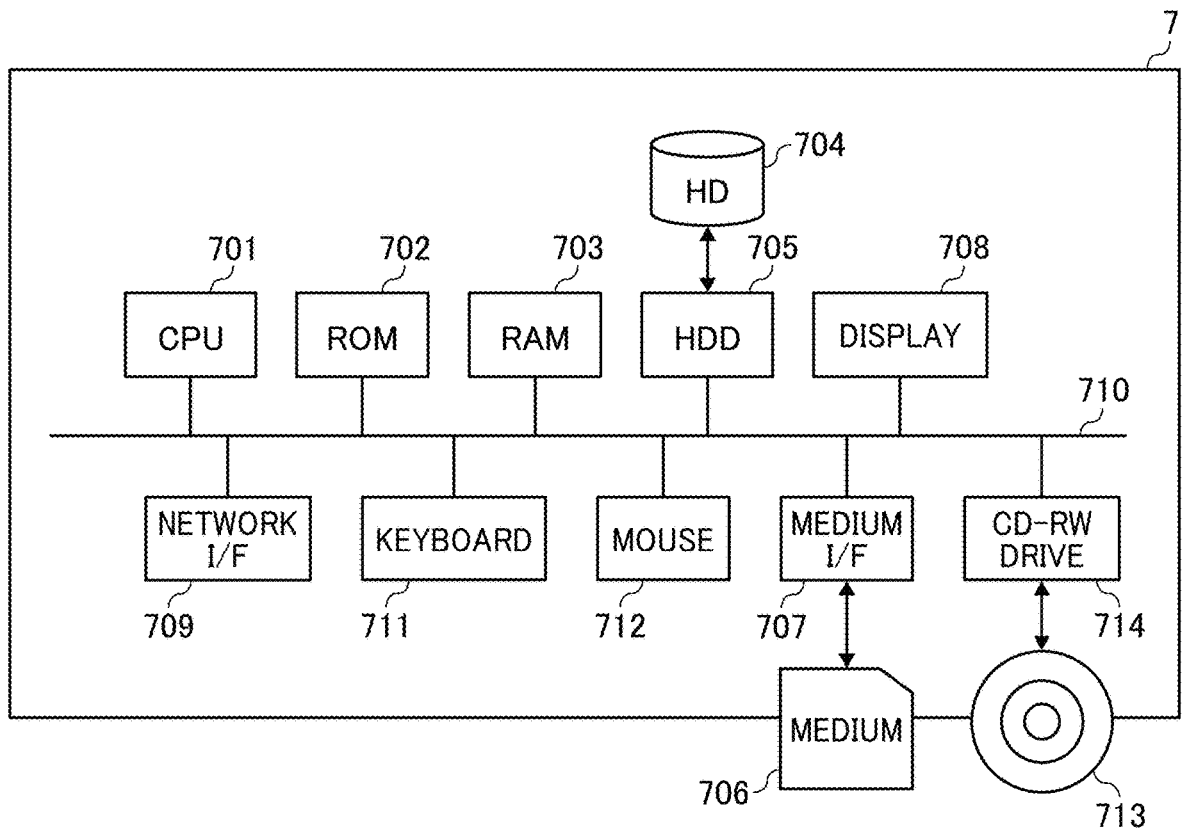
FIG. 36 is a schematic diagram illustrating a hardware configuration of an image processing server according to the second embodiment.

Next, referring to FIG. 36, a hardware configuration of the image processing server 7 is described according to the embodiment. FIG. 36 illustrates a hardware configuration of the image processing server 7 according to the embodiment. Since the special image capturing device 1, the generic image capturing device 3, and the smart phone 5 are substantially the same in hardware configuration, as described in the first embodiment, description thereof is omitted.

<Hardware Configuration of Image Processing Server>

FIG. 36 is a schematic block diagram illustrating a hardware configuration of the image processing server 7, according to the embodiment. Referring to FIG. 36, the image processing server 7, which is implemented by the general-purpose computer, includes a CPU 701, a ROM 702, a RAM 703, a HD 704, a HDD 705, a medium I/F 707, a display 708, a network I/F 709, a keyboard 711, a mouse 712, a CD-RW drive 714, and a bus line 710. Since the image processing server 7 operates as a server, an input device such as the keyboard 711 and the mouse 712, or an output device such as the display 708 does not have to be provided.

The CPU 701 controls entire operation of the image processing server 7. The ROM 702 stores a control program for controlling the CPU 701. The RAM 703 is used as a work area for the CPU 701. The HD 704 stores various data such as programs. The HDD 705 controls reading or writing of various data to or from the HD 704 under control of the CPU 701. The medium I/F 707 controls reading or writing of data with respect to a recording medium 706 such as a flash memory. The display 708 displays various information such as a cursor, menu, window, characters, or image. The network I/F 709 is an interface that controls communication of data with an external device through the communication network 100. The keyboard 711 is one example of input device provided with a plurality of keys for allowing a user to input characters, numerals, or various instructions. The mouse 712 is one example of input device for allowing the user to select a specific instruction or execution, select a target for processing, or move a cursor being displayed. The CD-RW drive 714 reads or writes various data with respect to a Compact Disc ReWritable (CD-RW) 713, which is one example of removable recording medium.

The image processing server 7 further includes the bus line 710. The bus line 710 is an address bus or a data bus, which electrically connects the elements in FIG. 36 such as the CPU 701.

<Functional Configuration of Image Capturing System>

Figure 37:
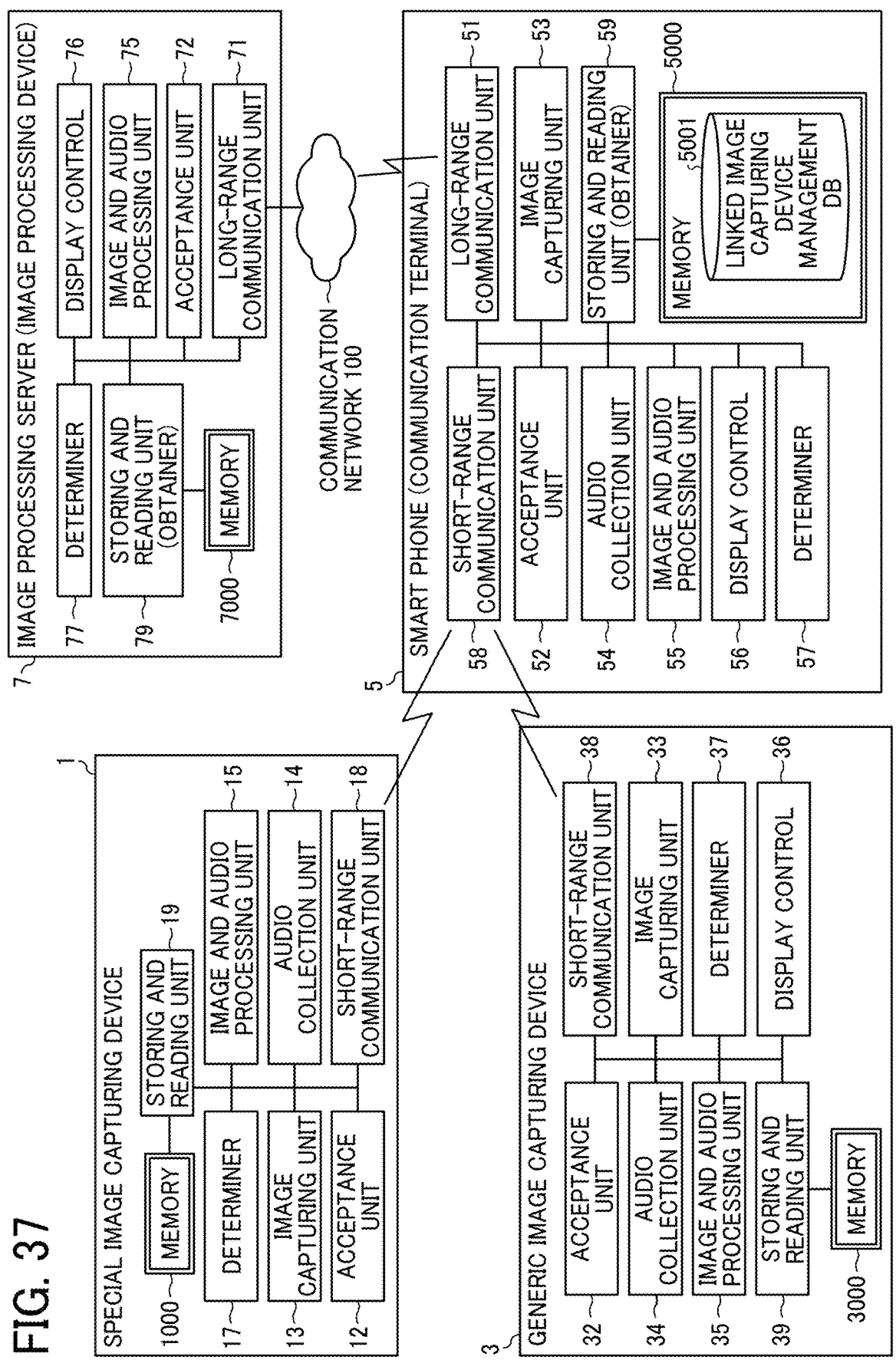
FIG. 37 is a schematic block diagram illustrating a functional configuration of the image capturing system of FIG. 35 according to the second embodiment.
Figure 38:
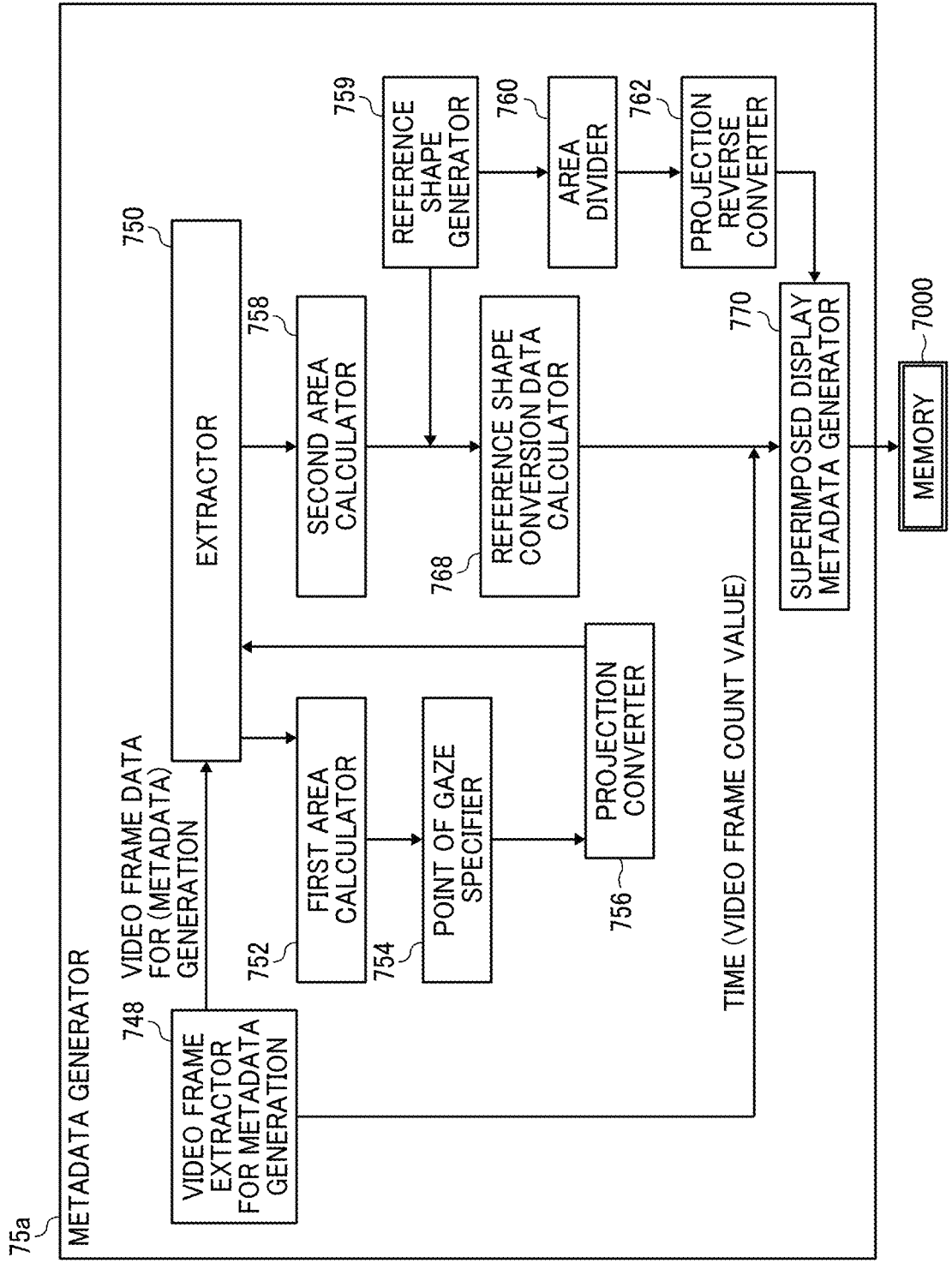
FIG. 38 is a block diagram illustrating a functional configuration of a metadata generator according to the second embodiment.
Figure 39:
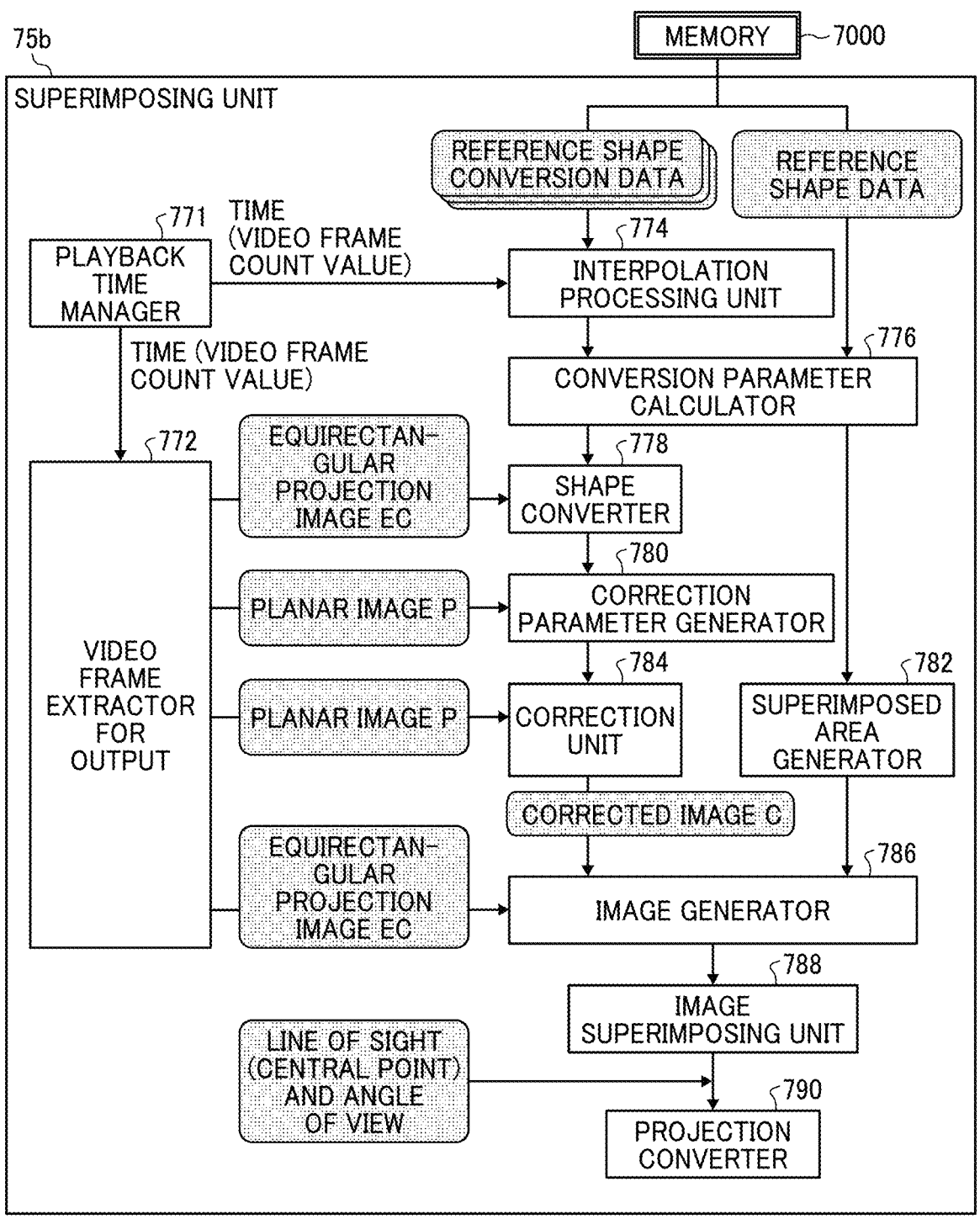
FIG. 39 is a block diagram illustrating a functional configuration of a superimposing unit according to the second embodiment.

Referring now to FIGS. 37 to 39, a functional configuration of the image capturing system of FIG. 35 is described according to the second embodiment. FIG. 37 is a schematic block diagram illustrating a functional configuration of the image capturing system of FIG. 35 according to the second embodiment. Since the special image capturing device 1, the generic image capturing device 3, and the smart phone 5 are substantially same in functional configuration, as described in the first embodiment, description thereof is omitted. In this embodiment, however, the image and audio processing unit 55 of the smart phone 5 does not have to be provided with all of the functional units illustrated in FIG. 15.

<Functional Configuration of Image Processing Server>

As illustrated in FIG. 37, the image processing server 7 includes a long-range communication unit 71, an acceptance unit 72, an image and audio processing unit 75, a display control 76, a determiner 77, and a storing and reading unit 79. These units are functions that are implemented by or that are caused to function by operating any of the elements illustrated in FIG. 36 in cooperation with the instructions of the CPU 701 according to the control program expanded from the HD 704 to the RAM 703.

The image processing server 7 further includes a memory 7000, which is implemented by the ROM 702, the RAM 703 and the I-1D 704 illustrated in FIG. 36.

The long-range communication unit 71 of the image processing server 7 is implemented by the network I/F 709 that operates under control of the CPU 701, illustrated in FIG. 36, to transmit or receive various data or information to or from other device (for example, other smart phone or server) through the communication network such as the Internet.

The acceptance unit 72 is implement by the keyboard 711 or mouse 712, which operates under control of the CPU 701, to receive various selections or inputs from the user.

The image and audio processing unit 75 is implemented by the instructions of the CPU 701. The image and audio processing unit 75 applies various types of processing to various types of data, transmitted from the smart phone 5.

The display control 76, which is implemented by the instructions of the CPU 701, generates data of the predetermined-area image Q, as a part of the planar image P, for display on the display 517 of the smart phone 5. The display control 76 superimposes the planar image P, on the spherical image CE, using superimposed display metadata, generated by the image and audio processing unit 75. With the superimposed display metadata, each grid area LA0 of the planar image P is placed at a location indicated by a location parameter, and is adjusted to have a brightness value and a color value indicated by a correction parameter.

The determiner 77 is implemented by the instructions of the CPU 701, illustrated in FIG. 36, to perform various determinations.

The storing and reading unit 79, which is implemented by instructions of the CPU 701 illustrated in FIG. 36, stores various data or information in the memory 7000 and read out various data or information from the memory 7000. For example, the superimposed display metadata may be stored in the memory 7000. In this embodiment, the storing and reading unit 79 functions as an obtainer that obtains various data from the memory 7000.

(Functional Configuration of Image and Audio Processing Unit)

Referring to FIGS. 38 and 39, a functional configuration of the image and audio processing unit 75 is described according to the embodiment. FIGS. 38 and 39 are block diagrams illustrating the functional configuration of a part of the image and audio processing unit 75 according to the embodiment.

Figure 40:
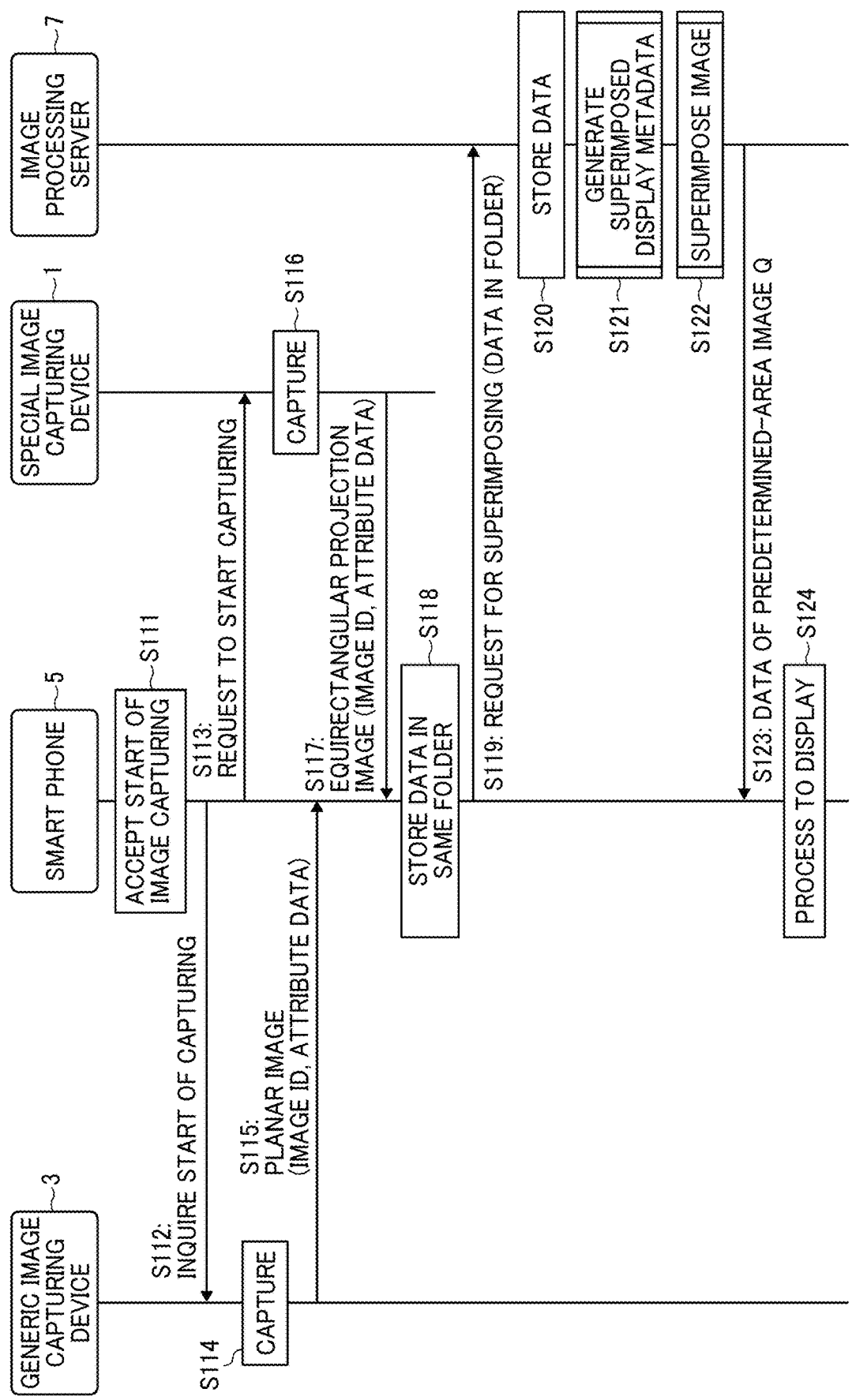
FIG. 40 is a data sequence diagram illustrating operation of capturing the images and processing the images for display, performed by the image capturing system of FIG. 35, according to the second embodiment.

The image and audio processing unit 75 mainly includes a metadata generator 75a that performs encoding, and a superimposing unit 75b that performs decoding. The metadata generator 75a performs processing of S121, which is processing to generate superimposed display metadata, as illustrated in FIG. 40. The superimposing unit 75b performs processing of S122, which is processing to superimpose the images using the superimposed display metadata, as illustrated in FIG. 40.

(Functional Configuration of Metadata Generator)

First, referring to FIG. 38, a functional configuration of the metadata generator 75a is described according to the embodiment. The metadata generator 75a includes a metadata generation video frame extractor (video frame extractor for metadata generation) 748, an extractor 750, a first area calculator 752, a point of gaze specifier 754, a projection converter 756, a second area calculator 758, a reference shape generator 759, an area divider 760, a projection reverse converter 762, a reference shape conversion data calculator 768, and a superimposed display metadata generator 770. These elements of the metadata generator 75a are substantially similar in function to the metadata generation video frame extractor 548, extractor 550, first area calculator 552, point of gaze specifier 554, projection converter 556, second area calculator 558, reference shape generator 559, area divider 560, projection reverse converter 562, reference shape conversion data calculator 568, and superimposed display metadata generator 570 of the metadata generator 55a, respectively. Accordingly, the description thereof is omitted.

Referring to FIG. 39, a functional configuration of the superimposing unit 75b is described according to the embodiment. The superimposing unit 75b includes a playback time manager 771, an output video frame extractor (video frame extractor for output) 772, an interpolation processing unit 774, a location parameter calculator 776, a shape converter 778, a correction parameter generator 780, a superimposed area generator 782, a correction unit 784, an image generator 786, an image superimposing unit 788, and a projection converter 790. The elements of the superimposing unit 75b are substantially similar in function to the playback time manager 571, output video frame extractor 572, interpolation processing unit 574, location parameter calculator 576, shape converter 578, correction parameter generator 580, superimposed area generator 582, correction unit 584, image generator 586, image superimposing unit 588, and projection converter 590 of the superimposing unit 55b, respectively. Accordingly, the description thereof is omitted.

<Operation>

Referring to FIG. 40, operation of the second embodiment is described. More specifically, referring to FIG. 40, operation of capturing the images and processing the images for display, performed by the image capturing system of FIG. 35, is described according to the second embodiment. S111 to S118 are performed in a substantially similar manner as described above referring to S11 to S18 of FIG. 18 according to the first embodiment, and description thereof is omitted.

At the smart phone 5, the long-range communication unit 51 transmits a superimposing request, which requests for superimposing one image on another image that are different in projection, to the image processing server 7, through the communication network 100 (S119). The superimposing request includes image data to be processed, which has been stored in the memory 5000. In this example, the image data to be processed includes planar image data, and equirectangular projection image data, which are stored in the same folder. The long-range communication unit 71 of the image processing server 7 receives the image data to be processed.

Next, at the image processing server 7, the storing and reading unit 79 stores the image data to be processed (planar image data and equirectangular projection image data), which is received at S119, in the memory 7000 (S120). The metadata generator 75a illustrated in FIG. 38 generates superimposed display metadata (S121). Further, the superimposing unit 75b superimposes images using the superimposed display metadata (S122). More specifically, the superimposing unit 75b superimposes the planar image on the equirectangular projection image. S121 and S122 are performed in a substantially similar manner as described above referring to S19 and S20 of FIG. 18, and description thereof is omitted.

Next, the display control 76 generates data of the predetermined-area image Q, which corresponds to the predetermined area T, to be displayed in a display area of the display 517 of the smart phone 5. As described above in this example, the predetermined-area image Q is displayed so as to cover the entire display area of the display 517. In this example, the predetermined-area image Q includes the superimposed image S superimposed with the planar image P. The long-range communication unit 71 transmits data of the predetermined-area image Q, which is generated by the display control 76, to the smart phone 5 (S123). The long-range communication unit 51 of the smart phone 5 receives the data of the predetermined-area image Q.

The display control 56 of the smart phone 5 controls the display 517 to display the predetermined-area image Q including the superimposed image S (S124).

Accordingly, the image capturing system of this embodiment can achieve the advantages described above referring to the first embodiment.

Further, in this embodiment, the smart phone 5 performs image capturing, and the image processing server 7 performs image processing such as generation of superimposed display metadata and generation of superimposed images. This results in decrease in processing load on the smart phone 5. Accordingly, high image processing capability is not required for the smart phone 5.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, as illustrated in FIG. 13, the equirectangular projection image data, planar image data, and superimposed display metadata, may not be stored in a memory of the smart phone 5. For example, any of the equirectangular projection image data, planar image data, and superimposed display metadata may be stored in any server on the network.

In any of the above-described embodiments, the planar image P is superimposed on the spherical image CE. Alternatively, the planar image P to be superimposed may be replaced by a part of the spherical image CE. In another example, after deleting a part of the spherical image CE, the planar image P may be embedded in that part having no image.

Furthermore, in the second embodiment, the image processing server 7 performs superimposition of images (S122). For example, the image processing server 7 may transmit the superimposed display metadata to the smart phone 5, to instruct the smart phone 5 to perform superimposition of images and display the superimposed images. In such case, at the image processing server 7, the metadata generator 75a illustrated in FIG. 39 generates superimposed display metadata. At the smart phone 5, the superimposing unit 55b illustrated in FIG. 15 superimposes one image on another image. The display control 56 illustrated in FIG. 13 processes display of the superimposed image.

In this disclosure, superimposing one image on another image is an example of combining one image with another image. Other examples of combining images include, but not limited to, placement of one image on top of other image entirely or partly, laying one image over other image entirely or partly, mapping one image on other image entirely or partly, pasting one image on other image entirely or partly, and integrating one image with other image. That is, as long as the user can perceive a plurality of images (such as the spherical image and the planar image) being displayed on a display as they were one image, processing to be performed on those images for display is not limited to the above-described examples.

Further, in the above-described one or more embodiments, the example case in which the images are both video is described. Alternatively, at least one image may be a video image, while another image being a still image. Alternatively, each of these images may be a still image.

For example, a background image, which is a spherical image, may be a still image that captures an image of scenery such as a building that stays at a same location. A foreground image, which is a planar image, may be a video image of a subject that moves such as an automobile like a car and a train, a plane, a drone, a robot, etc.

The present invention can be implemented in any convenient form, for example using dedicated hardware, or a mixture of dedicated hardware and software. The present invention may be implemented as computer software implemented by one or more networked processing apparatuses. The processing apparatuses can compromise any suitably programmed apparatuses such as a general-purpose computer, personal digital assistant, mobile telephone (such as a WAP or 3G-compliant phone) and so on, depending on the functional structure. Since the present invention can be implemented as software, each and every aspect of the present invention thus encompasses computer software implementable on a programmable device. The computer software can be provided to the programmable device using any recording medium. Examples of such recording medium include, but not limited to, a memory on a server such as a ROM or RAM, and a removable memory such as a USB memory, an optical disc, or a magnetic disk. Such recording medium storing any of the above-described programs may be distributed domestically or overseas as a program product.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), programmable logic device (PLD) such as a field programmable gate array (FPGA), and conventional circuit components arranged to perform the recited functions.

The invention claimed is:

1. An image processing apparatus comprising processing circuitry configured to:
   obtain a first image in a first projection, and a second image in a second projection;
   transform projection of a first corresponding area of the first image that corresponds to the second image, from the first projection to the second projection, to generate a third image in the second projection;
   identify a plurality of feature points, respectively, in the second image and the third image;
   determine a second corresponding area in the third image that corresponds to the second image, based on the plurality of feature points respectively identified in the second image and the third image;
   generate a reference shape in the second projection, having a relation of projection transformation with the second image;
   transform projection of the reference shape, from the second projection to the first projection, to generate a reference shape in the first projection;
   calculate reference shape conversion data for converting the reference shape in the second projection to the second corresponding area, using data for transforming projection from the second image to the second corresponding area; and
   store, in a memory, the reference shape conversion data in association with reference location data indicating the locations of a plurality of points of the reference shape in the first projection,
   the reference shape conversion data including at least one of reference shape rotation data defining rotation processing to be applied to the reference shape, and reference shape scaling data for defining scaling to be applied to the reference shape.

2. The image processing apparatus of claim 1, wherein the processing circuitry is configured to:
   transform projection of a central point of the second corresponding area, from the second projection to the first projection, to obtain a coordinate of a corresponding point in the first image, to obtain reference shape movement data; and
   store the reference shape movement data as a part of the reference shape conversion data,
   the reference shape movement data defining a location of the second image in the first image.

3. The image processing apparatus of claim 2, wherein the reference shape rotation data is represented by the Euler angle with respect to each axis of a three-dimensional model space.

4. The image processing apparatus of claim 2, wherein the second image is a frame obtained from a plurality of frames of a video image.

5. The image processing apparatus of claim 4, wherein the first image is a frame obtained from a plurality of frames of a video image.

6. The image processing apparatus of claim 5, wherein the processing circuitry calculates the reference shape conversion data, based on one or more frames obtained through sampling the plurality of frames of the video image for the second image.

7. The image processing apparatus of claim 6,
   wherein a number of the one or more frames obtained through sampling increases with an increase in the degree of change in contents of image between the frames of the video image, and decreases with a decrease in the degree of change in contents of image between the frames of the video image.

8. The image processing apparatus of claim 2,
   wherein the reference shape is determined based on an angle of view that is initially set.

9. The image processing apparatus of claim 2, wherein the first image is a spherical image, and the second image is a planar image.

10. The image processing apparatus of claim 2, wherein the first projection is an equirectangular projection, and the second projection is a perspective projection.

11. The image processing apparatus of claim 1, wherein the image processing apparatus includes at least one of a smart phone, tablet personal computer, notebook computer, desktop computer, and server computer.

12. An image capturing system comprising:
   the image processing apparatus of claim 1;
   a first image capturing device configured to capture surroundings of a target object to obtain the first image in the first projection and transmit the first image in the first projection to the image processing apparatus; and
   a second image capturing device configured to capture the target object to obtain the second image in the second projection and transmit the second image in the second projection to the image processing apparatus.

13. The image capturing system of claim 12,
   wherein the first image capturing device is a camera configured to capture the target object to generate a spherical image as the first image.

14. An image processing method, comprising:
   obtaining a first image in a first projection, and a second image in a second projection;
   transforming projection of a first corresponding area of the first image that corresponds to the second image, from the first projection to the second projection, to generate a third image in the second projection;
   identifying a plurality of feature points, respectively, in the second image and the third image;

determining a second corresponding area in the third image that corresponds to the second image, based on the plurality of feature points respectively identified in the second image and the third image;

generating a reference shape in the second projection, having a relation of projection transformation with the second image;

transforming projection of the reference shape, from the second projection to the first projection, to generate a reference shape in the first projection;

calculating reference shape conversion data for converting the reference shape in the second projection to the second corresponding area, using data for transforming projection from the second image to the second corresponding area; and storing, in a memory, the reference shape conversion data in association with reference location data indicating the locations of a plurality of points of the reference shape in the first projection, the reference shape conversion data including at least one of reference shape rotation data defining rotation processing to be applied to the reference shape, and reference shape scaling data for defining scaling to be applied to the reference shape.

15. The image processing method of claim 14, further comprising:

transforming projection of a central point of the second corresponding area, from the second projection to the first projection, to obtain a coordinate of a corresponding point in the first image, to obtain reference shape movement data; and storing the reference shape movement data as a part of the reference shape conversion data, the reference shape movement data defining a location of the second image in the first image.

16. A non-transitory recording medium which, when executed by one or more processors, cause the processors to perform an image processing method comprising:

obtaining a first image in a first projection, and a second image in a second projection;

transforming projection of a first corresponding area of the first image that corresponds to the second image, from the first projection to the second projection, to generate a third image in the second projection;

identifying a plurality of feature points, respectively, in the second image and the third image;

determining a second corresponding area in the third image that corresponds to the second image, based on the plurality of feature points respectively identified in the second image and the third image;

generating a reference shape in the second projection, having a relation of projection transformation with the second image;

transforming projection of the reference shape, from the second projection to the first projection, to generate a reference shape in the first projection;

calculating reference shape conversion data for converting the reference shape in the second projection to the second corresponding area, using data for transforming projection from the second image to the second corresponding area; and storing, in a memory, the reference shape conversion data in association with reference location data indicating the locations of a plurality of points of the reference shape in the first projection, the reference shape conversion data including at least one of reference shape rotation data defining rotation processing to be applied to the reference shape, and reference shape scaling data for defining scaling to be applied to the reference shape.

17. The recording medium of claim 16, wherein the method further comprises:

transforming projection of a central point of the second corresponding area, from the second projection to the first projection, to obtain a coordinate of a corresponding point in the first image, to obtain reference shape movement data; and storing the reference shape movement data as a part of the reference shape conversion data, the reference shape movement data defining a location of the second image in the first image.

* * * * *